US011530716B2

(12) United States Patent
Bastian et al.

(10) Patent No.: US 11,530,716 B2
(45) Date of Patent: Dec. 20, 2022

(54) WALL HANGING SYSTEM

(71) Applicant: MCS INDUSTRIES, INC., Easton, PA (US)

(72) Inventors: Geoffrey William Bastian, Easton, PA (US); Michael Lee Pyle, Sugar Grove, IL (US); Matthew Scott Kressin, Allentown, PA (US); Robert Terry Coyle, Jr., Palmer, PA (US)

(73) Assignee: MCS Industries, Inc.

( * ) Notice: Subject to any disclaimer, the term of this patent is extended or adjusted under 35 U.S.C. 154(b) by 98 days.

(21) Appl. No.: 16/950,214

(22) Filed: Nov. 17, 2020

(65) Prior Publication Data

US 2021/0071699 A1 Mar. 11, 2021

Related U.S. Application Data

(63) Continuation-in-part of application No. 16/542,600, filed on Aug. 16, 2019.

(Continued)

(51) Int. Cl.
*F16B 12/22* (2006.01)
*F16B 5/00* (2006.01)
(Continued)

(52) U.S. Cl.
CPC ............ *F16B 12/22* (2013.01); *F16B 5/0032* (2013.01); *F16B 12/24* (2013.01); *F16B 21/09* (2013.01)

(58) Field of Classification Search
CPC ... A47B 57/482; A47B 57/485; A47B 57/487; A47B 57/50; A47B 2230/0077;
(Continued)

(56) References Cited

U.S. PATENT DOCUMENTS 3,265,344 A * 8/1966 Ornstein ................. F16B 12/02
108/42
3,894,377 A * 7/1975 Welch ..................... F16B 12/22
403/353

(Continued)

FOREIGN PATENT DOCUMENTS

AT 505626 A4 * 3/2009 .............. F16B 12/22
BE 815124 A * 9/1974 .............. F16B 12/22
(Continued)

OTHER PUBLICATIONS

Amazon.com "C.H. Yates Rubber 3143-4 3" Bow Roller ½"Shaft" First Reviewed Jan. 8, 2015. Retrieved Jul. 14, 2021. (https://www.amazon.com/C-H-Yates-Rubber-3143-4-Roller/dp/B004OI3F7Y) (Year: 2015).

*Primary Examiner* — Josh Skroupa
(74) *Attorney, Agent, or Firm* — Belles Katz LLC

(57) ABSTRACT

A wall hanging system by which a wall décor item such as a ledge, a frame, artwork, or the like may be mounted to and hung from a wall. The wall hanging system may include a first mounting assembly that is coupled to the wall and a second mounting assembly that is coupled to the wall décor item. The first and second mounting assemblies may be engaged to mount the wall décor item from the wall. One of the first and second mounting assemblies may include a post and the other of the first and second mounting assemblies may include a cavity. The post may be inserted into an insertion portion of the cavity and then slid to a nesting portion of the cavity to lock the first mounting assembly to the second mounting assembly.

20 Claims, 50 Drawing Sheets

Related U.S. Application Data

(60) Provisional application No. 62/937,492, filed on Nov. 19, 2019, provisional application No. 62/722,352, filed on Aug. 24, 2018.

(51) Int. Cl.
  *F16B 21/09* (2006.01)
  *F16B 12/24* (2006.01)

(58) Field of Classification Search
  CPC .. A47B 2230/16; F16B 5/0032; F16B 5/0036; F16B 5/0052; F16B 12/125; F16B 12/14; F16B 12/22; F16B 12/24; F16B 12/26; F16B 12/30; F16B 12/36; F16B 21/09; F16B 2200/30; Y10T 403/7094; Y10T 403/73
  USPC .................................. 403/DIG. 10, DIG. 13
  See application file for complete search history.

(56) References Cited

U.S. PATENT DOCUMENTS

| | | | |
|---|---|---|---|
| 4,251,969 A * | 2/1981 | Bains | F16B 21/09 52/127.9 |
| 4,258,464 A | 3/1981 | Ullman, Jr. | |
| 4,353,663 A | 10/1982 | Glickman | |
| 4,363,201 A * | 12/1982 | Bains | F16B 5/0036 52/584.1 |
| 4,587,788 A * | 5/1986 | Bielicki | F16B 5/0036 403/353 |
| 4,932,105 A * | 6/1990 | Muller | F16B 21/09 24/297 |
| 4,963,051 A | 10/1990 | Hutter | |
| D333,178 S | 2/1993 | Novy | |
| 5,433,416 A | 7/1995 | Johnson | |
| 5,529,424 A | 6/1996 | Neubert | |
| D388,876 S | 1/1998 | Sampson | |
| 5,868,537 A | 2/1999 | Latal | |
| 6,904,835 B2 | 6/2005 | Dugan | |
| D625,977 S | 10/2010 | Watson | |
| 7,874,762 B2 | 1/2011 | Shaw | |
| 8,104,989 B2 | 1/2012 | Liu | |
| 8,356,954 B2 | 1/2013 | Koch | |
| 8,641,315 B2 | 2/2014 | Liu | |
| D703,513 S | 4/2014 | Mistyurik | |
| 8,720,156 B2 * | 5/2014 | Porter | F16B 21/09 52/127.9 |
| D733,265 S | 6/2015 | Eriksen | |
| D763,662 S | 8/2016 | Ezell | |
| 9,414,675 B2 | 8/2016 | Koelling et al. | |
| 9,447,804 B2 | 9/2016 | Andersson et al. | |
| D774,628 S | 12/2016 | Provenzano et al. | |
| 9,534,623 B2 | 1/2017 | Andersson et al. | |
| 9,677,589 B2 | 6/2017 | Koelling | |
| 9,765,529 B2 | 9/2017 | Porter | |
| 9,771,964 B2 | 9/2017 | Leveen et al. | |
| 9,810,253 B2 | 11/2017 | Koelling et al. | |
| 10,100,862 B2 | 10/2018 | Yang | |
| 10,138,917 B2 | 11/2018 | Koch | |
| D835,244 S | 12/2018 | Khubani | |
| 10,211,608 B2 | 2/2019 | Weeks | |
| D846,367 S | 4/2019 | Romero, Jr. | |
| 10,280,960 B2 | 5/2019 | Giovannetti | |
| D853,535 S | 7/2019 | Norton | |
| D859,134 S | 9/2019 | Iacono | |
| D865,917 S | 11/2019 | Naber | |
| 10,557,491 B2 | 2/2020 | Schon | |
| 10,648,498 B2 | 5/2020 | Sjostedt | |
| 10,722,029 B2 | 7/2020 | Boone | |
| 10,844,891 B2 * | 11/2020 | Maertens | F16B 12/46 |
| 10,865,822 B2 | 12/2020 | Andersson | |
| 2005/0109910 A1 | 5/2005 | Vander Berg | |
| 2006/0249645 A1 | 11/2006 | Price | |
| 2007/0025811 A1 | 2/2007 | Wilhelm | |
| 2008/0083865 A1 | 4/2008 | Matsui | |
| 2009/0058078 A1 | 3/2009 | Knudson | |
| 2009/0260390 A1 | 10/2009 | Rapp | |
| 2010/0166494 A1 | 7/2010 | Cochard | |
| 2011/0085853 A1 | 4/2011 | Liu | |
| 2011/0204622 A1 | 8/2011 | Lewis | |
| 2011/0255915 A1 | 10/2011 | Chen | |
| 2011/0260592 A1 | 10/2011 | Lin | |
| 2012/0137624 A1 | 6/2012 | Sibbett | |
| 2012/0301217 A1 | 11/2012 | Liu | |
| 2013/0239509 A1 | 9/2013 | Wang | |
| 2015/0050081 A1 | 2/2015 | Andersson et al. | |
| 2015/0147113 A1 | 5/2015 | Crabtree, II | |
| 2015/0219136 A1 | 8/2015 | Koelling | |
| 2015/0260325 A1 | 9/2015 | Quick | |
| 2015/0285284 A1 | 10/2015 | Koelling et al. | |
| 2015/0300393 A1 | 10/2015 | Leveen et al. | |
| 2015/0342349 A1 | 12/2015 | Koelling et al. | |
| 2015/0354612 A1 * | 12/2015 | Koch | F16B 12/22 403/376 |
| 2017/0008161 A1 | 1/2017 | Weitsman | |
| 2017/0023043 A1 | 1/2017 | Koelling et al. | |
| 2017/0073961 A1 | 3/2017 | Porter | |
| 2017/0208774 A1 | 7/2017 | Kasper | |
| 2017/0297271 A1 | 10/2017 | Dizdar et al. | |
| 2018/0017091 A1 | 1/2018 | Schon | |
| 2018/0031019 A1 | 2/2018 | Sjostedt et al. | |
| 2018/0051734 A1 | 2/2018 | Koelling et al. | |
| 2018/0098627 A1 | 4/2018 | Savage | |
| 2018/0135799 A1 | 5/2018 | Dang | |
| 2018/0328395 A1 | 11/2018 | Boone | |
| 2018/0328617 A1 | 11/2018 | Naber | |
| 2019/0211859 A1 | 7/2019 | Liu | |
| 2020/0146447 A1 | 5/2020 | Brendel | |

FOREIGN PATENT DOCUMENTS

| | | | |
|---|---|---|---|
| DE | 2135596 A1 * | 2/1973 | ............. F16B 12/22 |
| DE | 2701833 A1 | 7/1978 | |
| DE | 102007058662 A1 | 6/2009 | |
| FR | 1437325 A * | 4/1966 | ............. F16B 12/22 |
| FR | 2109202 A5 | 5/1972 | |
| GB | 2496613 A | 5/2013 | |
| KR | 0129201 Y1 | 3/1999 | |
| WO | WO-0026545 A1 * | 5/2000 | ............. F16B 12/22 |
| WO | WO 2016/137385 A1 | 9/2016 | |
| WO | WO 2017/105324 A1 | 6/2017 | |
| WO | WO 2017/160202 A1 | 9/2017 | |

* cited by examiner

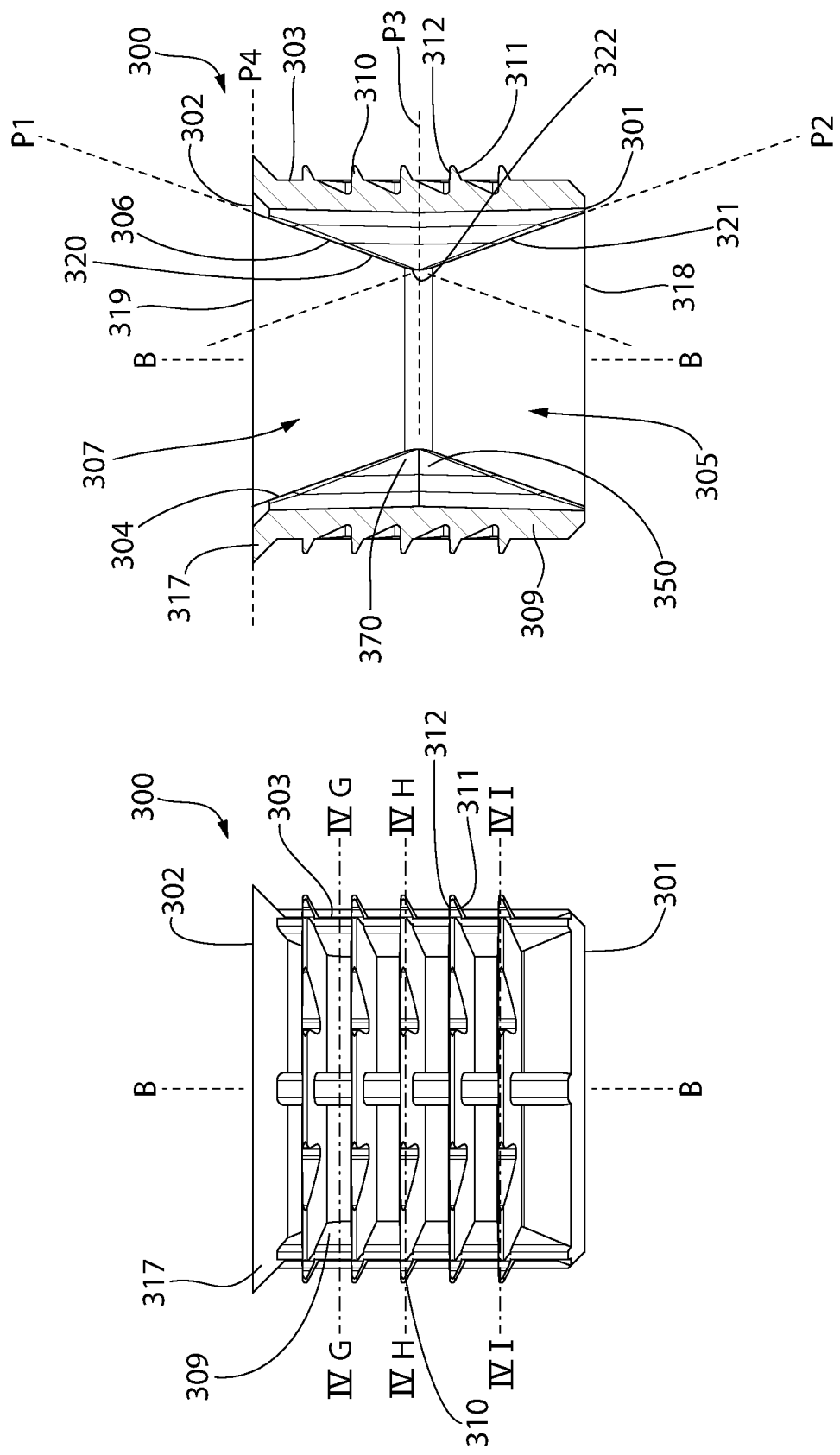

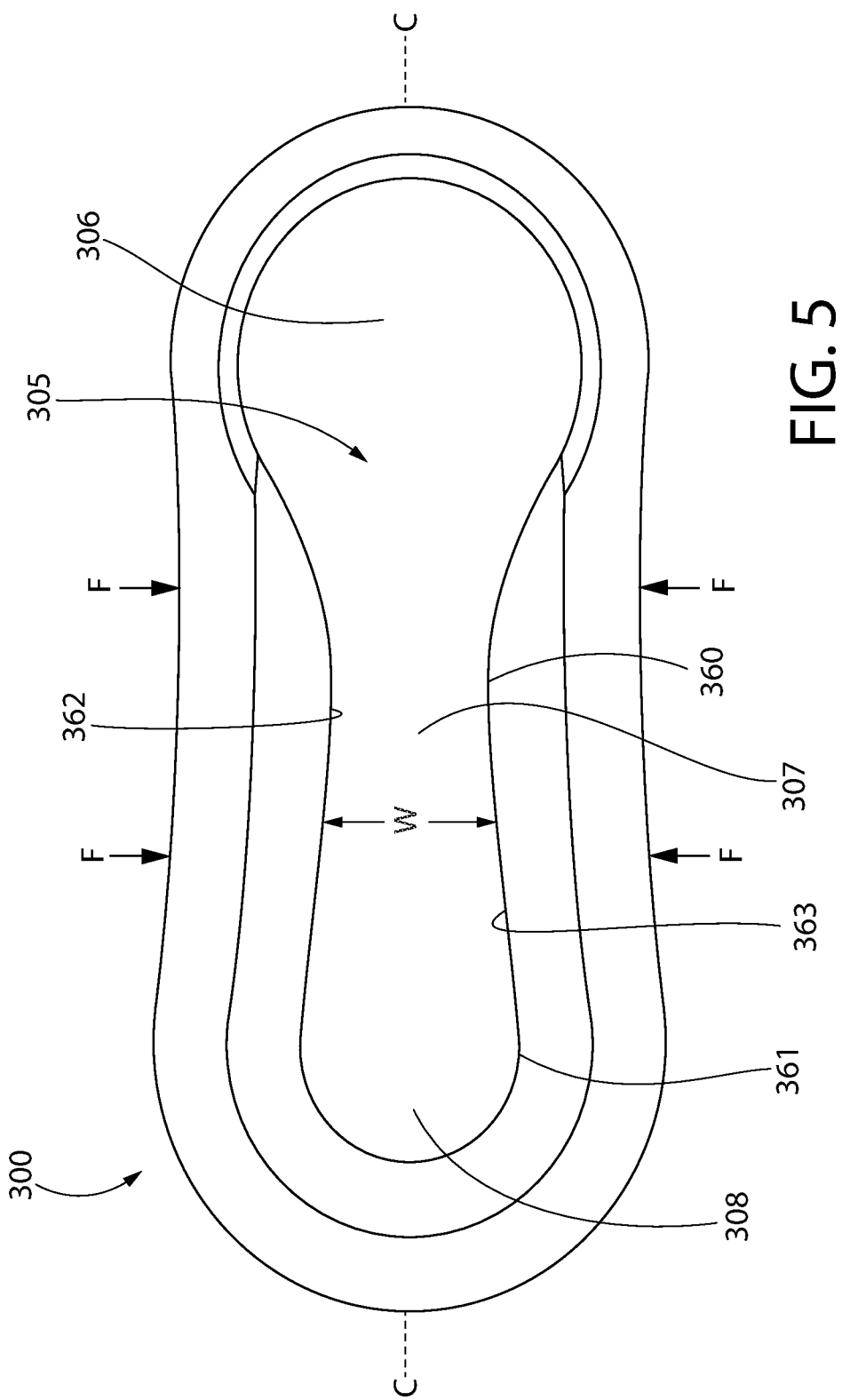

WALL HANGING SYSTEM

CROSS-REFERENCE TO RELATED APPLICATIONS

The present application is a continuation-in-part of U.S. patent application Ser. No. 16/542,600, filed Aug. 16, 2019, which claims priority to U.S. Provisional Patent Application Ser. No. 62/722,352, filed Aug. 24, 2018. The present application also claims priority to U.S. Provisional Patent Application Ser. No. 62/937,492, filed Nov. 19, 2019. The entirety of each of the aforementioned patent applications is incorporated herein by reference.

BACKGROUND OF THE INVENTION

Furniture is often purchased in a disassembled state due to its large size so that it is easier to package and transport to the end-use location. In some instances, the store at which the furniture is purchased will deliver the furniture to the end-user's home and assemble the furniture for the consumer. In other instances, the consumer must assemble the furniture by him or herself. This can be a great source of frustration to the consumer because the assembly instructions are often difficult for a lay person to understand and the furniture parts often do not fit together readily and seamlessly. Thus, a need exists for a mechanical coupling system that can be used for the coupling of pieces of an article of furniture together to assemble the article of furniture.

There are many instances in which people desire to hang an article from a wall. For example, people enjoy hanging artwork and other decorations from a wall in a home to personalize the space. People also hang artifacts and diplomas and other achievement indicators from the walls in their offices. Moreover, people hang shelves and other ledges from the to display items thereon. However, for many people the process of hanging articles from the wall is a daunting and stressful experience. Thus, a need exists for a simpler way to effectively hang various articles from a wall.

SUMMARY OF THE INVENTION

The present invention is directed to a wall hanging system by which a wall décor item such as a ledge, a frame, artwork, or the like may be mounted to and hung from a wall. The wall hanging system may include a first mounting assembly that is coupled to the wall and a second mounting assembly that is coupled to the wall décor item. The first and second mounting assemblies may be engaged to mount the wall décor item from the wall. One of the first and second mounting assemblies may include a post and the other of the first and second mounting assemblies may include a cavity. The post may be inserted into an insertion portion of the cavity and then slid to a nesting portion of the cavity to lock the first mounting assembly to the second mounting assembly.

In one aspect, the invention may be a wall hanging system comprising: a first mounting assembly configured to be coupled to a wall, the first mounting assembly comprising at least one mounting element; a wall décor item; a second mounting assembly coupled to the wall décor item, the second mounting assembly comprising at least one mounting element that is configured to engage the at least one mounting element of the first mounting assembly to hang the wall décor item from the wall; wherein the at least one mounting element of one of the first and second mounting assemblies comprises a post having a longitudinal axis and the at least one mounting element of the other one of the first and second mounting assemblies comprises a cavity having an insertion portion and a nesting portion; and wherein the wall décor item is configured to be mounted to the wall by inserting the post axially into the cavity along the insertion portion of the cavity and then sliding the wall décor item relative to the first mounting assembly in a direction transverse to the longitudinal axis of the at least one post until the at least one post nests within the nesting portion of the cavity.

In another aspect, the invention may be a wall hanging system comprising: a mounting bracket configured to be coupled to a wall, the mounting bracket comprising at least one cavity having an insertion portion and a nesting portion; a wall décor item; at least one mounting element coupled to the wall décor item, the at least one mounting element comprising a first portion that is embedded within the wall décor item and a post portion protruding from the wall décor item along a longitudinal axis; and wherein the wall décor item is mounted to the wall by inserting the post portion of the at least one mounting element axially into the at least one cavity along the insertion portion of the at least one cavity and then sliding the wall décor item relative to the mounting bracket in a direction transverse to the longitudinal axis until the at least one post portion nests within the nesting portion of the at least one cavity In yet another aspect, the invention may be a method of hanging a wall décor item from a wall, the method comprising: coupling a first mounting assembly to the wall, the first mounting assembly comprising a plate portion having a rear surface that faces the wall, a front surface opposite the rear surface, and an annular wall protruding from the front surface and defining a cavity having an insertion portion and a nesting portion; aligning a post protruding from a floor of a mounting recess of the wall décor item with the insertion portion of the cavity and moving the wall décor item towards the first mounting assembly until the post enters the insertion portion of the cavity; and sliding the wall décor item relative to the first mounting assembly in a direction that is transverse to a longitudinal axis of the post so that the post slides from the insertion portion of the cavity to the nesting portion of the cavity, an inner surface of the annular wall of the first mounting assembly along the nesting portion of the cavity mating with an outer surface of the post to prevent the post from being removed from the cavity while the post is located within the nesting portion of the cavity.

In a further aspect, the invention may be a wall hanging system comprising: a wall décor item having at least one first type of mounting element; a first mounting bracket and a second mounting bracket, each of the first and second mounting brackets comprising at least one second type of mounting element, a first end having a first coupling feature, and a second end having a second coupling feature; an extension bracket comprising a first end having a third coupling feature and second end having a fourth coupling feature; wherein the first and second mounting brackets and the extension bracket are configured to be coupled to the wall so that the extension bracket extends between the first and second mounting brackets and the third coupling feature of the extension bracket mates with the second coupling feature of the first mounting bracket and the fourth coupling feature of the extension bracket mates with the first coupling feature of the second mounting bracket; and wherein the wall décor item is mounted to the wall via engagement between the at least one first type of mounting element of the wall décor item and the at least one second type of mounting element of the first and second mounting brackets.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4A-4D are a top perspective view, a bottom perspective view, a top view, and a side view, respectively, of the female coupler of FIG. 1;

FIG. 4E is a cross-sectional view taken along line IVE-IVE of FIG. 4C;

FIG. 5 is a top view of the female coupler of FIG. 4A illustrating compressive forces acting on the female coupler when it is installed in the board as shown in FIG. 1;

DETAILED DESCRIPTION OF THE INVENTION

Figure 1:
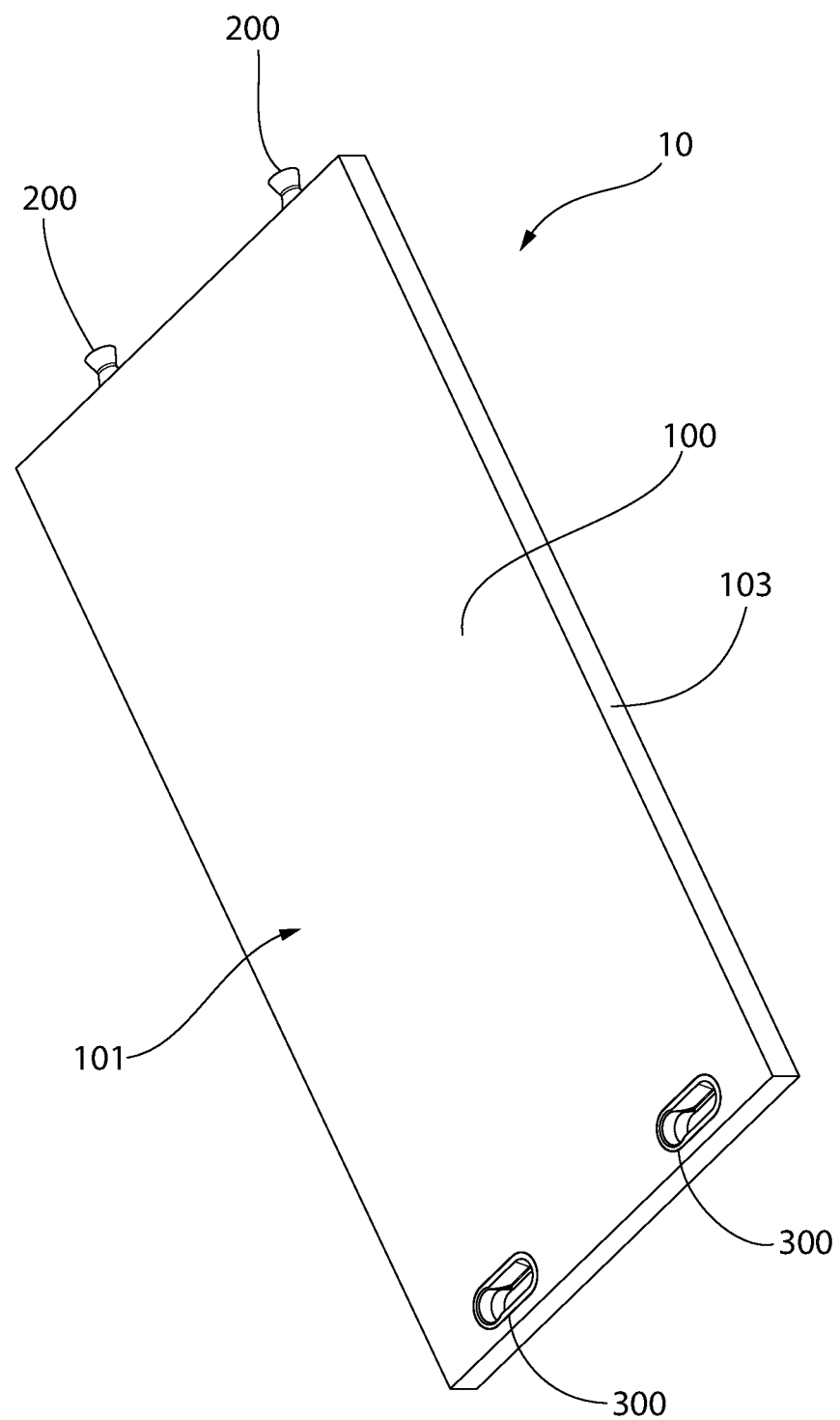
FIG. 1 is a front perspective view of a furniture part including a board with male and female couplers attached thereto in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring to FIGS. 1-12D, the invention will be described with reference to a furniture assembly and/or a method of assembling furniture.

Figure 2:
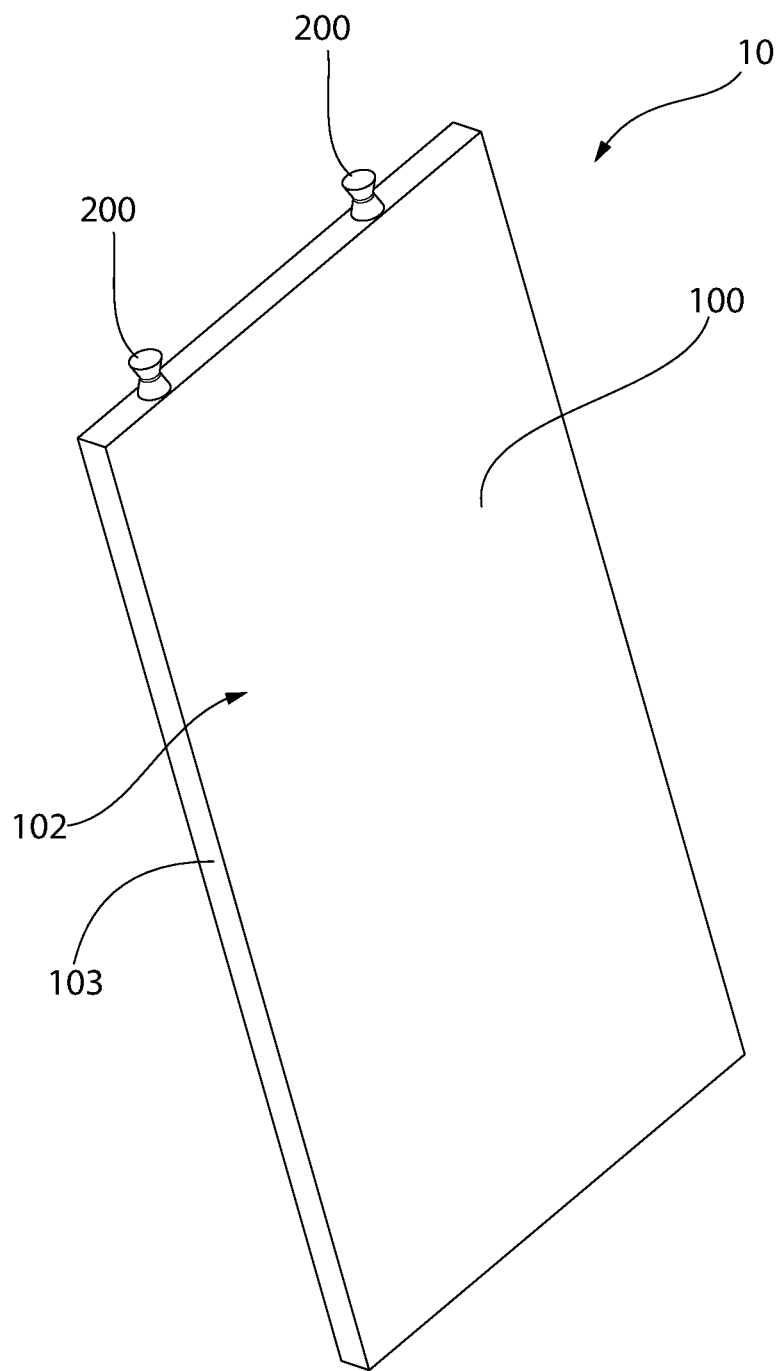
FIG. 2 is a rear perspective view of the furniture part of FIG. 1.

Referring to FIGS. 1 and 2, a furniture part 10 is illustrated in accordance with an embodiment of the present invention. In the exemplified embodiment, the furniture part 10 comprises a board 100, one or more male couplers 200, and one or more female couplers 300. Of course, in some embodiments the board 100 may include either male couplers 200 or female couplers 300, but not both. As shown, the one or more male and female couplers 200, 300 are coupled or attached to the board 100, the exact manner of such attachment being described in more detail below. In some embodiments, the furniture part 10 may be sold with the male and female couplers 200, 300 coupled to the board 100 at the positions and locations necessary to ensure that a plurality of the furniture parts 10 can be coupled together to form an assembled article of furniture. In some embodiments, the male and female couplers 200, 300 cannot be readily detached or otherwise separated from the boards 100 without causing damage to either the boards 100 or the male/female couplers 200, 300. In some embodiments, the male and female couplers 200, 300 may be collectively referred to herein as a mechanical coupling system. In other embodiments, two furniture parts, each including a board 100 and male/female couplers 200, 300 such that one of the boards includes male couplers 200 and another one of the boards 100 includes female couplers 300, may be referred to herein as a mechanical coupling system or a furniture assembly.

In the exemplified embodiment, there are two of the male couplers 200 and two of the female couplers 300 coupled to the board 100. However, there could be one or more than two of the male couplers 200 and one or more than two of the female couplers 300 coupled to the board 100 in other embodiments. Moreover, in still other embodiments there could be either one or more of the male couplers 200 and/or one or more of the female couplers 300 coupled to the board 100. Thus, there do not need to be both the male and female couplers 200, 300 attached to each board 100. The locations of the male and female couplers 200, 300 on the boards 100 are typically dictated by the manufacturer to make it easy for a consumer or end-user to assemble the furniture using the furniture parts 10.

In use, a plurality of different furniture parts 10 can be coupled together to form an assembled article of furniture by mating the male couplers 200 of one of the furniture parts 10 with the female couplers 300 of another one of the furniture parts 10 in accordance with instructions provided by the manufacturer. This assembly will be described in greater detail below with reference to FIGS. 7A-9B. The specific type of furniture that can be assembled using the furniture parts 10 is not limiting of the present invention. The specific type of furniture may include cabinets, sofas, tables, chairs, bookshelves, desks, bed frames, stools, stands, dressers, or any other type of furniture that can potentially be assembled by a consumer or end-user in their home or office.

In the exemplified embodiment, the board 100 is rectangular shaped, but the board 100 may take on any of a variety of different shapes including polygons, shapes that are not polygons, regular shapes, irregular shapes, or the like. Furthermore, although in the exemplified embodiment the board 100 is long and flat, it need not be flat in all embodiments but could include textures, contours, ridges, protuberances, hills, or the like on any of its surfaces or edges. In some embodiments, the board 100 need only form a part of an article of furniture so the final specifications of the article of furniture will dictate the shape and structure of the board 100. Thus, in some embodiments the shape of the board 100 is not to be limiting of the present invention. The board 100 may also be referred to herein as a panel, a substrate, or a support structure.

In the exemplified embodiment, the board 100 has a front surface 101, a rear surface 102, and an edge 103 extending between the front and rear surfaces 101, 102. The edge 103 is a peripheral edge that extends around an entirety of a periphery of the board 100. In the exemplified embodiment, the male couplers 200 are coupled to the board 100 along a portion of the edge 103 and the female couplers 300 are coupled to the board 100 along the front surface 101. However, the invention is not to be so limited and in other embodiments the male couplers 200 could be coupled to the front and/or rear surfaces 101, 102 and the female couplers 300 could be coupled to the rear surface 102 or the edge 103. In other embodiments, there may be male couplers 200 and female couplers 300 coupled to the edge 103 and/or male couplers and female couplers 200, 300 coupled to one or both of the front and rear surfaces 101, 102 of the board 100. The basic concept is that the male and female couplers 200, 300 are positioned on first and second boards 100 at a location that enables the first and second boards 100 (and the first and second furniture parts 10 that include the first and second boards 100 and the male and female couplers 200, 300) to be coupled together to form a part of an assembled piece of furniture.

There are two main advantages of the male and female couplers 200, 300. First, they enable articles of furniture to be assembled without the use of any tools much quicker than was previously possible. Specifically, there is no need for hammers, screw drivers, hex keys, Allen wrenches, or the like and the male and female couplers 200, 300 mate with one another readily and quickly during assembly. Furthermore, disassembly is just as easy as assembly and it can be accomplished without causing any damage to the furniture parts 10 so that the article of furniture can be reassembled at another location if so desired. Second, the male and female couplers 200, 300 are able to be used in boards of varying quality. The boards 100 to which the male and female couplers 200, 300 are coupled may be formed from fiberboard, which may include particle board (also referred to as low-density fiberboard, or LDF), medium density fiberboard (MDF) and hardboard (also referred to as high-density fiberboard, or HDF). In some embodiments, the boards 100 may be formed from a low quality or low grade particle board that is porous and has a low density. In some embodiments the density of the boards 100 may be in a range of 600-700 kg/m$^3$, or more specifically 600-650 kg/m$^3$ or in a range of 650-700 kg/m$^3$ or 650-680 kg/m$^3$. In some embodiments, the boards 100 may have a density that is below 700 kg/m$^3$. The material of such low grade particle board may include flakes of poplar, pine, or the like along with various binders such as glue and adhesives.

Figure 3A:
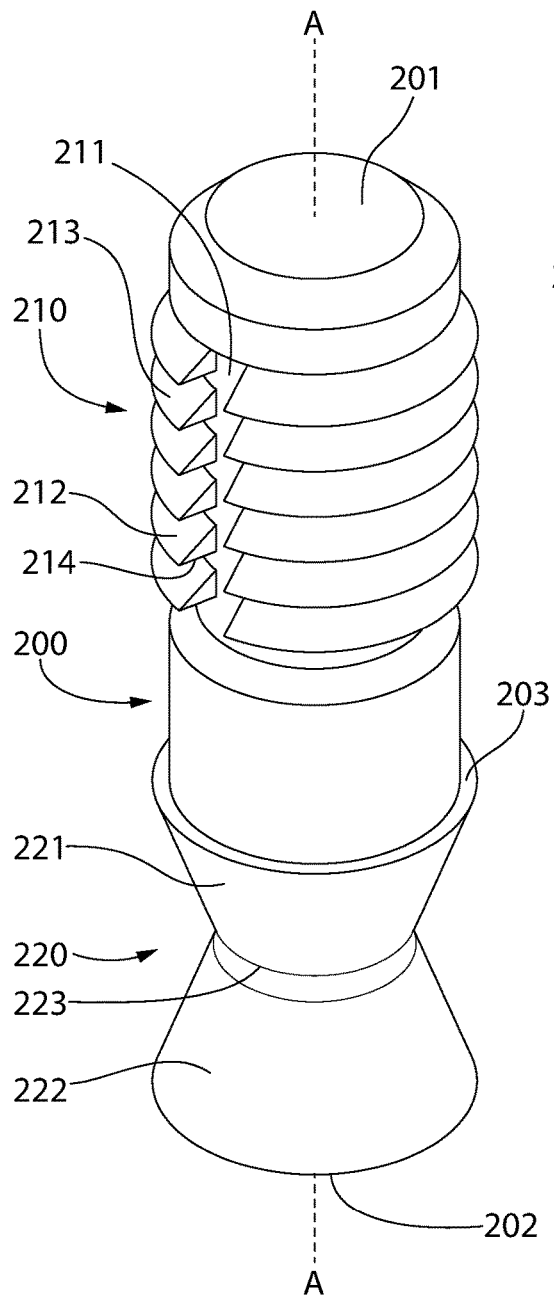
FIGS. 3A-3C are a top perspective view, a bottom perspective view, and a front view, respectively, of the male coupler of FIG. 1.
Figure 3B:
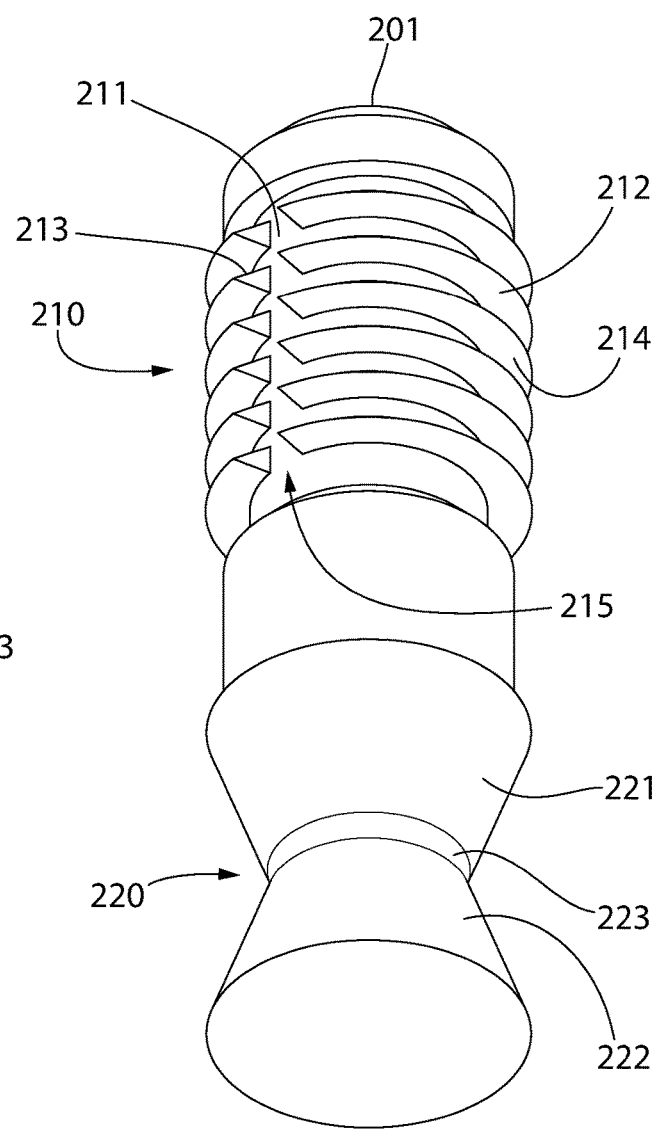
Figure 3C:
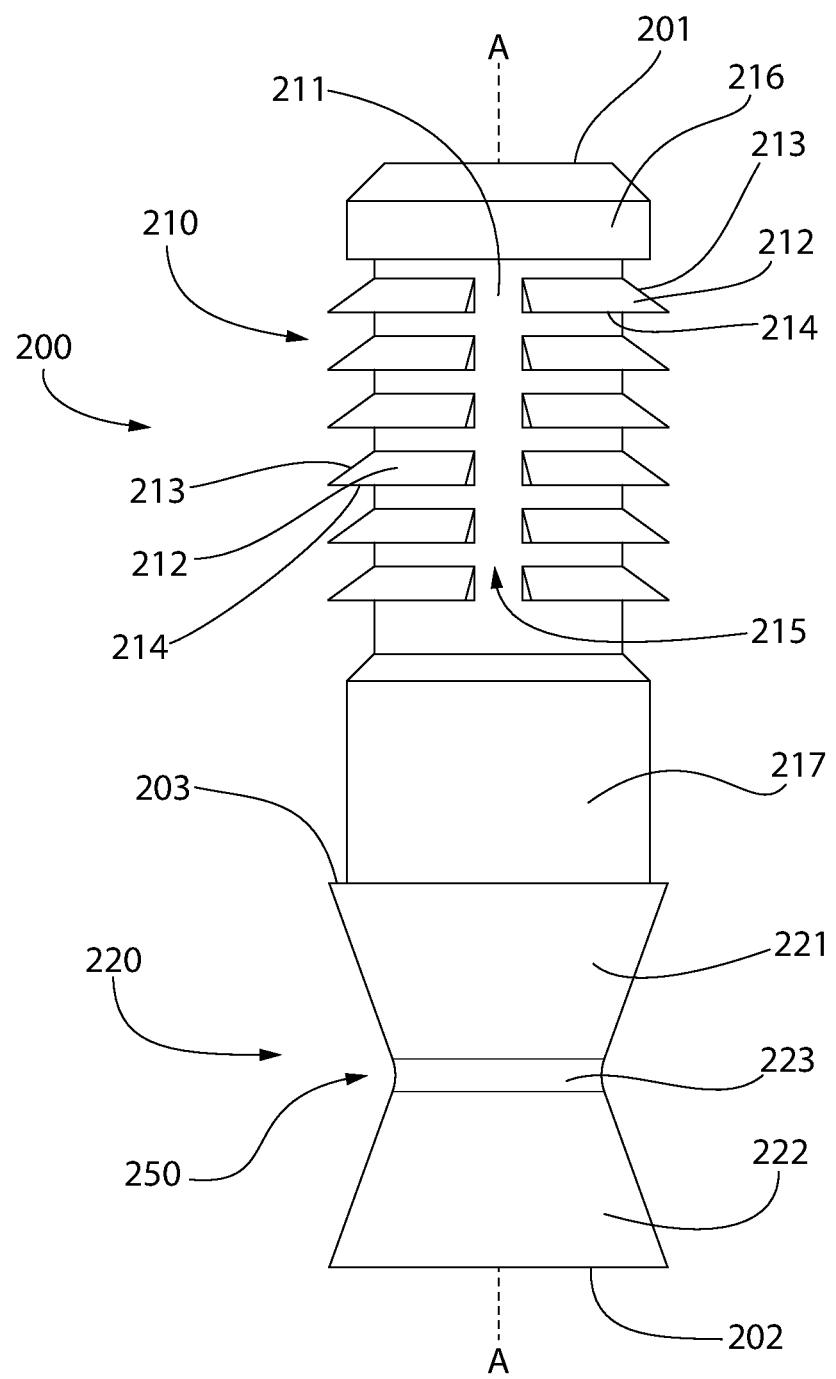

Referring to FIGS. 3A-3C, the male coupler 200 will be described in accordance with an embodiment of the present invention. The invention is not to be limited to the specific structural details of the male coupler 200 in all embodiments and structural modifications may be possible without affecting its function. In fact, two alternative embodiments of male couplers will be described below with reference to FIGS. 10A-11D and 12A-12D and it should be appreciated that even more alternative embodiments are possible.

The male coupler 200 may be formed from metal, plastic, or the like in various different embodiments. In one particular embodiment, the male coupler 200 may be formed from glass filled nylon. Of course, other materials are possible in other embodiments, including nylon and other thermoplastics such as polyethylene, polyvinyl chloride, polystyrene, polypropylene, or the like, although a strong and rigid material is preferable because it is being used to hold an assembled article of furniture together. The male coupler 200 could also be formed from wood or any of various metals in some embodiments. In some embodiments the male coupler 200 may be formed in an injection molding process, although it could also be formed by extrusion, 3D printing, or the like. As described below, the female coupler 300 may be formed from the same material as the male coupler 200 and in the same manufacturing process (e.g., injection molding, extrusion, 3D printing, or the like). As mentioned above, because the male and female couplers 200, 300 are the only components that serve to couple the various furniture parts 10 together, the male and female couplers 200, 300 should be formed from a strong, rigid material capable of supporting a reasonably large amount of weight and force.

The male coupler 200 extends along an axis A-A from a first end 201 to a second end 202. The male coupler 200 comprises a first portion 210 configured for coupling the male coupler 200 to the board 100 and a second portion 220 configured for coupling the male coupler 200 to one of the female couplers 300. The second portion 220 comprises a first engagement feature 250 that mates with an engagement feature of the female coupler 300 to achieve the coupling between those two components. The first portion 210 terminates at the first end 201 and the second portion 210 terminates at the second end 202. The male coupler 200 has a generally cylindrical shape.

The first portion 210 comprises a generally cylindrical body 211 and a plurality of barbs 212 protruding radially from the cylindrical body 211. The barbs 212 are axially spaced apart from one another along the length of the first portion 210 of the male coupler 200. Each of the barbs 212 has a top surface 213 that is angled obliquely relative to the axis A-A and a bottom surface 214 that is perpendicular relative to the axis A-A. The top surface 213 of the barbs 212 faces the first end 201 of the male coupler 200 and the bottom surface 214 of the barbs 212 faces the second end 202 of the male coupler 200. Due to the angles of the top and bottom surfaces 213, 214 of the barbs 212, the male coupler 200 can be inserted into an opening in one of the boards 100 with the first end 201 entering the opening first. Because the top surfaces 213 of the barbs 212 are angled, the barbs 212 will deflect as the male coupler 200 is inserted deeper into the opening in the board 100. Because the bottom surfaces 214 of the barbs 212 are perpendicular to the axis A-A, the barbs 212 will substantially prevent the male coupler 200 from being removed from the opening and detached from the board 100 once it is coupled thereto. Thus, in some embodiments the male coupler 200 can be coupled to the board 100 without any adhesives such as glue and without having to weld the male coupler 200 to the board 100. The barbs 212 create a sufficient coupling between the male coupler 200 and the board 100 to prevent it from being detached from the board 100 once installed. Of course, an adhesive such as glue could be used in some embodiments if needed in a particular situation.

In the exemplified embodiment, each of the barbs 212 extends circumferentially around an outer surface of the cylindrical body 211 of the first portion 210 of the male coupler 200. Specifically, each of the barbs 212 extends annularly around the cylindrical body 211 of the first portion 211 of the male coupler 200. In the exemplified embodiment, there is at least one gap 215 provided in each of the barbs 212 which allows the barbs 212 to have a greater degree of deflection as the first portion 210 of the male coupler 200 is being couple to the board 100 as described further herein below. More specifically, in the exemplified embodiment there are two gaps 215 in each of the barbs 212 and the gaps in all of the barbs 212 are aligned in a direction of the axis A-A. The barbs 212 are arranged along the cylindrical body 211 in a vertically spaced apart manner. The exact number of the barbs 212 may be dictated by the length of the cylindrical body 211 and the spacing between the barbs 212 and is not to be limiting of the present invention in all embodiments.

In the exemplified embodiment, the first portion 210 of the male coupler 200 also comprises a cap portion 216 that extends from the cylindrical body 211 to the first end 201 and a lower cylindrical body 217 that extends from the cylindrical body 211 to the second portion 220. In the exemplified embodiment, both the cap portion 216 and the lower cylindrical body 217 have a greater diameter than the cylindrical body 211. The cap portion 216 and the lower cylindrical body 217 are devoid of any barbs.

In the exemplified embodiment, the second portion 220 of the male coupler 200 has an hourglass like shape and its shape forms the first engagement feature 250. The second portion 220 of the male coupler 200 extends from the second end 202 of the male coupler 200 to a shoulder 203, with the shoulder 203 extending radially from an end of the lower cylindrical body 217 of the first portion 210 of the male coupler 200. When the first portion 210 of the male coupler 200 is inserted into an opening in the board 100, abutment of the shoulder 203 of the second portion 220 of the male coupler 200 with the board 100 indicates that the male coupler 200 is in a fully inserted position. Thus, no portion of the second portion 220 of the male coupler 200 is located within the board 100 but the entirety of the first portion 210 of the male coupler 200 is located within the board 100 in some embodiments. In other embodiments, only portions of the first portion 210 of the male coupler 200 may be positioned within the board 100.

The second portion 220 of the male coupler 200 includes an upper portion 221 that is adjacent to the first portion 210 and that includes the shoulder 203 and a lower portion 222 that extends to the second end 202 of the male coupler 200. The upper and lower portions 221, 222 are angled so as to converge at a waist region 223 of the second portion 220 of the male coupler 200. The upper and lower portions 221, 222 extend away from the axis A-A and diverge from one another with increasing distance from the waist region 223. Stated another way, each of the upper and lower portions 221, 222 are in the shape of a truncated triangle such that they are each truncated at the waist region 223.

In the exemplified embodiment, the waist region 223 of the second portion 220 of the male coupler 200 forms the first engagement feature 250. Thus, the first engagement feature 250 in this embodiment comprises a groove, recess, or channel that engages or otherwise mates with an engagement feature of the female coupler 300 to facilitate the coupling of the male coupler 200 to the female coupler 300. More specifically, the first engagement feature 250 is the groove in combination with the angled sidewalls of the outer surface of the second portion 220 of the male coupler 200 as best seen in FIG. 3C. This also facilitates the coupling of a first board 100 to a second board 100 when the male and female couplers 200, 300 are coupled to the first and second boards 100, respectively. Of course, the invention is not to be limited to the first engagement feature 250 being a groove or the like. In other embodiments, the first engagement feature 250 may be a protuberance and the second engagement feature of the female coupler 300 may be a groove, recess, or channel that receives the protuberance.

Referring to FIGS. 4A-4F, the female coupler 300 will be described in accordance with an embodiment of the present invention. Similar to the male coupler 200, the female coupler 300 may also be formed from plastic, wood, metal, or the like, with nylon or glass filled nylon being one preferable but non-limiting material. The female coupler 300 may be formed or manufactured from injection molding, extrusion, 3D printing, or any other technique known in the art. The female coupler 300 should be formed of a material with sufficient strength to enable the male and female couplers 200, 300 to mate with one another to assemble an article of furniture as described herein. In the exemplified embodiment, the female coupler 300 has a substantially oval shape. However, the invention is not to be limited by the shape of the female coupler 300 in all embodiments and the female coupler 300 may take on any desired shape, such as being square, rectangular, or the like. As long as the female coupler 300 is capable of mating or otherwise interacting with the male coupler 200 to mechanically couple those two components together, the shape of the female coupler 300 is not to be limiting of the invention in all embodiments.

The female coupler 300 comprises a body portion 309 that extends from a first end 301 to a second end 302 along an axis B-B. The female coupler 300 is elongated along a longitudinal axis C-C. The body portion 309 has an outer surface 303 and an inner surface 304. Furthermore, a plurality of barbs 310 extend from the outer surface 303 of the female coupler 300 for coupling the female coupler 300 to one of the boards 100. The barbs 310 are positioned in a spaced apart manner and extend around the entirety of the outer surface 303 (i.e. the barbs 310 are annular, although there may be gaps similar to that which was discussed above with regard to the barbs 212 of the male coupler 200). Each of the barbs 310 has a top surface 311 and a bottom surface 312. The top surfaces 311 of the barbs 310 are obliquely angled relative to the axis B-B and the bottom surfaces 312 of the barbs 310 are angled perpendicularly relative to the axis B-B. Thus, as the female coupler 300 is inserted into an opening in one of the boards 100 with the first end 301 entering the opening first, the angled top surfaces 311 of the barbs 310 permit the female coupler 300 to be inserted while the perpendicular bottom surfaces 312 prevent the female coupler 300 from be readily removed/detached from the board 100.

The body portion 309 of the female coupler 300 comprises a flange 317 located at or adjacent to the second end 302. The flange 317 protrudes from the outer surface 303 of the body portion 309 and in the exemplified embodiment is a continuous, uninterrupted protrusion.

The female coupler 300 comprises a cavity 305 that extends along the axis B-B, which may also be referred to herein as the cavity axis B-B. The cavity 305 is defined by the inner surface 304. In the exemplified embodiment, the cavity 305 is open at each of the first and second ends 301, 302 of the female coupler 300. Thus, in the exemplified embodiment there is a first opening 318 in the first end 301 and a second opening 319 in the second end 302. As a result, the cavity 305 extends entirely through the body portion 309 of the female coupler 300. By having the cavity 305 open at both of the first and second ends 301, 302 of the body portion 309 of the female coupler 300, the female coupler 300 has an added flexibility which allows for the female coupler 300 to be slightly compressed when the female coupler 300 is inserted into an opening in a board. As will be described in more detail below, this facilitates creating a secure connection between the male and female couplers 200, 300. However, it should be noted that in some alternative embodiments the cavity 305 may be closed at one end and open at the other.

The cavity 305 comprises an insertion portion 306, a nesting portion 307, and a locking portion 308. The nesting portion 307 is positioned between the insertion portion 306 and the locking portion 308. Specifically, the nesting portion 307 extends from a first end 361 that is adjacent to the insertion portion 306 to a second end 362 that is adjacent to the locking portion 308. The insertion portion 306 is the portion of the cavity 305 within which the male coupler 200 is received during coupling of two boards 100 together. Specifically, the male coupler 200 is configured to fit through portions of the openings 318, 319 that are aligned with the insertion portion 306 of the cavity 305, but the male coupler 200 may not fit within portions of the openings 318, 319 that are aligned with the nesting and locking portions 307, 308 of the cavity 305.

The nesting portion 307 is the portion of the cavity 305 within which the male coupler 200 first becomes coupled to the female coupler 300 in the sense that the male coupler 200 cannot be removed axially from the cavity 305 when it is in the nesting portion 307. (i.e., the male coupler 200 becomes locked to the female coupler 300 in the axial direction (i.e., in the direction of the axes A-A, B-B). The locking portion 308 of the cavity 305 is the end of the cavity 305 that is opposite the insertion portion 306 and it is located where the sidewalls of the cavity 305 (or the inner surface 304) begin to curve into a semicircular shape.

The female coupler 300 comprises a second locking feature 370 that is configured to mate or otherwise interact with the first locking feature 250 of the male coupler 200 to couple the male coupler 200 to the female coupler 300. In the exemplified embodiment, the second locking feature 370 is a protuberance. Specifically, in the exemplified embodiment the inner surface 304 of the female coupler 300 comprises a protuberance 350 that has a shape that corresponds with the shape of the outer surface of the male coupler 200 along the second portion 220 of the male coupler 200. Specifically, the inner surface 304 of the female coupler 300 comprises a first portion 320 and a second portion 321 that are angled relative to the axis B-B so as to converge at a middle portion 322. In the exemplified embodiment, the middle portion 322 forms an apex of the protuberance 350. The first and second portions 320, 321 diverge from one another and from the axis B-B with increasing distance from the middle portion 322. Thus, the nesting portion 307 of the cavity 305 has an hourglass-like cross-sectional shape (best shown in FIG. 4E) that is similar to the hourglass-like shape of the second portion 220 of the male coupler 200. Thus, the middle portion or apex 322 of the protrusion 350 forms the second locking feature 370 and it nests within the groove of the waist portion 223 of the second portion 220 of the male coupler 200 to couple those two components together.

As seen, the first portion 320 lies on a first plane P1 and the second portion 321 lies on a second plane P2. The first and second planes P1, P2 intersect one another at an obtuse angle at the apex 322. Furthermore, each of the first and second planes P1, P2 intersects the cavity axis B-B at a location that is external to the cavity 305. Moreover, a distance D1 between the apex 322 of the protuberance 350 and the top end 302 of the female coupler 300 is constant along the nesting portion 307 of the cavity 305. Thus, the apex 322 lies on a third plane P3 and the top end 302 of the female coupler 300 lies on a fourth plane P4 that is parallel to the third plane P3. Thus, the apex 322 is not angled downwardly or upwardly as it moves along the nesting portion 307 of the cavity 305, but rather it is at a constant height along the inner surface 304 of the female coupler 300.

Figure 4A:
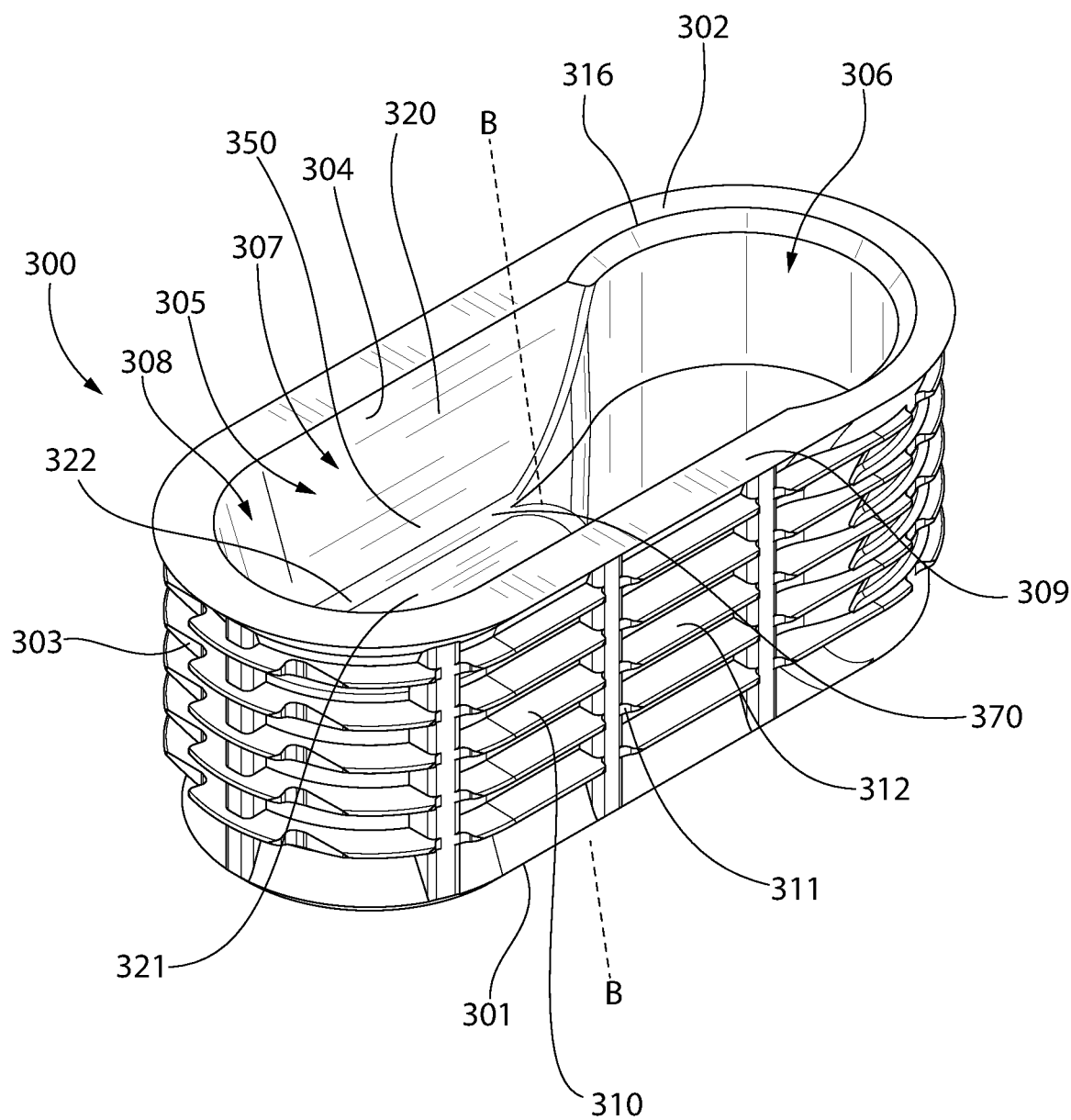
Figure 4B:
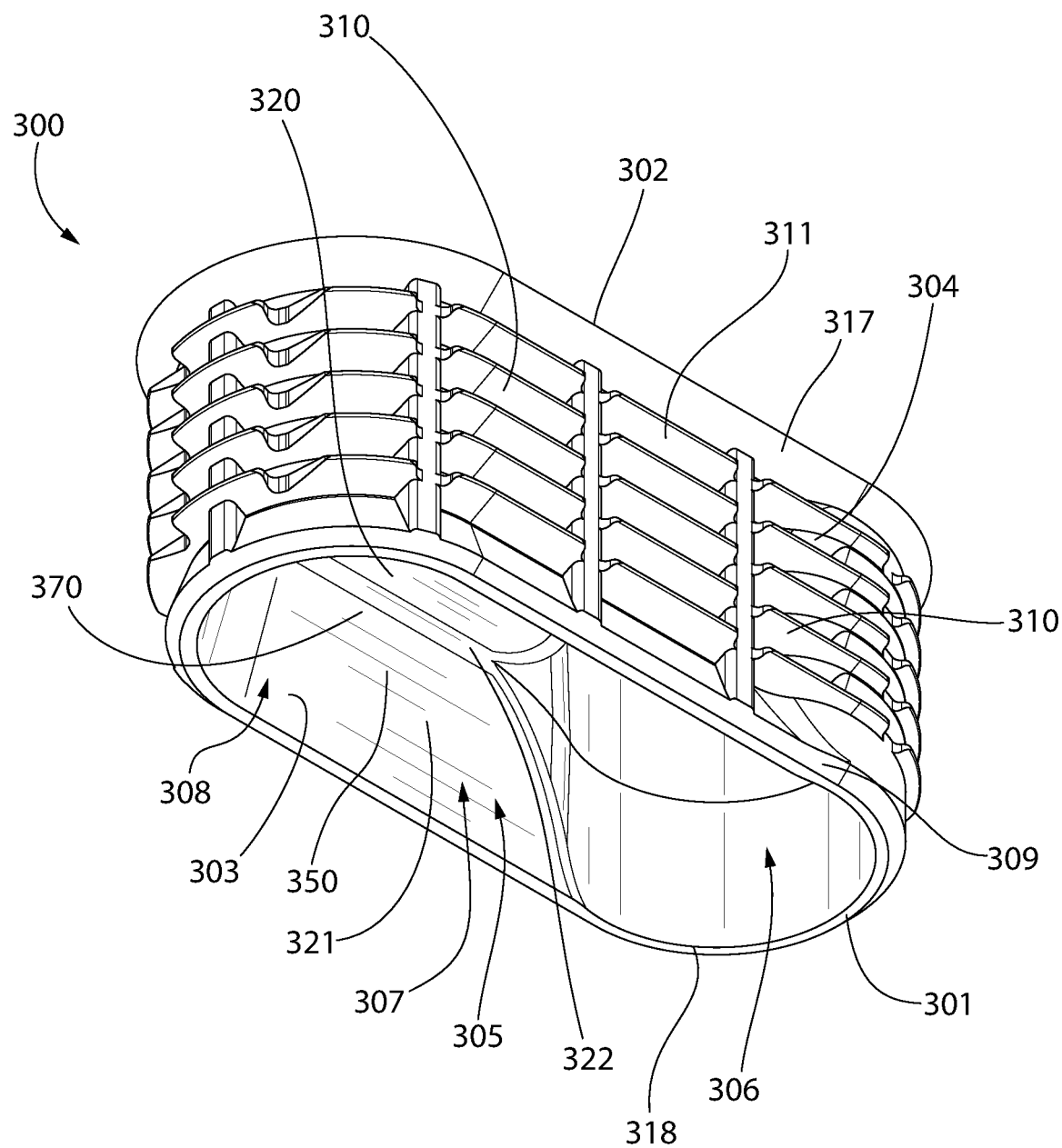
Figure 4C:
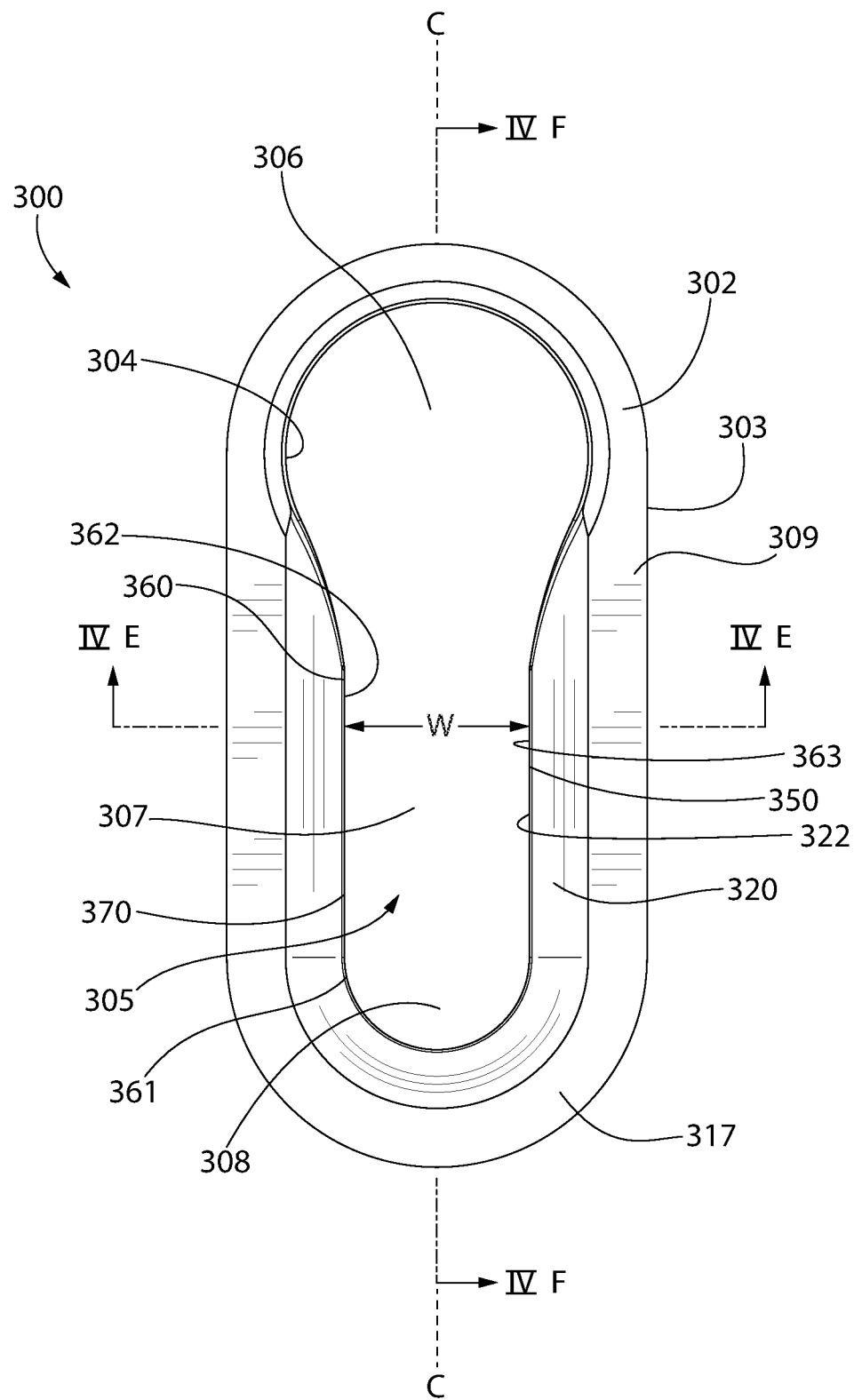
Figure 4F:
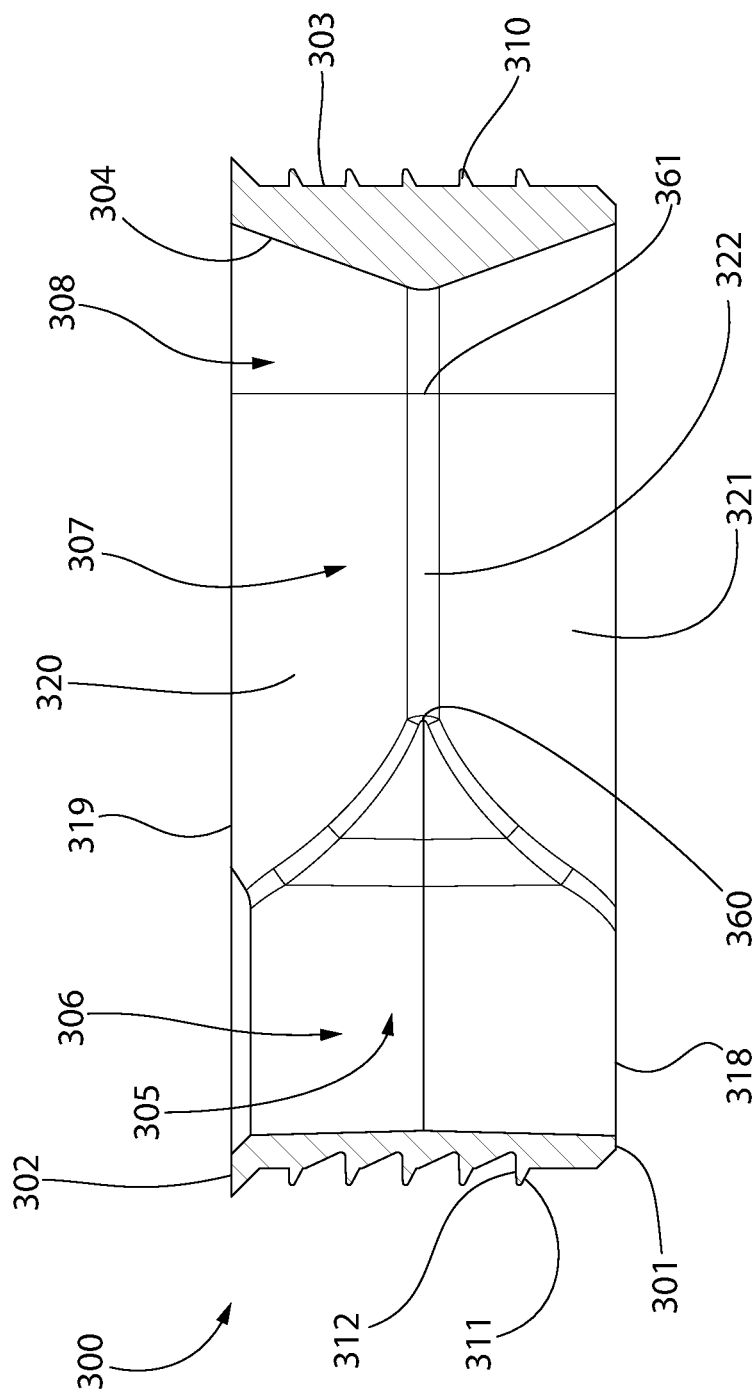
FIG. 4F is a cross-sectional view taken along line IVF-IVF of FIG. 4C.

As best seen in FIG. 4C, the inner surface 304 of the female coupler 300 comprises a first portion 362 located on a first side of the longitudinal axis C-C and a second portion 363 located on a second side of the longitudinal axis C-C. When in a non-compressed state (i.e., when not coupled to the board 100), the first and second portions 362, 363 of the inner surface 304 located along the nesting portion 307 of the cavity 305 are parallel to one another. Thus, the width W of the nesting portion 307 of the cavity 307 (measured at the apex 322) is constant along the nesting portion 307 of the cavity 305.

Referring briefly to FIG. 5, the female coupler 300 is illustrated in a compressed state. It should be appreciated that in some embodiments, when the female coupler 300 is inserted into an aperture in a board, the board may slightly compress the female coupler, which may alter the relative orientation of the first and second portions 362, 363 of the inner surface 304 of the female coupler 300. Although FIG. 5 illustrates the female coupler 300 by itself, this is done for clarity. It should be appreciated that FIG. 5 illustrates the female coupler 300 as it appears when it is coupled to one of the boards, although the compressive appearance may be slightly exaggerated in FIG. 5 for ease of understanding. A comparison between FIGS. 4C and 5 readily illustrates how the compressive forces of the board acting on the female coupler 300 adjust its structure and shape.

Specifically, the compressive forces F press on the outer surface of the female coupler 300 and cause portions of the female coupler 300 to deflect inwardly towards the cavity 305. More specifically, the compressive forces F of the board cause portions of the nesting portion 307 of the cavity 305 to deflect inwardly. As a result, when the female coupler 300 is installed in one of the boards as described in greater detail below with reference to FIGS. 6A-6D, the width W of the nesting portion 307 of the cavity 305 is no longer constant along the entirety of the nesting portion 307 of the cavity 305. Rather, the width W of the cavity 305 measured in a direction transverse to the longitudinal axis C-C increases from a first end 360 of the nesting portion 307 that is adjacent to the insertion portion 306 to a second end 361 of the nesting portion 307 that is adjacent to the locking portion 308. Thus, the width W of the nesting portion 307 of the cavity 305 is at a minimum at the first end 360 and at a maximum at the second end 361. Stated another way, the first portion 362 of the inner surface 304 located on the first side of the longitudinal axis C-C and the second portion 363 of the inner surface 304 located on the second side of the longitudinal axis C-C diverge from one another along the nesting portion 307 of the cavity 305 moving from the insertion portion 306 towards the locking portion 308.

In the exemplified embodiment, the first end 360 of the nesting portion 307 is the location within the cavity 305 where the cavity 305 has the smallest width aside from the opposing ends of the cavity 305. Specifically, the ends of the cavity 305 are rounded so clearly the width could be taken at some position along the ends where it is smaller than the width at the first end 360 of the nesting portion 307. Thus, with the opposing ends of the cavity 305 excluded, the portion of the cavity 305 with the smallest width marks the first end 360 of the nesting portion 307 in the exemplified embodiment. To be more specific, the first and second ends of the cavity 305 may each comprise approximately one-tenth of the length of the cavity 305 (with the length being measured in a direction of the longitudinal axis C-C), and the first end 360 of the nesting portion 307 may be located at the portion of the cavity 305 with the smallest width that is outside of the first and second ends. Stated another way, the nesting portion 307 of the cavity 305 may be the portion of the cavity 305 where the sidewalls 304 on opposing sides of the longitudinal axis C-C continually diverge from one another As a result, the first end 360 of the nesting portion 307 of the cavity 305 forms a sort of snap-over feature such that when the male coupler 200 is being coupled to the female coupler 300, the male coupler must be moved past the first end 360 of the nesting portion 307 with a sufficient force to overcome the interference created between the walls of the female and male couplers 200, 300. To disengage decouple the male coupler 200 from the female couplers 300, this must occur in reverse, which makes it unlikely that the male and female couplers 200, 300 will become detached accidentally without user intention.

During assembly, the second portion 220 of the male coupler 200 is received within the insertion portion 306 of the cavity 305 of the female coupler 300. Specifically, the second portion 220 of the male coupler 200 is inserted through the opening 319 in the second end 302 of the body portion 309 of the female coupler 300. The male coupler 200 is unable to be received directly within the nesting and locking portions 307, 308 of the cavity 305 because the cross-sectional shape of the second end 202 of the male coupler 200 does not fit into the opening 319 along the nesting and locking portions 307, 308 (i.e., the cross-sectional shape of the second end 202 of the male coupler 200 does not fit into the cross-sectional shape at the open ends of the cavity 305 along the nesting and locking portions 307, 308). Rather, the only way to position the male coupler 200 within the nesting and locking portions 307, 308 of the cavity 305 is to insert the male coupler 200 into the insertion portion 306 of the cavity 305 and then slide the male coupler 200 in a direction generally perpendicular to the axes A-A, B-B until it enters into the nesting and locking portions 307, 308 of the cavity 305.

Once the male coupler 200 is located within the nesting portion 307 of the cavity 305, the inner surface 304 of the female coupler 300 (i.e., the protuberance 350) engages/interacts with the outer surface of the second portion 220 of the male coupler 200 to couple the male and female couplers 200, 300 together. When the second portion 220 of the male coupler 200 is located within the nesting portion 307, the male coupler 200 cannot be moved axially (i.e, in the direction of the axes A-A, B-B) relative to the female coupler 300. This occurs due to the shape of the outer surface of the second portion 220 of the male coupler 200 and the shape of the inner surface 304 (i.e., wall) of the female coupler 300 being corresponding shapes. Rather, to disengage the male coupler 200 from the female coupler 300, the second portion 220 of the male coupler 200 must first be slid back to the insertion portion 306 of the cavity 305, and then the male coupler 200 can be moved axially relative to the female coupler 300 to detach the male coupler 200 from the female coupler 300. This process of coupling the male coupler 200 to the female coupler 300 and the resulting structure is best illustrated in FIGS. 6A-8B, described below.

Figure 4G:
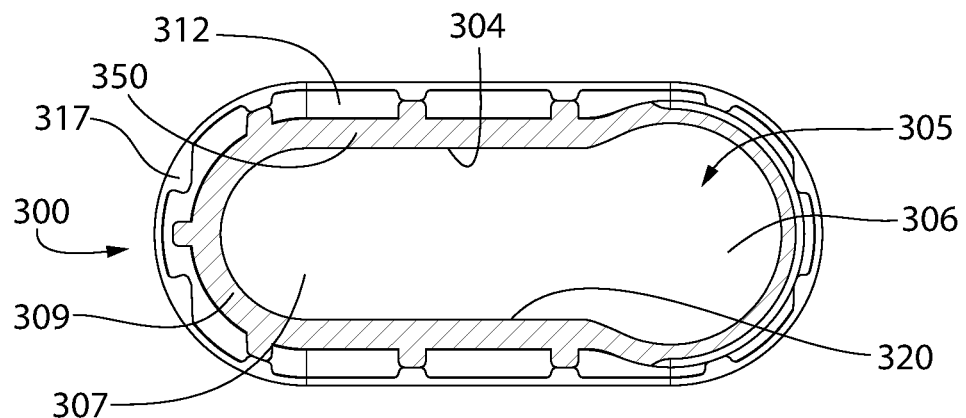
FIG. 4G is a cross-sectional view taken along line IVG-IVG of FIG. 4D.
Figure 4H:
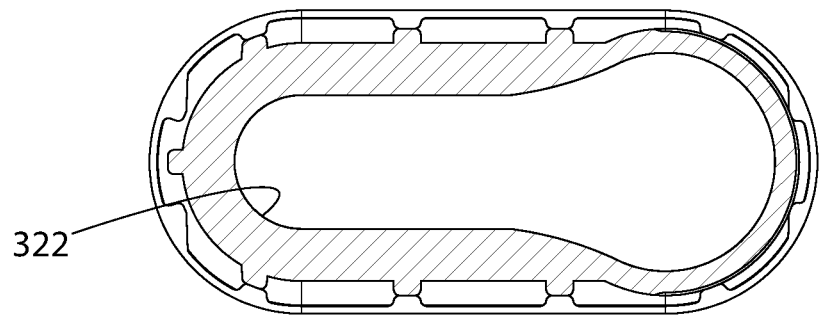
FIG. 4H is a cross-sectional view taken along line IVH-IVH of FIG. 4D.
Figure 4I:
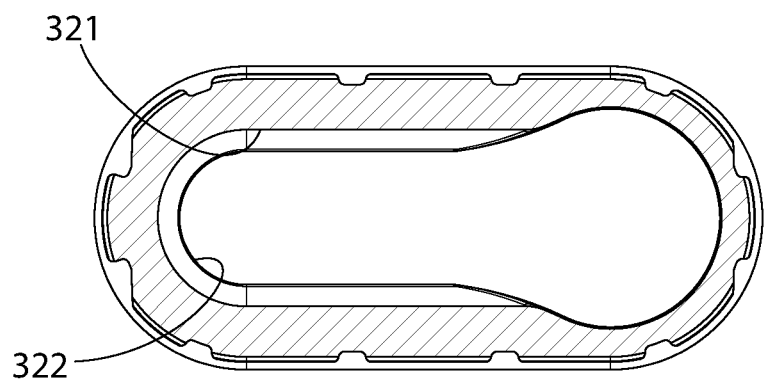
FIG. 4I is a cross-sectional view taken along line IVI-IVI of FIG. 4D.

Referring briefly to FIGS. 4G-4I, cross-sectional views of the female coupler 300 are provided at different axial locations therealong to show the differences in structure and shape of the inner surface 304 at different positions of the female coupler 300.

Figure 6A:
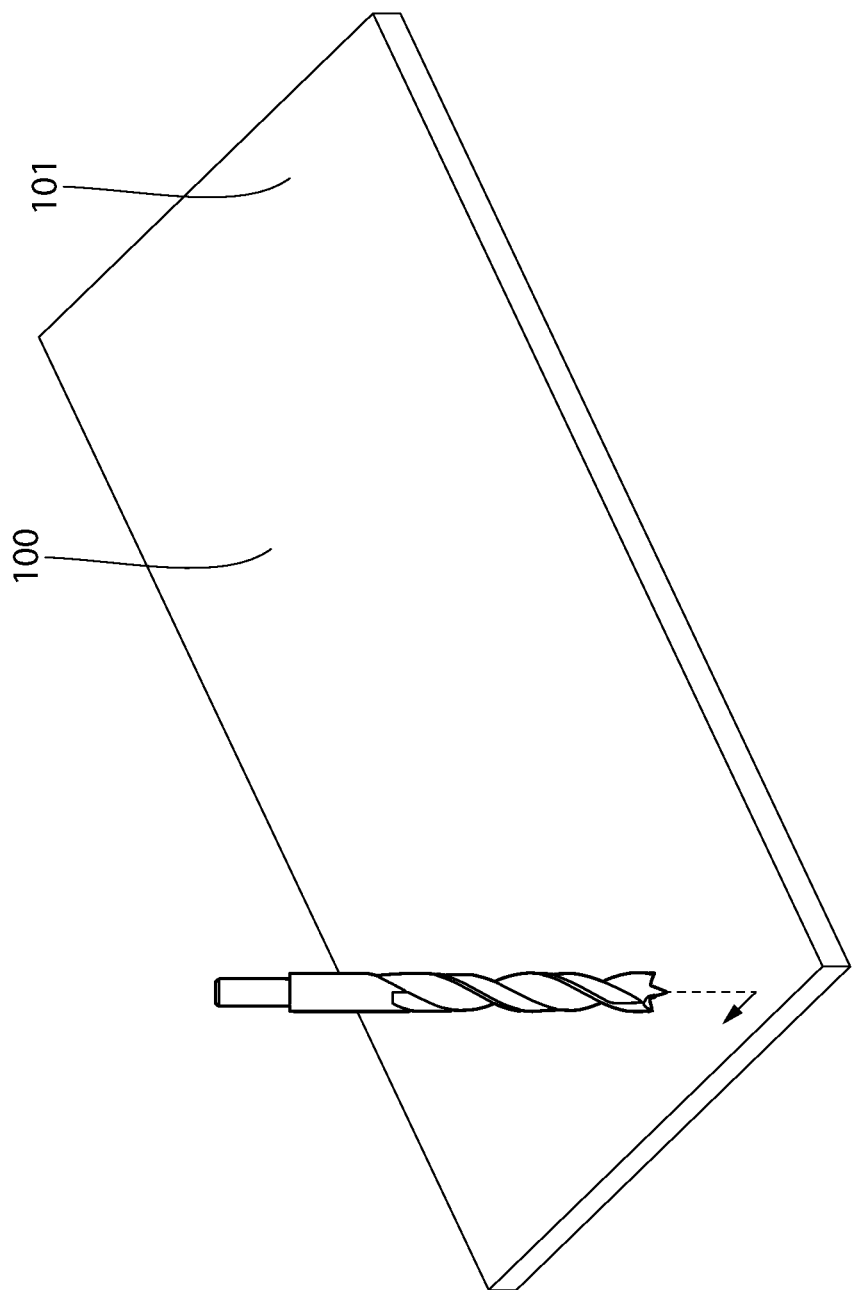
FIGS. 6A-6H illustrate the process of coupling the male and female couplers to the furniture part, in accordance with an embodiment of the present invention.
Figure 6B:
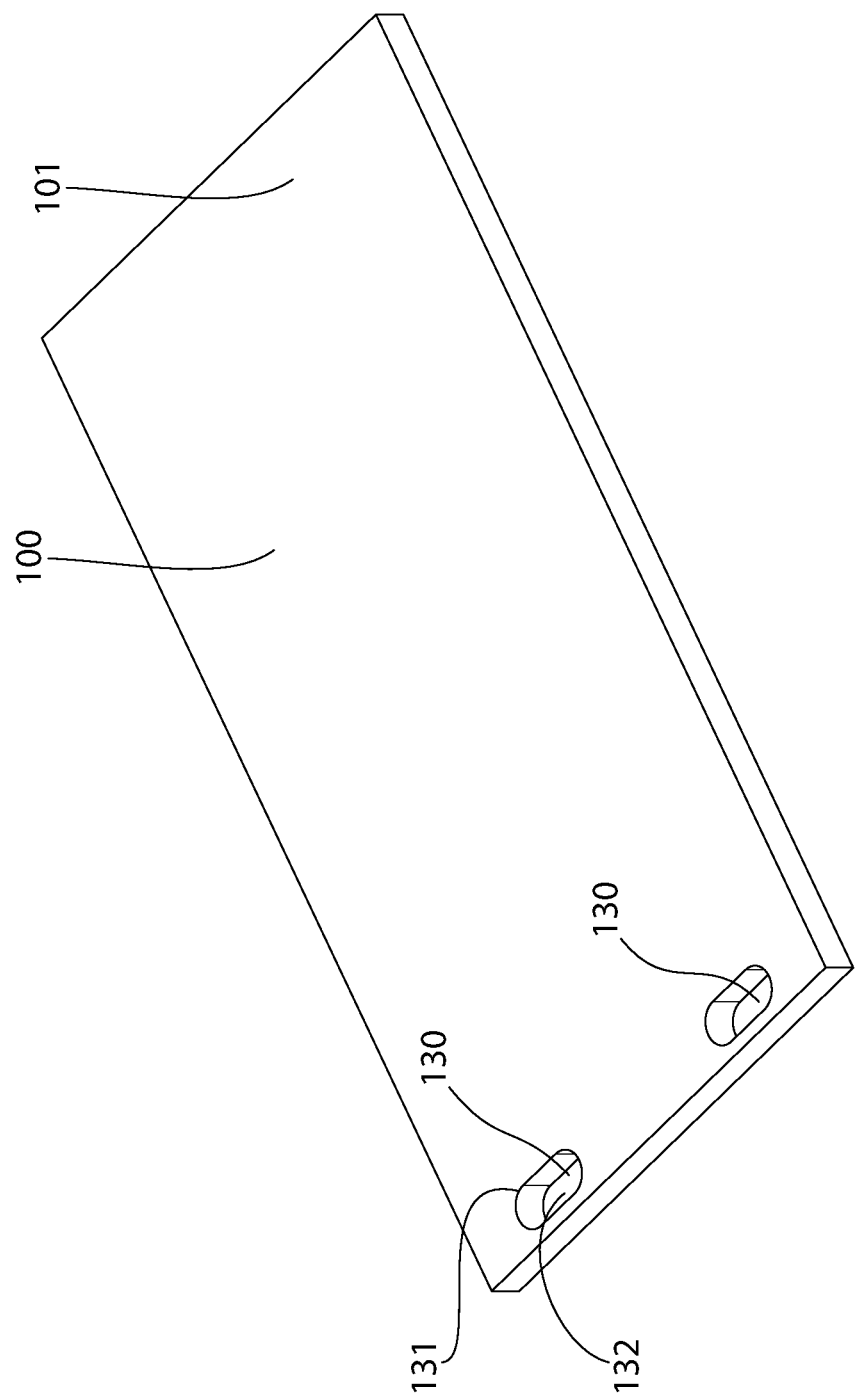

Referring to FIGS. 6A-6H, the process of attaching the male and female couplers 200, 300 to the board 100 will be described. It should be appreciated that this process is generally completed by the manufacturer or factory so that this process is not something that a consumer or end user will likely need to do. First, as shown in FIGS. 6A and 6B, one or more first apertures 130 are formed into the board 100 for receiving the female couplers 300. The first apertures 130 are preferably blind holes, meaning they do not extend through both of the front and rear surfaces 101, 102 of the board 100, but rather they have an opening 131 at one of the front and rear surfaces 101, 102 and a floor 132 adjacent to the other of the front and rear surfaces 101, 102. However, it is possible in other embodiments for the first apertures 130 to extend entirely through the board 100 without affecting the function described herein. The first apertures 130 may be formed using a drill bit, router, or the like. In the exemplified embodiment, the first apertures 130 are oval in shape to match the shape of the female couplers 300. The first apertures 130 may have a different shape but it should correspond to the shape of the female couplers 300 to ensure a tight/snug fit between the female couplers 300 and the board 100. In some embodiments, the first apertures 130 may be slightly smaller than the female couplers 300 so that the board 100 applies a slight inward compressive force/pressure on the female couplers 300 as described herein above, although this is not required in all embodiments.

Figure 6C:
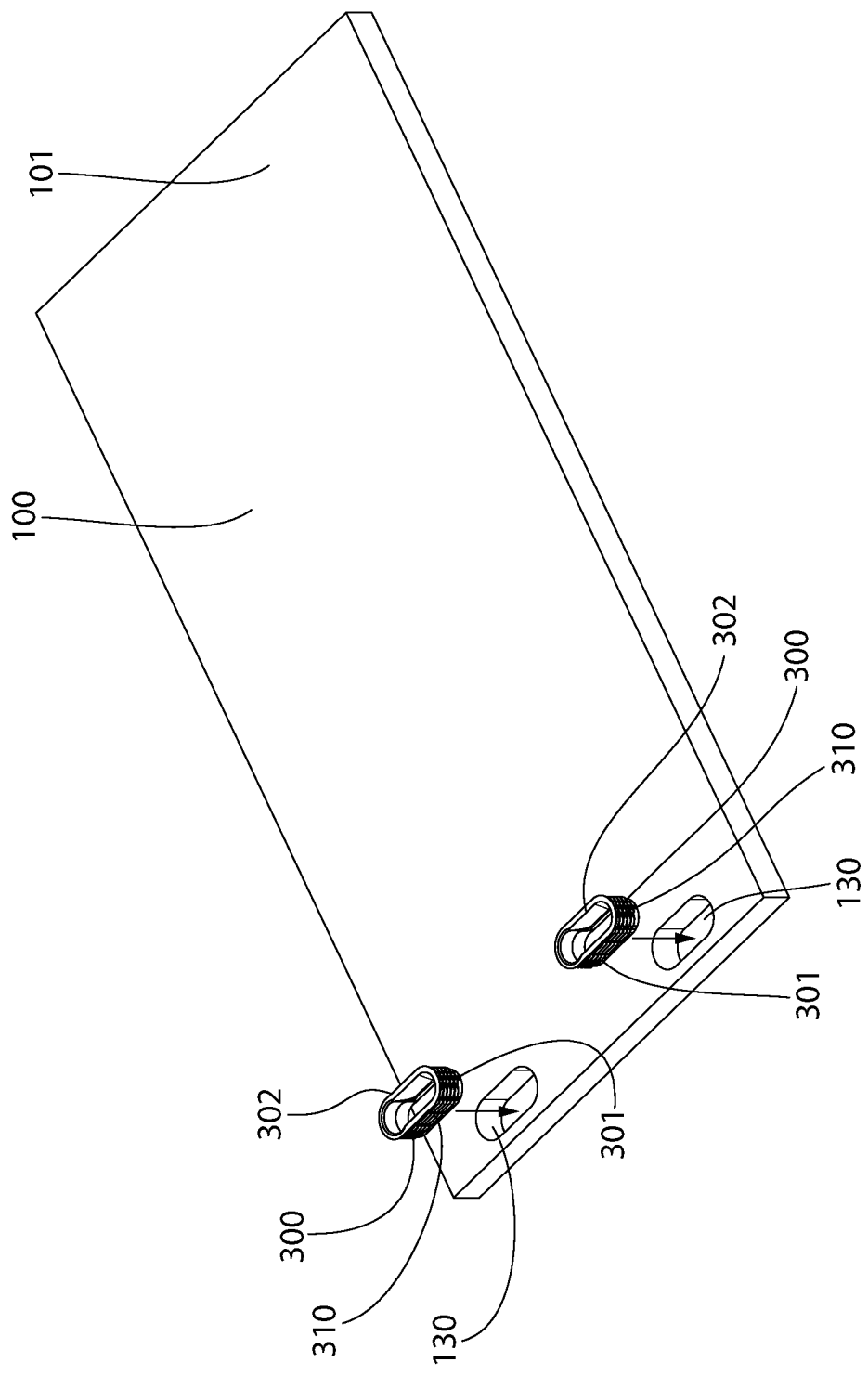
Figure 6D:
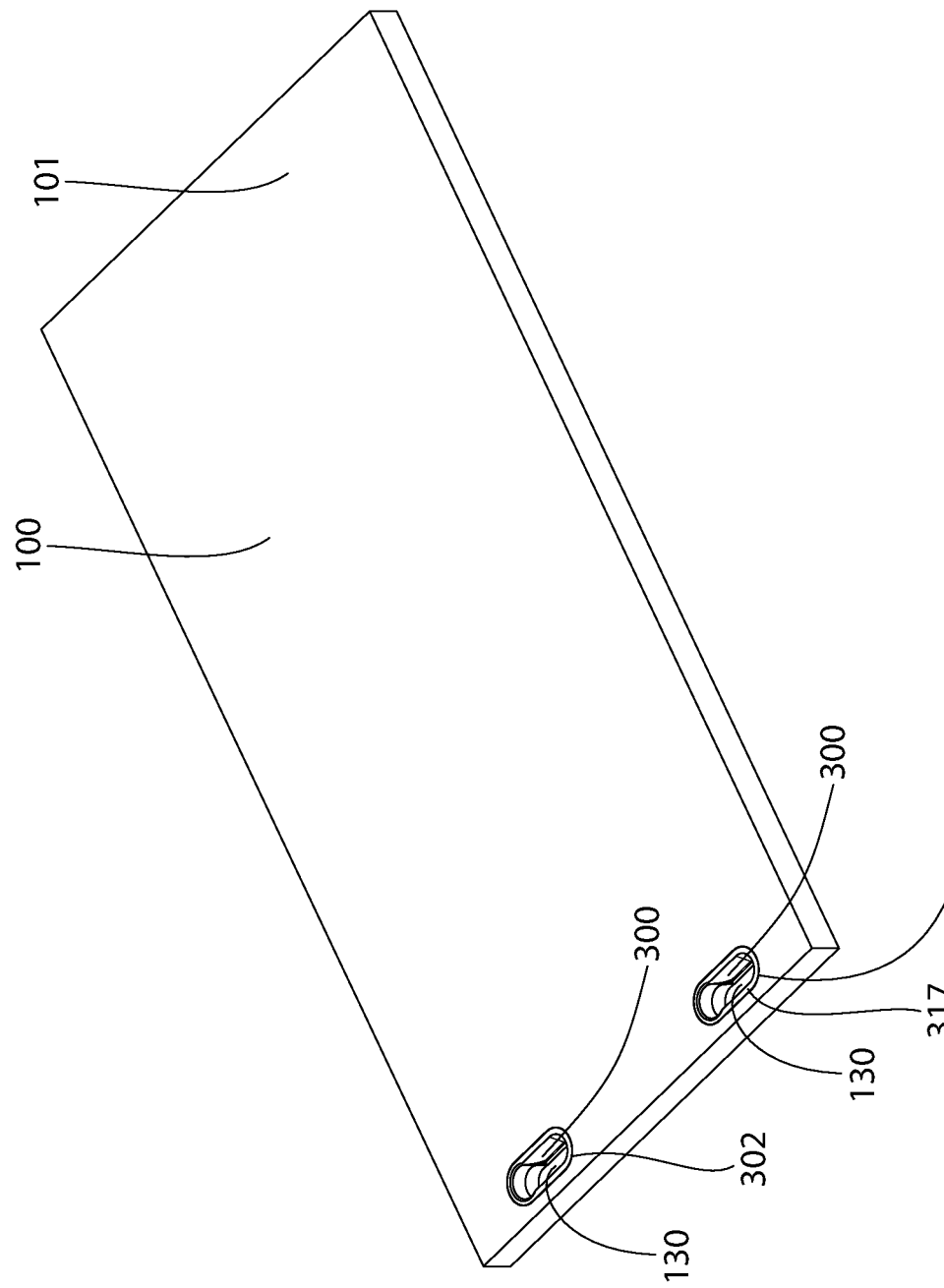

Next, referring to FIGS. 6C and 6D, the female couplers 300 are inserted into the first apertures 130 formed in the board 100. The female couplers 300 are positioned with the first ends 301 facing the front surface 101 of the board 100 and then each of the female couplers 300 is moved towards and into one of the first apertures 130. Once the female couplers 300 are fully positioned in the first apertures 100, the second ends 302 of the female couplers 300 are flush with the front surface 101 of the board 100. Specifically, the apertures 130 may include a recessed ledge on which the flanges 317 of the female couplers 300 nest so that the flanges 317 are flush with the front surface 101 (or other surface that the apertures 130 may be formed into) of the board 100. Of course, the second ends 302 of the female couplers 300 could be recessed relative to the front surface 101 of the board 100 in other embodiments, but the second ends 302 of the female couplers 300 should not protrude from the front surface 101 of the board 100. The barbs 310 of the female couplers 300 prevent the female couplers 300 from being detached from the board 100 or otherwise being removed from the first apertures 130. Specifically, the barbs 310 are angled in such a manner that they do not prevent insertion of the female couplers 300 into the apertures 130, but they make it difficult or impossible to remove the female couplers 300 therefrom without damaging the board 100. An assembler may need to use a mallet, hammer, or other tool to assist in inserting the female couplers 300 into the first apertures 130.

As noted above, the apertures 130 may be sized slightly smaller than the external diameter or width of the female couplers 300. As a result, the sidewall defining the apertures 130 may apply pressure onto the exterior of the female couplers 300, thereby causing the female couplers 300 to compress. This may decrease the size of the cavity 305 to create a tighter fit between the male and female couplers 200, 300.

Figure 6E:
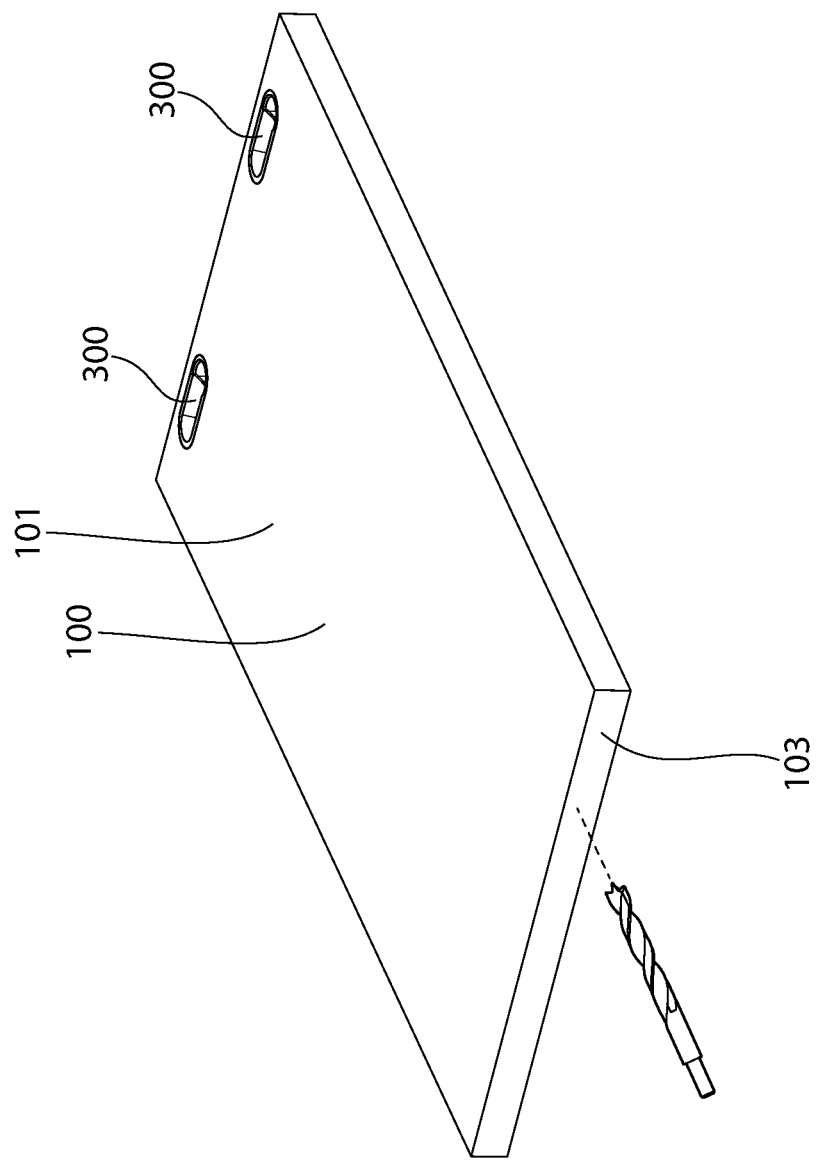
Figure 6F:
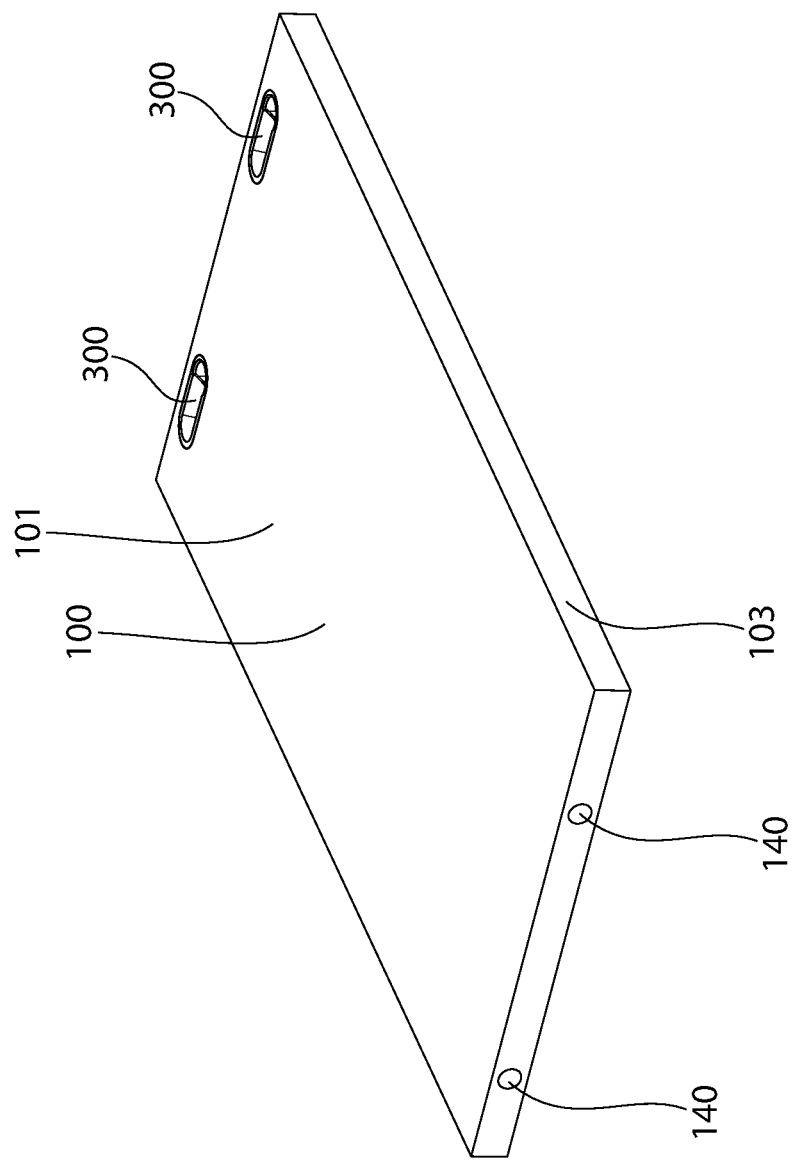

Next, referring to FIGS. 6E and 6F, second apertures 140 are formed into a portion of the edge 103 of the board 100. This can be done using a drill bit, a router, or the like. The holes 140 are blind holes in that they have a floor rather than extending entirely through the board 100. In the exemplified embodiment, the second apertures 140 are round/circular or cylindrical in shape to match the shape of the second portions 220 of the male couplers 200.

Figure 6G:
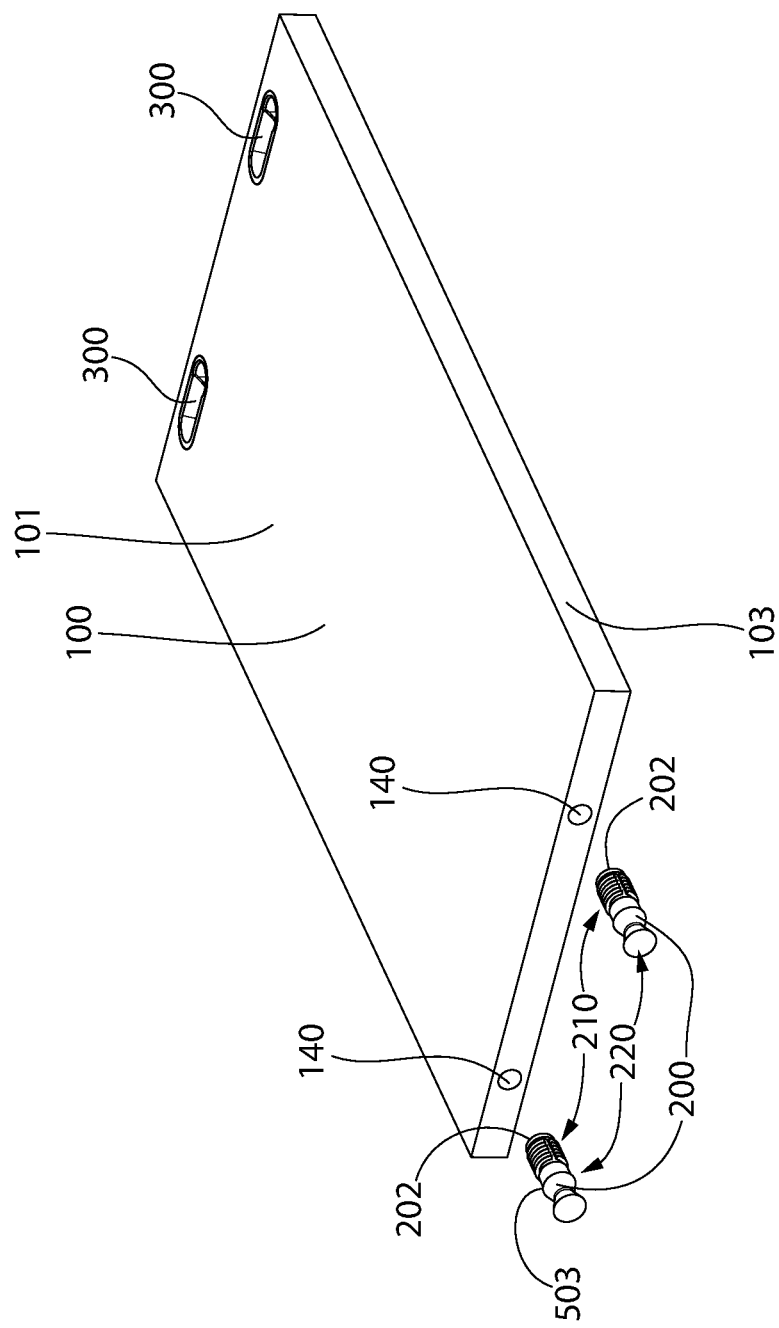
Figure 6H:
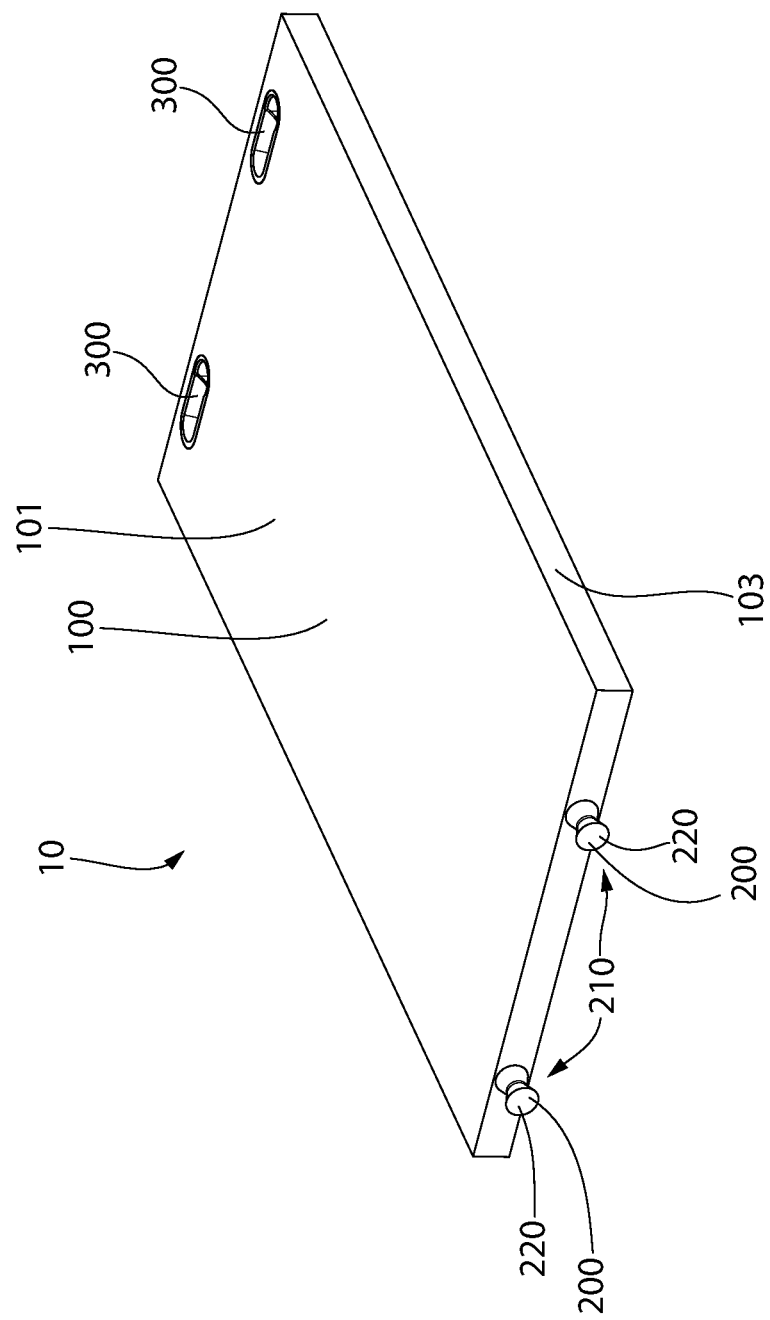

Next, referring to FIGS. 6G and 6H, the process of coupling the male couplers 200 to the board 100 within the second apertures 130 is illustrated. The second ends 202 of the male couplers 200 are aligned with the second apertures 140 and then the male couplers 200 are inserted axially (i.e., in the direction of its axis A-A) into the second apertures 140 until the shoulders 203 of the male couplers 200 contact the board 100. The barbs 212 bend and flex to enable the male couplers 200 to be inserted into the second apertures 140, but the barbs 212 substantially prevent the male couplers 200 from being removed from the second apertures 140 and detached from the board 100 after attachment thereto. An assembler may need to use a tool to assist in inserting the male and female couplers 200, couplers 300) into their respective openings 130, 140. For example, an assembler may use a hammer, a mallet, or the like in this step of the assembly process. Alternatively, the male and female couplers 200, 300 may be coupled to the board 100 by a machine.

As shown in FIG. 6H, when the male couplers 200 are coupled to the board 100, the first portions 210 (not visible in FIG. 6H) of the male couplers 200 are located entirely within the second apertures 140 and the second portions 220 of the male couplers 200 protrude from the edge 103 of the board 100 (or whichever surface of the board the male couplers 200 are attached to). Thus, the second portions 220 of the male couplers 200 are available and ready to be inserted into the female couplers 300 that are coupled to another board 100. FIG. 6H illustrates a completed furniture part 10 that includes the board 100, two of the male couplers 200, and two of the female couplers 300 (although all are not needed to make a completed furniture part 10 in all embodiments as described herein above).

Although in the exemplified embodiment the female couplers 300 are coupled to the board 100 and then the male couplers 200 are coupled to the board 100, the order in which this occurs during the manufacturing process is not limiting of the present invention. In some embodiments, the first and second apertures 130, 140 may all be formed into the board 100, and then the male and female couplers 200, 300 may be coupled to the board 100. In other embodiments, the male couplers 200 may be coupled to the board 100 before the female couplers 300 are coupled to the board 100. The order in which the male and female couplers 200, 300 are coupled to the board 100 makes no difference in the functionality of the device/system. In still other embodiments, the furniture part 10 may comprise the board 100 and one or more of the female couplers 300 but none of the male couplers 200. In another embodiment, the furniture part may comprise the board 100 and one or more of the male couplers 200 but none of the female couplers 300. Thus, depending on the needs of a particular furniture part for the assembly of an article of furniture, the number and types of the couplers (i.e., male and female couplers 200, 300) may be modified.

Figure 7A:
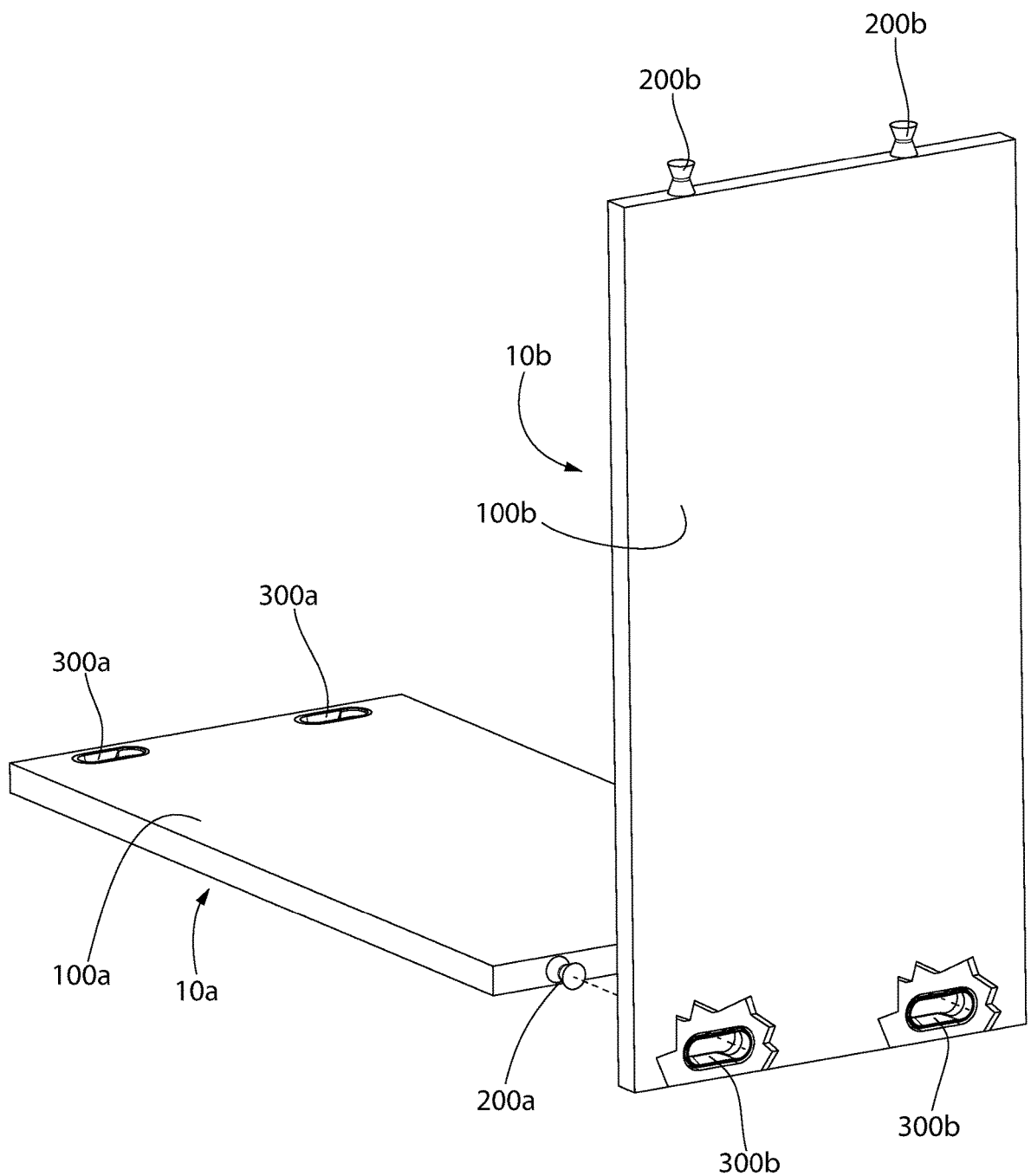
FIGS. 7A-9B illustrate the process of coupling two distinct furniture parts together via mating between the male and female couplers attached thereto with FIGS. 7B, 8B, and 9B being schematic cross-sectional views of FIGS. 7A, 8A, and 9A, respectively.
Figure 7B:
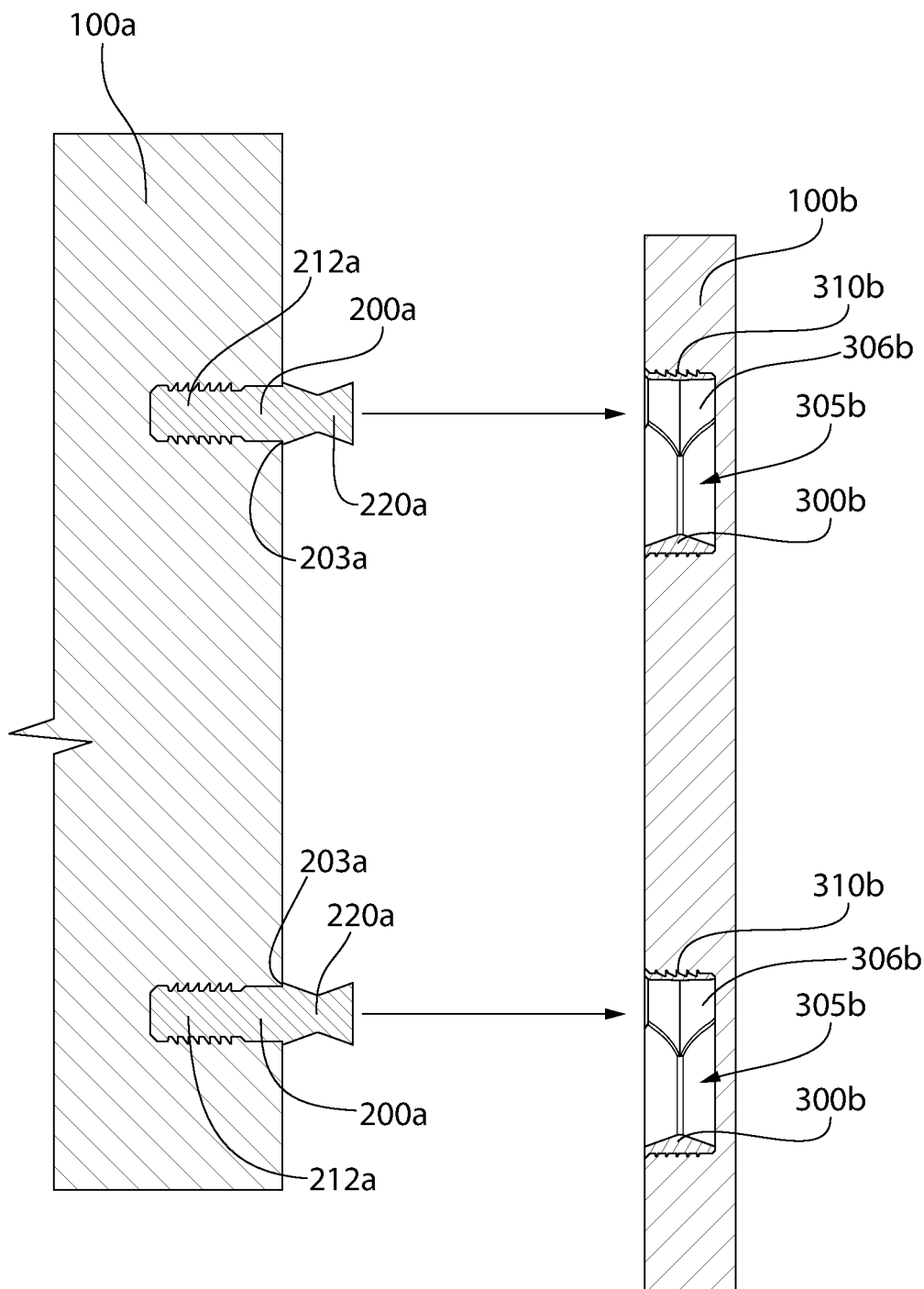

FIGS. 7A and 7B illustrate a first furniture part 10a and a second furniture part 10b aligned in preparation for coupling those two furniture parts 10a, 10b together. The first furniture part 10a comprises a first board 100a, two of the male couplers 200a, and two of the female couplers 300a. The second furniture part 10b comprises a second board 100b, two of the male couplers 200b, and two of the female couplers 300b. Of course, the first furniture part 10a could omit the female couplers 300a, 300b and the second furniture part 10b could omit the male couplers 200b, 200b in some embodiments.

In this embodiment, the male couplers 200a of the first furniture part 10a mate, interact, or engage with the female couplers 300b of the second furniture part 10b to couple the first and second furniture parts 10a, 10b together. FIGS. 7A and 7B illustrate the male and female couplers 200a, 300b aligned in preparation for being coupled together. The second portions 220a of the male couplers 200a protrude from the board 100a and are aligned with the cavities 305b (specifically, the insertion portions 306b of the cavities 305b) of the female couplers 300b that are coupled to the board 100b. As best seen in FIG. 7B, the barbs 212a, 310b ensure that the male and female couplers 200a, 300b remain coupled to the boards 100a, 100b. Furthermore, the shoulder 203a of the male couplers 200a prevents the second portions 220a of the male couplers 200a from being inserted into the apertures in the board 100a.

Figure 8A:
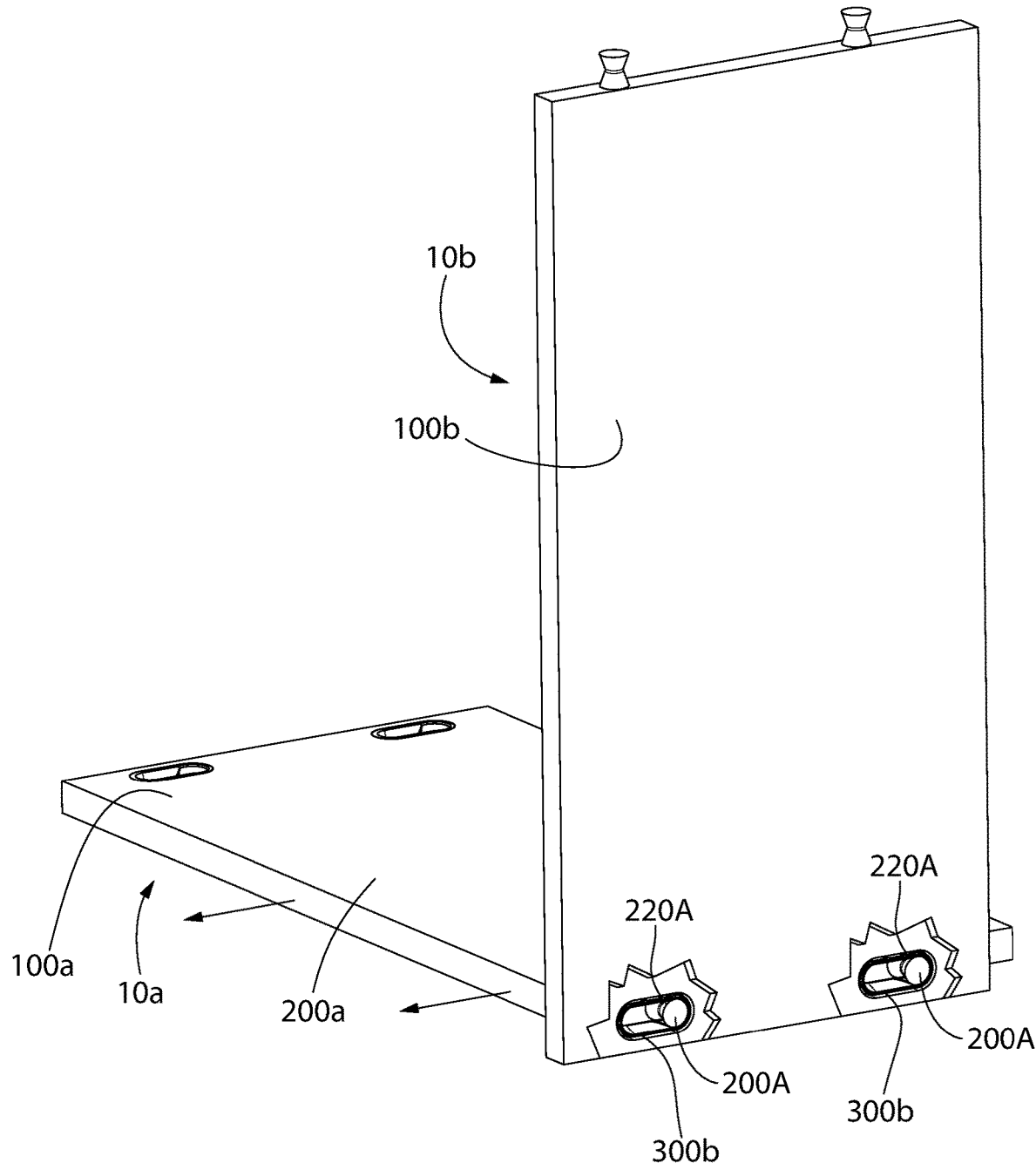
Figure 8B:
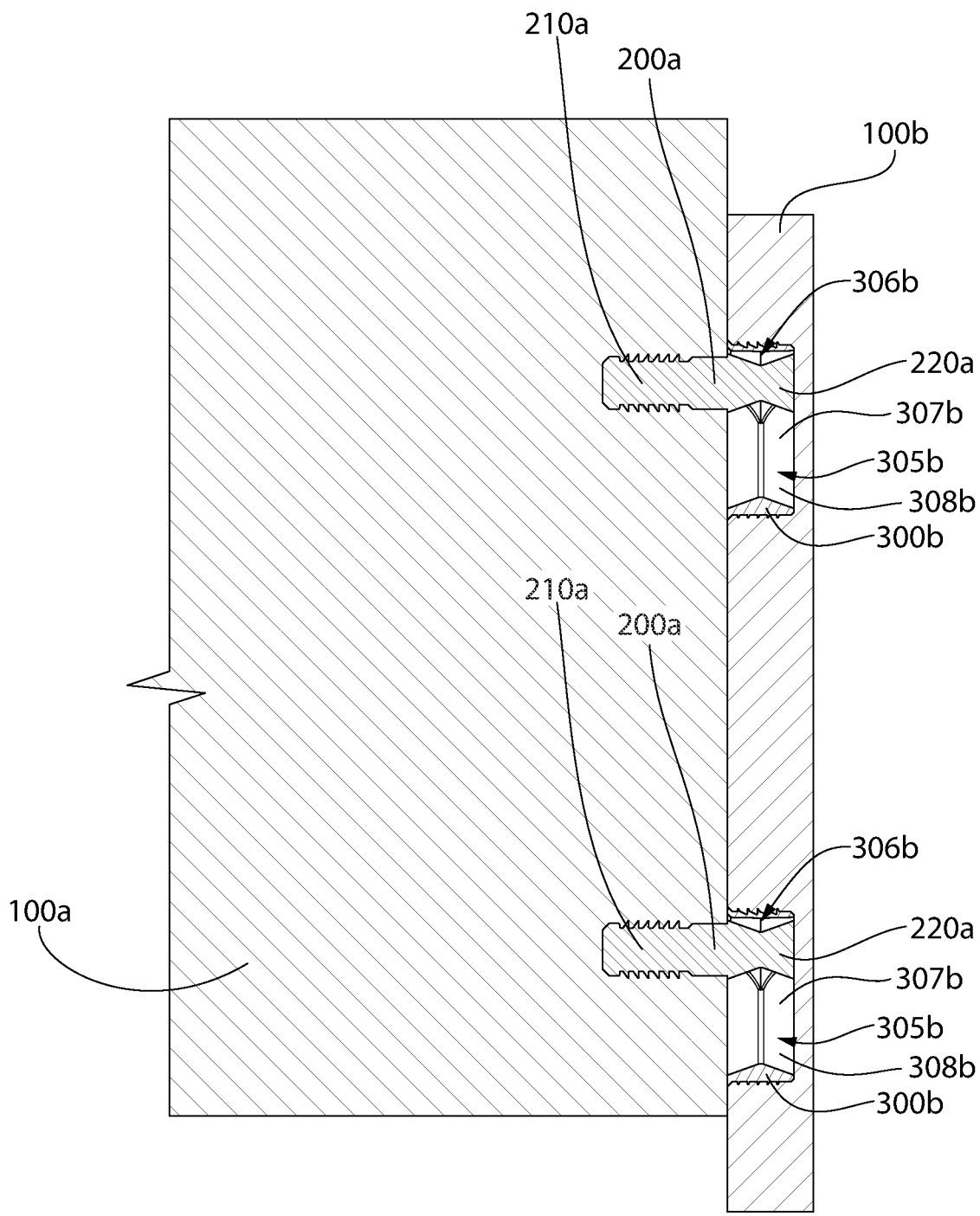

Referring to FIGS. 8A and 8B, the first and second furniture parts 10a, 10b are moved towards one another until the second portions 220a of the male couplers 200a that are coupled to the first board 100a enter into the insertion portions 306 of the cavities 305b of the female couplers 300b that are coupled to the second board 100b. At this point, the male and female couplers 200a, 300b are not locked together and the first board 100a can be readily moved away from the second board 100b. It is not until the male couplers 200a slide into the nesting portion 307b of the female couplers 300b that the male and female couplers 200a, 300b, and hence also the first and second furniture parts 10a, 10b, become locked to one another. This is because the cross-sectional shape of the insertion portion 306b of the cavities 305b is different than the cross-sectional shape of the nesting portion 307b of the cavities 305b. Specifically, the nesting portion 307b has a cross-sectional shape that corresponds with the cross-sectional shape of the second portion 220a of the male couplers 200a, but the insertion portion 306b has no such cross-sectional shape.

Figure 9A:
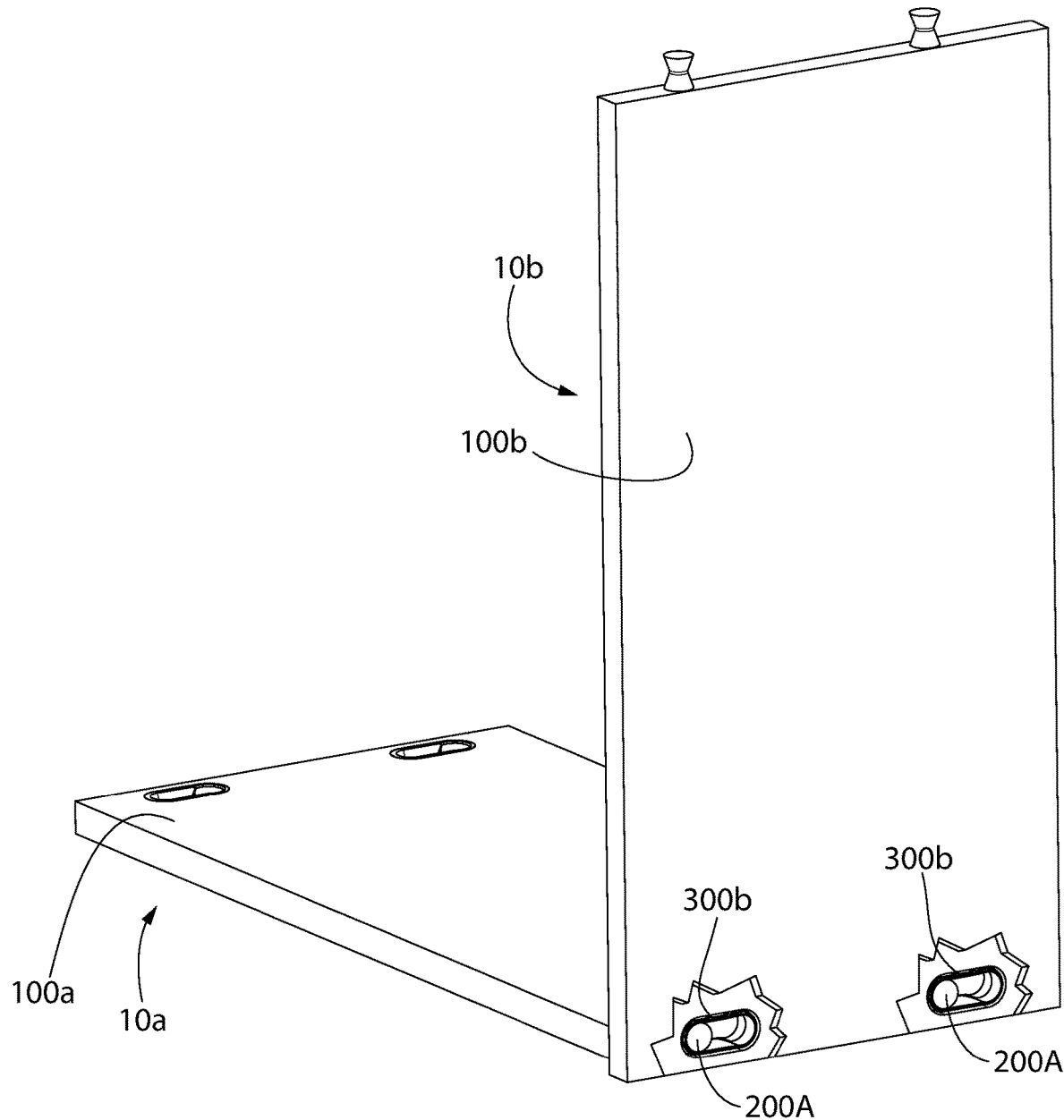
Figure 9B:
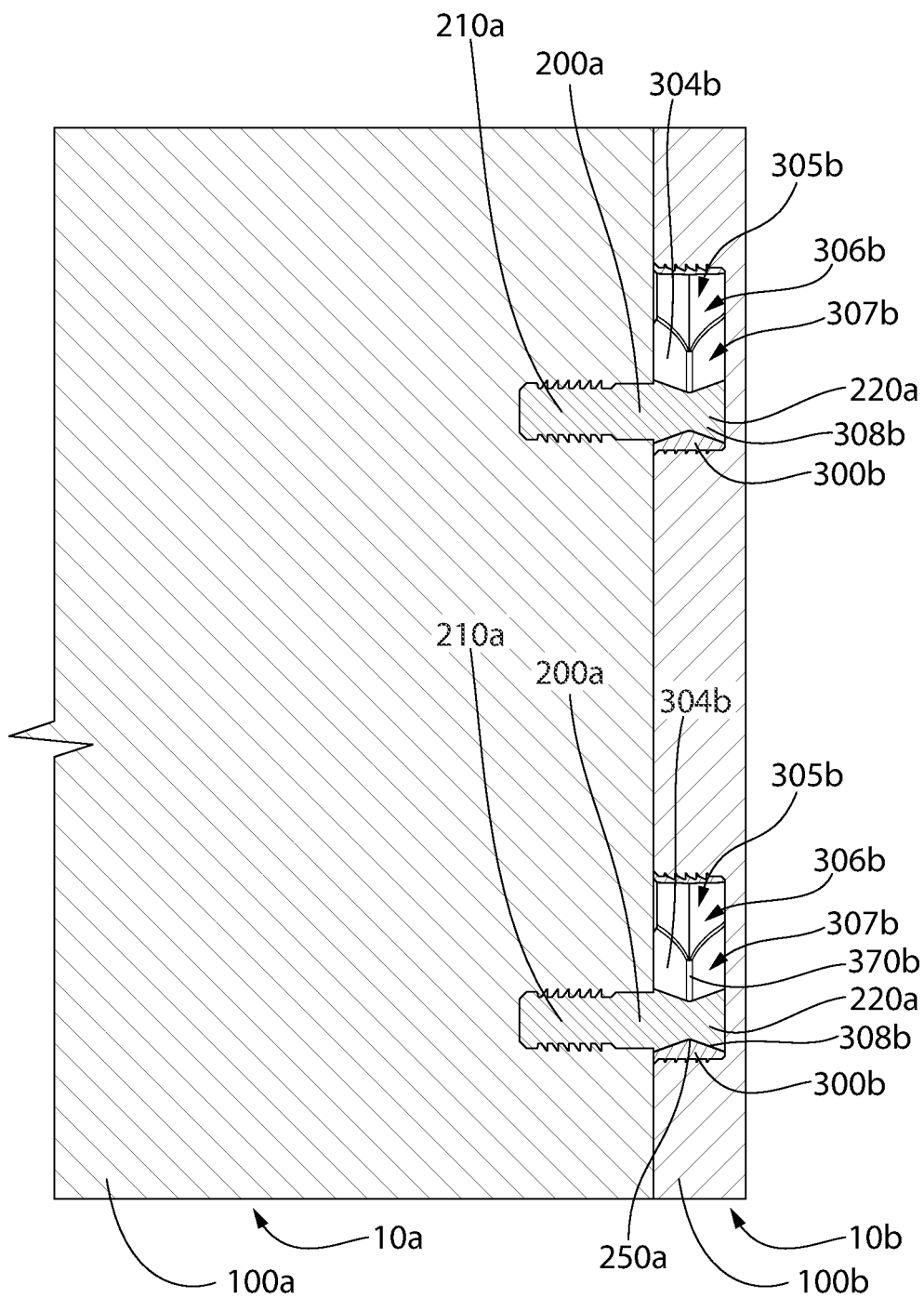
Figure 10A:
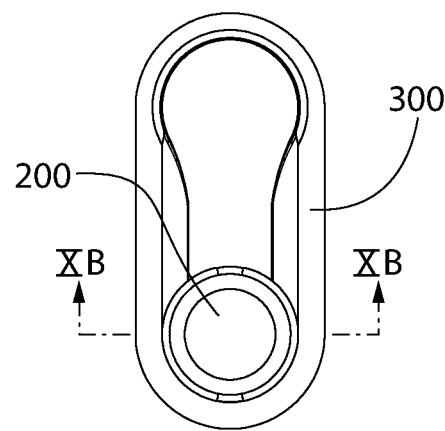
FIG. 10A is a top view illustrating the male coupler attached to the female coupler.
Figure 10B:
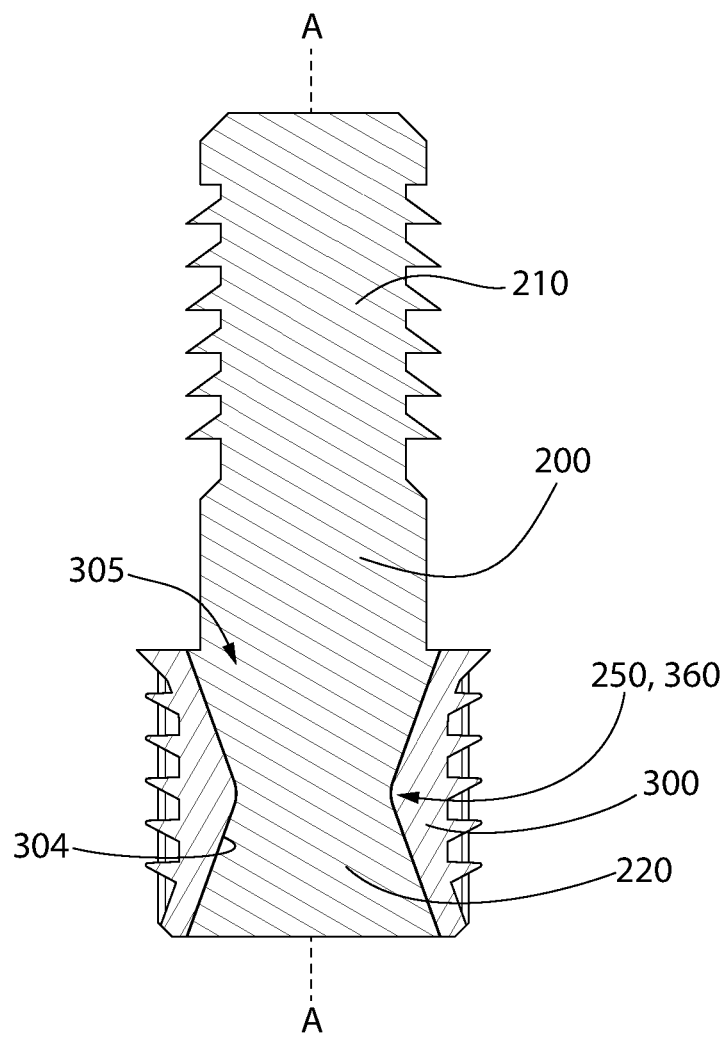
FIG. 10B is a cross-sectional view taken along line XB-XB of FIG. 10A.
Figure 11B:
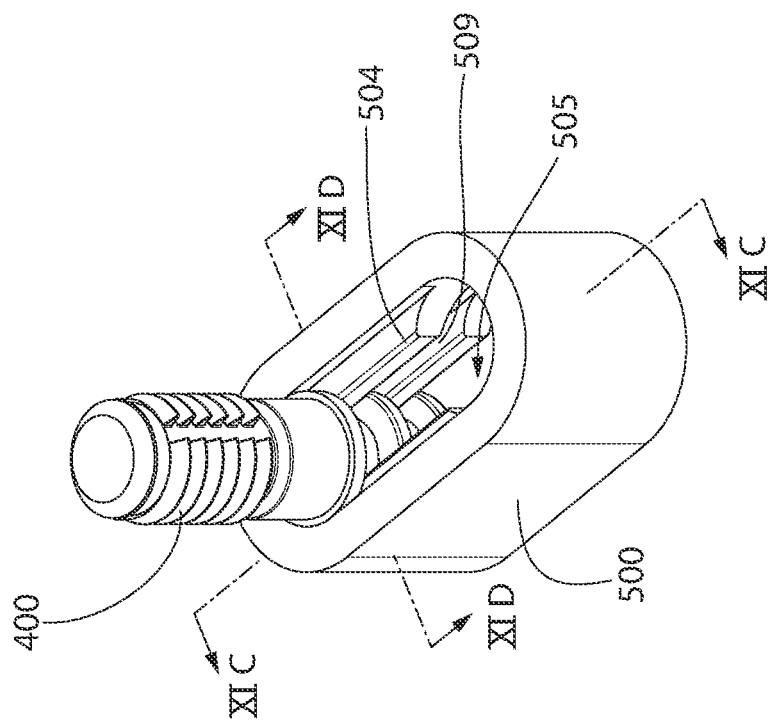
FIGS. 11A and 11B illustrate male and female couplers in a detached and attached state, respectively, in accordance with a first alternative embodiment of the present invention.
Figure 11A:
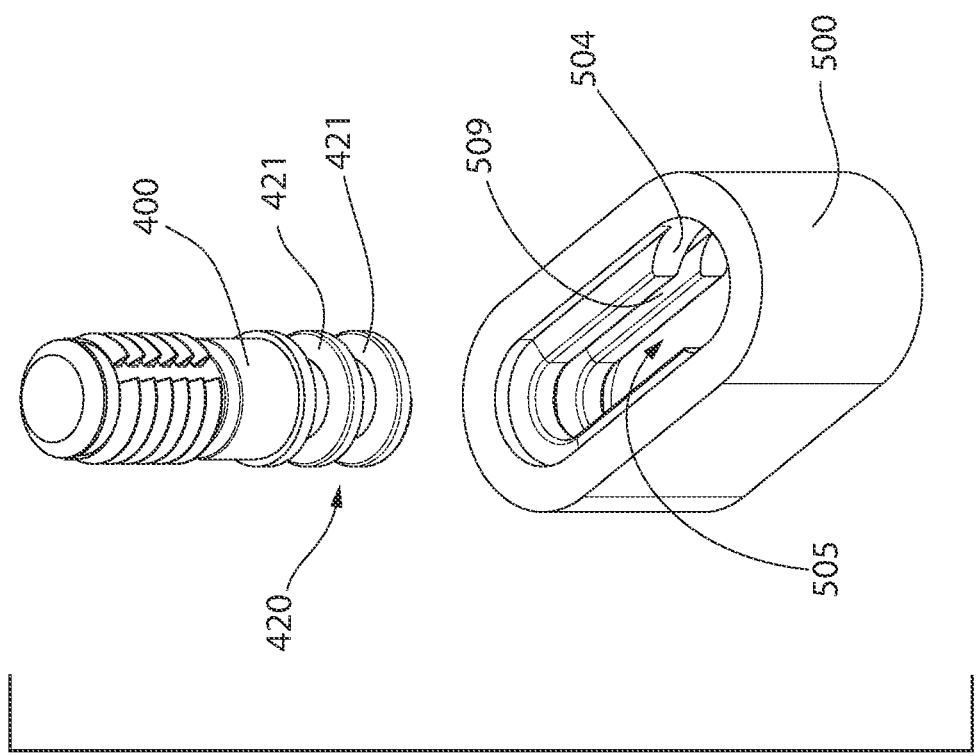
Figure 11D:
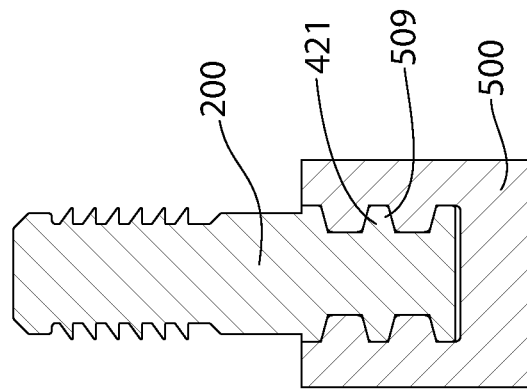
FIGS. 11C and 11D are cross-sectional views taken along lines XIC-XIC and XID-XID in FIG. 11B, respectively.
Figure 11C:
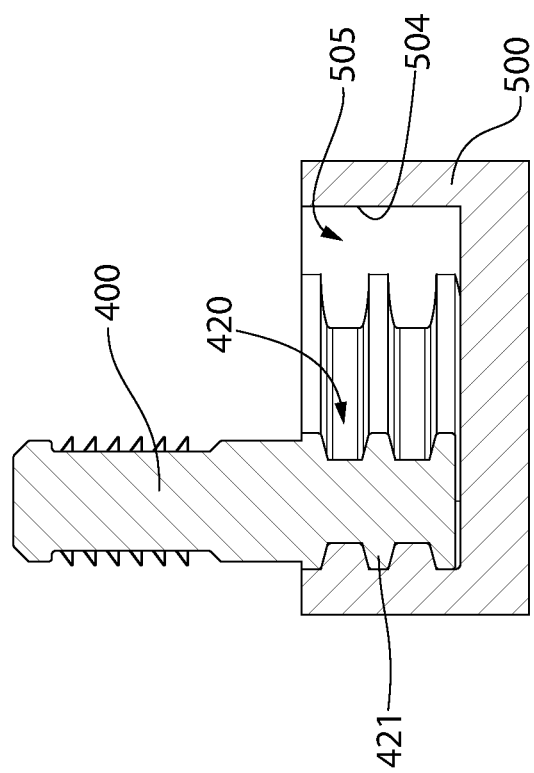
Figure 12B:
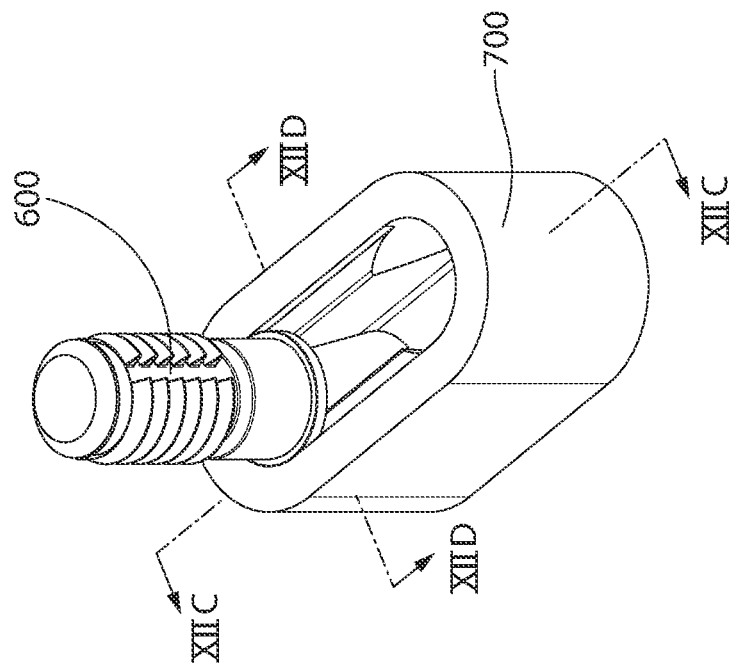
FIGS. 12A and 12B illustrate male and female couplers in a detached and attached state, respectively, accordance with a second alternative embodiment of the present invention.
Figure 12A:
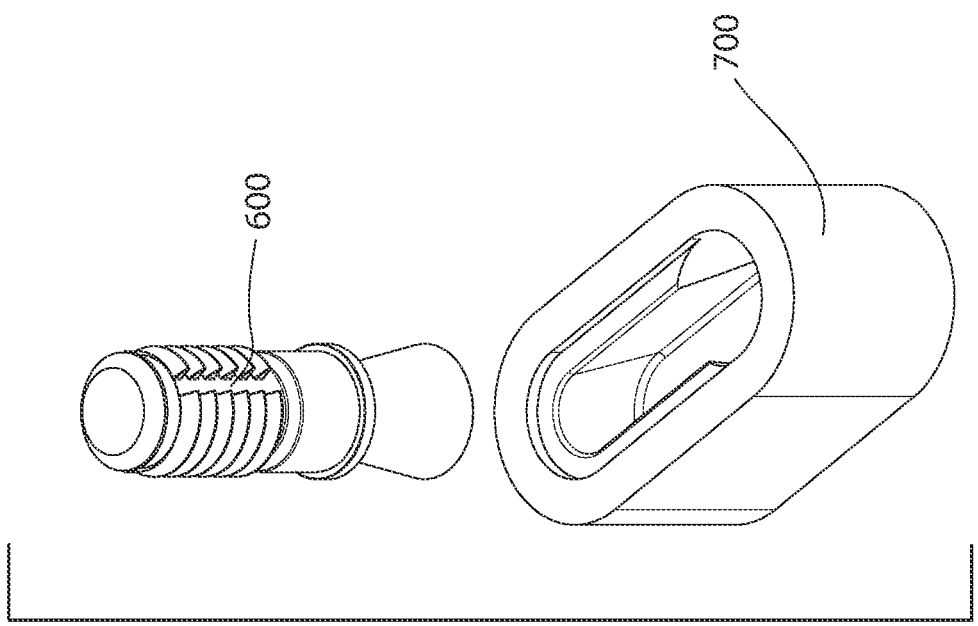
Figure 12C:
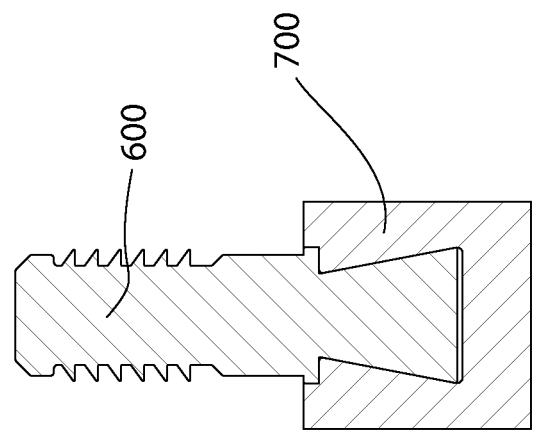
FIGS. 12C and 12D are cross-sectional views taken along lines XIIC-XIIC and XIID-XIID in FIG. 10B, respectively.
Figure 12D:
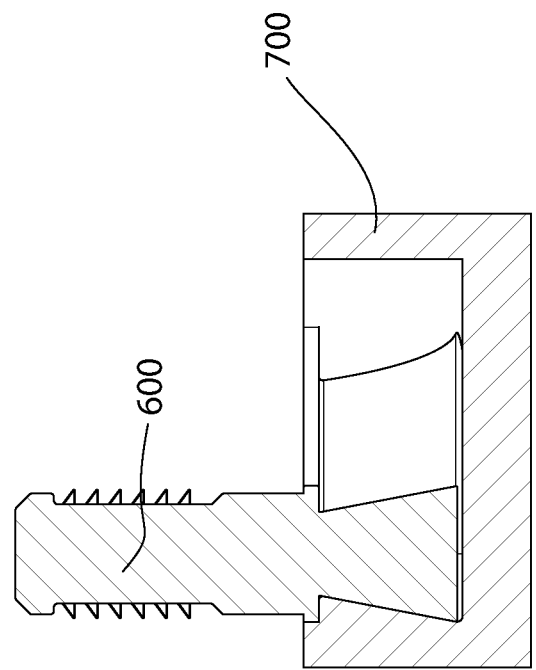

Next, referring to FIGS. 9A and 9B, the first furniture part 10a is slid relative to the second furniture part 10b, thereby sliding the male couplers 200a of the first furniture part 10a from the insertion portions 306b to the nesting portions 307b to the locking portions 308b of the cavities 305b of the female couplers 300b of the second furniture part 10b. As the male couplers 200a slide from the insertion portions 306b of the cavities 305b to the nesting portions 307b of the cavities 305b, the inner surface 304b of the female couplers 300b (i.e., the second engagement feature 370b) mates/interacts/engages the outer surface of the second portions 220a of the male couplers 200a (i.e., the first engagement feature 250a). This interaction between the inner surface 304b of the female couplers 300b and the outer surface of the second portions 220a of the male couplers 200a (which is also illustrated in FIGS. 10A and 10B) prevents the male couplers 200a from being able to move axially (in the direction of the axis A-A of the male couplers 200a).

Thus, when the second portions 220a of the male couplers 200a are located within the nesting and locking portions 307b, 308b of the cavities 305b of the female couplers 300b, the male and female couplers 200a, 300b are effectively locked together (in the axial direction of the male couplers 200a), which in turn locks the first and second furniture parts 10a, 10b together. As noted above, in order to detach the male couplers 200a from the female couplers 300b, the male couplers 200a must first be slid within the cavities 305b back into the nesting regions 306b and then the male couplers 200a can be moved axially out of the cavities 305. When the male and female couplers 200a, 300b are coupled together, this couples the first and second boards 100a, 100b together. When the first and second boards 100a, 100b are coupled together, they form a furniture assembly or a portion of an article of furniture.

As noted above, the female couplers 300a, 300b may be compressed when positioned within the board 100b, which causes the outer surface of the male couplers 200a to frictionally contact the inner surface of the female couplers 300b. The frictional contact between the outer surfaces of the male couplers 200a and the inner surfaces of the female couplers 300b helps to prevent the male couplers 200a from sliding back towards the insertion portions 306b of the cavities 305b of the female couplers 300b. Rather, a user or some other external force must be applied in order to remove the male couplers 200a from the nesting portions 307b of the female couplers 300b.

Referring to FIGS. 11A-11D, a male coupler 400 and a female coupler 500 are illustrated in accordance with an alternative embodiment of the present invention. The male and female couplers 400, 500 may be coupled to a board in the same manner as was described above. Thus, the male and female couplers 400, 500 may be made to interact to couple a plurality of boards together to form an assembled article of furniture. The male coupler 400 is identical to the male coupler 200 except with regard to the structure of the second portion 420 of the male coupler 400. Similarly, the female coupler 500 is identical to the female coupler 300 except with regard to the structure of the inner surface 504 of the female coupler 500. Although no barbs are shown on the female coupler 500, they may be included in some embodiments just as they are for the female coupler 300.

In this embodiment, the second portion 420 of the male coupler 400 comprises a plurality of ring-like protrusions 421 and the inner surface 504 of the female coupler 500 comprises a plurality of notches 509 that receive the ring-like protrusions 421 as the male coupler 400 slides within the cavity 505 of the female couple 500. Thus, engagement between the ring-like protrusions 421 of the male coupler 400 and the notches 509 of the female coupler 500 prevents the male coupler 400 from being axially separated from the female coupler 500 in the same manner as that which was described above. Thus, the structure of the first and second engagement features is somewhat altered in this embodiment as compared to the one previously described.

FIGS. 12A-12D illustrate yet another embodiment of a male coupler 700 and a female coupler 800. The male and female couplers 700, 800 can be coupled to a board in the same manner as described above with regard to the male and female couplers 200, 300. The male and female couplers 700, 800 may be made to interact to couple a plurality of boards together to form an assembled article of furniture. Again, the only difference between the male coupler 700 and the male coupler 200 is with regard to the shape of the portion that interacts with the female coupler 800 and vice versa. Specifically, in this embodiment the engagement is more of a traditional dovetail-type joint. However, despite the change in shape, the function and operation remains the same as that which was described above. Thus, the structure of the first and second engagement features is somewhat altered in this embodiment as compared to the one previously described.

Referring to FIGS. 13-32, the invention will be described with reference to a wall hanging system, or to a method of mounting a wall décor item from a wall.

Referring to FIGS. 13-16, a wall hanging system 1000 is illustrated and will be described in accordance with an embodiment of the present invention. The wall hanging system 1000 generally comprises a first mounting assembly 1400 configured to be coupled to a wall 1010, a wall décor item 1100, and a second mounting assembly 1200 coupled to the wall décor item 1100 and configured to interact with the first mounting assembly 1400 to mount the wall décor item 1100 on the wall 1010. Thus, the first and second mounting assemblies 1400, 1200 are configured to engage or mate with one another while the first mounting assembly 1400 as affixed to the wall 1010 in order to mount the wall décor item 1100 to the wall 1010. The first and second mounting assemblies 1400, 1200 may be referred to herein collectively as a coupling assembly 1150.

In the exemplified embodiment, the wall décor item 1100 is a ledge or shelf. However, the invention is not to be so limited in all embodiments and the wall décor item 1100 may be any item that a user desires to hang from a wall or other vertical or semi-vertical surface. Thus, for example, the wall décor item 1100 may be a frame, an artifact, a canvas, a photograph, a drawing, a mirror, an artistic work, a cabinet, a bookshelf, a chalkboard, a whiteboard, a case, a hook, a hat rack, a coat rack, or the like. Moreover, although the term wall is used herein, the wall could be any supporting structure, such as a cabinet, a bookshelf, a dresser, or the like on which the wall décor item 1100 may be mounted.

The wall décor item 1100 of the exemplified embodiment is a shelf or ledge that comprises a front surface 1101, a rear surface 1102 opposite the front surface 1101, and an upper surface 1103 that extends between the front and rear surfaces 1101, 1102. The rear surface 1102 is configured to face, and potentially abut, the wall 1010 when the wall décor item 1100 is mounted to the wall 1010. The upper surface 1103 is a horizontal surface that it extends horizontally from the wall 1010 when the wall décor item 1100 is mounted to the wall 1010 to form a support ledge. Thus, various items may be stored and/or supported on the upper surface 1103 for display or other purposes. For this reason, it may be important for the wall décor item 1100 to be hung in a level manner to avoid items that are stored thereon from falling off.

In the exemplified embodiment, the wall décor item 1100 is a ledge or shelf as noted above. The wall décor item 1100 has the front surface 1101 and the rear surface 1102, with the rear surface 1102 being positioned adjacent to and/or in abutting contact with the wall 1010 when the wall décor item 1100 is mounted to the wall 1010. In the exemplified embodiment, the wall décor item 1100 comprises a mounting recess 1120 formed into the rear surface 1102. The mounting recess 1120 is bounded by a floor 1121 and one or more sidewalls 1122 extending from the floor 1121 to the rear surface 1102. Thus, the floor 1121 of the mounting recess 1120 is recessed relative to the rear surface 1102 of the wall décor item 1100. The mounting recess 1120 forms a pocket-like cavity in the rear of the wall décor item 1100 which can hide the first and second mounting assemblies 1400, 1200 from view when the wall décor item 1100 is mounted to the wall 1010 using the first and second mounting assemblies 1400, 1200.

As noted above, in this embodiment the second mounting assembly 1200 is coupled to the wall décor item 1100. Specifically, the second mounting assembly 1200 is coupled to the wall décor item 1100 within the mounting recess 1120. In this embodiment, the second mounting assembly 1200 comprises a first mounting element 1210 and a second mounting element 1220 that are coupled to the wall décor item 1100 in a spaced apart manner. Of course, in other embodiments a single mounting element (i.e., the first mounting element 1210) or more than two mounting elements may be used and form part of the second mounting assembly 1200. The number of mounting elements that are used may depend on a width of the wall décor item 1100, as measured from a first side 1104 thereof to a second side 1105 thereof.

Each of the first and second mounting elements 1210, 1220 (and also any other mounting elements that may be included) of the second mounting assembly 1200 comprises a first portion 1201 that extends into and is embedded within the wall décor item 1100 to couple the first and second mounting elements 1210, 1220 to the wall décor item 1100 and a second portion 1202 that protrudes from the wall décor item 1100 and interacts with the first mounting assembly 1400 to mount the wall décor item 1100 from the wall 1010. The first portion 1201 may comprise barbs, screw threads, or other locking features to ensure a secure attachment is achieved between the first and second mounting elements 1210, 1220 and the wall décor item 1100. In some embodiments, an adhesive or glue may be used to affix the first portion 1201 of the first and second mounting elements 1210, 1220 to the wall décor item 1100. In the figures, some of the features are only labeled on the first mounting element 1210, but it should be appreciated that the second mounting element 1220 is identical to the first mounting element 1210.

More specifically, in the exemplified embodiment the first portions 1201 of the first and second mounting elements 1210, 1220 of the second mounting assembly 1200 extend into the floor 1121 of the mounting recess 1120 of the wall décor item 1100 and the second portions 1202 of the first and second mounting elements 1210, 1220 of the second mounting assembly 1200 protrude from the floor 1121 and into the mounting recess 1120. The second portions 1202 of the first and second mounting elements 1210, 1220 terminate at a distal end 1203. In the exemplified embodiment, the second portions 1202 of the first and second mounting elements 1210, 1220 do not protrude beyond the rear surface 102 of the wall décor item 100. Stated another way, the distal ends 1203 of the second portions 1202 of the first and second mounting elements 1210, 1220 are flush with or recessed relative to the rear surface 1102 of the wall décor item 1100. Thus, the second portions 1202 of the first and second mounting elements 1210, 1220 are located entirely within the mounting recess 1120 of the wall décor item 1100. This helps to ensure that the coupling assembly 1150 (including the first and second mounting assemblies 1400, 1200) is hidden from view when the wall décor item 1100 is hanging from the wall 1010. In other embodiments, the second portions 1202 of the first and second mounting elements 1210, 1220 of the second mounting assembly 1200 may protrude beyond the rear surface 1102 of the wall décor item 1100. Furthermore, in other embodiments the mounting recess 1120 of the wall décor item 1100 may be omitted and the first and second mounting elements 1210, 1220 may be coupled directly to the rear surface 1102 of the wall décor item 1100 rather than being recessed within the mounting recess 1120. Such variations fall within the scope of the claimed invention as will be discussed in some greater detail below.

The second portions 1202 of the first and second mounting elements 1210, 1220 have a particular shape that is intended to mate with a corresponding shape of a portion of the first mounting assembly 1400 to facilitate the coupling of the second mounting assembly 1200 to the first mounting assembly 1400. In the exemplified embodiment, the second portions 1202 of the first and second mounting elements 1210, 1220 have an hourglass shape. That is, the second portions 1202 of the first and second mounting elements 1210, 1220 have a waist portion 1204 and first and second truncated cone portions 1205, 1206 that meet at the waist portion 1204. The narrow ends of the first and second truncated cone portions 1205, 1206 face each other and meet at the waist portion 1204.

Although the second portions 1202 of the first and second mounting elements 1210, 1220 have an hourglass shape in the exemplified embodiment, the invention is not to be so limited in all embodiments. The second portions 1202 of the first and second mounting elements 1210, 1220 may have other shapes that mate with the shape of the first mounting assembly 1400, including being in the shape of a singular truncated cone, having various ridges or protrusions that nest within various channels or grooves of the first mounting assembly 1400, or the like. Thus, the invention is not intended to be limited by the particular shape of the second portions 1202 as shown in the drawings in all embodiments.

The first and second mounting elements 1210, 1220 may be secured to the wall décor item 1100 by pre-drilling holes in the rear surface 1102 or floor 1121 and then inserting the first portions 1201 of the first and second mounting elements 1210, 1220 into the pre-drilled holes. In other embodiments, the first and second mounting elements 1210, 1220 may be able to create holes in the rear surface 1102 or floor 1121 of the wall décor item 1100 rather than having pre-drilled holes. In such embodiments, there may be grooves formed in the distal end 1203 of the first and second mounting elements 1210, 1220 for insertion of a driver of a screwdriver or similar tool.

In the exemplified embodiment, the second portions 1202 of the first and second mounting elements 1210, 1220 of the second mounting assembly 1200 form a post that protrudes from the rear surface 1102 of the wall décor item 1100 or from the floor 1121 of the mounting recess 1120 of the wall décor item 1100. Thus, the second portions 1202 of the first and second mounting elements 1210, 1220 form a male-type coupler that is intended to be inserted into a female-type coupler (which is formed by the first mounting assembly 1400 as discussed further below). The post formed by the second portions 1202 of the first and second mounting elements 1210, 1220 extends from the floor 1121 of the mounting recess 1120 to the distal end 1203 along a longitudinal axis Z-Z.

Referring to FIGS. 14-16B, the first mounting assembly 1400 will be described in greater detail. In the exemplified embodiment, the first mounting assembly 1400 is a bracket member (also referred to herein as a mounting bracket) 1401 that is configured to be coupled to the wall 1010 prior to mounting the wall décor item 1100 on the wall 1010. Thus, the first mounting assembly 1400 comprises a plate portion 1402 having a front surface 1403 and a rear surface 1404 opposite the front surface 1403 and first and second mounting elements 1410, 1420. When the first mounting assembly 1400 is coupled to the wall 1010, the rear surface 1404 of the plate portion 1402 faces and/or abuts against the wall 1010. Although two mounting elements 1410, 1420 are depicted in the exemplified embodiment, a single mounting element or more than two mounting elements may be used in alternative embodiments. In the exemplified embodiment, the first and second mounting elements 1410, 1420 are female-type couplers that mate with the male-type couplers of the second mounting assembly 1200 for purposes of mounting the wall décor item 1100 on the wall. However, it should be appreciated that the female-type couplers could be located on the wall décor item 1100 and the male-type couplers could be located on the wall 1010 in other embodiments, one of which will be described below with reference to FIGS. 23 and 26.

The plate portion 1402 comprises a plurality of mounting holes 1409 that extend through the thickness of the plate portion 1402 from the front surface 1403 thereof to the rear surface 1404 thereof. Each of the mounting holes 1409 is sized and configured to receive a fastener, such as a screw, a nail, a bolt, or the like, which can pass through the mounting hole 1409 and into the wall 1010 for purposes of affixing the first mounting assembly 1400 to the wall 1010. The mounting holes 1409 could be omitted in other embodiments, and in such embodiments the first mounting assembly 1400 may be coupled to the wall 1010 using other means, such as double-sided adhesive tape, hook-and-loop fastener strips, or the like.

Figure 15:
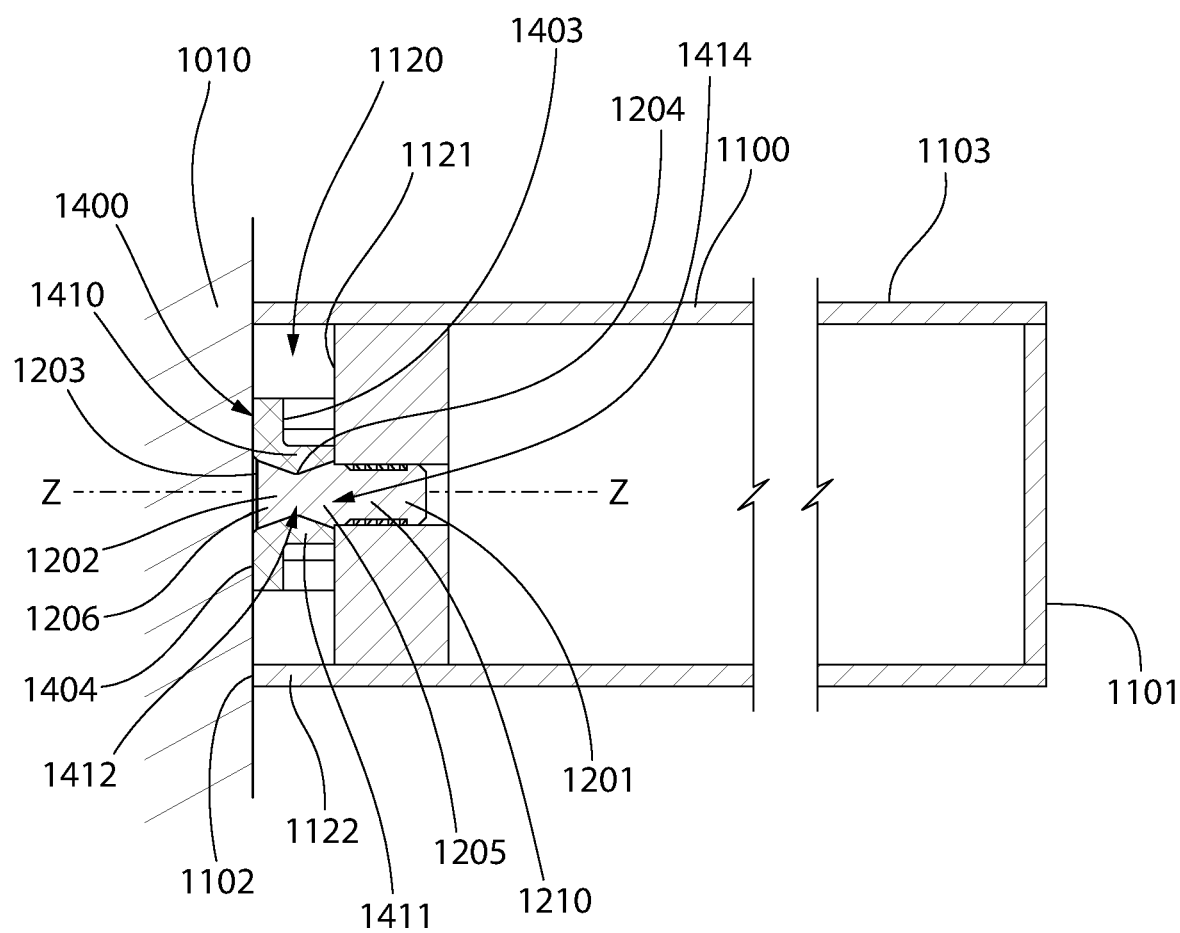
FIG. 15 is a cross-sectional view taken along line XV-XV of FIG. 13.

In the exemplified embodiment, the first mounting element 1410 comprises a first annular wall 1411 that protrudes from the front surface 1403 of the plate portion 1402 and the second mounting element 1420 comprises a second annular wall 1421 that protrudes from the front surface 1403 of the plate portion 1402. The first and second annular walls 1411, 1421 are arranged on the plate portion 1402 in a spaced apart manner. The first annular wall 1411 surrounds a first cavity 1412 and the second annular wall 1421 surrounds a second cavity 1422. Although the first and second annular walls 1411, 1421 are used to form the first and second cavities 1412, 1422 in the exemplified embodiment, in other embodiments the plate portion 1402 may be thicker between the front and rear surfaces 1403, 1404 and the first and second cavities 1412, 1422 may be formed directly into the front surface 1403 of the plate portion 1402. The first and second cavities 1412, 1422 may extend through the full thickness of the plate portion 1402 from the front surface 1403 to the rear surface 1404, as shown in FIG. 15. In other embodiments, the first and second cavities 1412, 1422 may have a floor rather than forming passageways through the full thickness of the plate portion 1402. In either case, the first mounting element 1410 comprises the first cavity 1412 and the second mounting element 1420 comprises the second cavity 1422.

In the exemplified embodiment, the first and second annular walls 1411, 1421 are formed as a part of the bracket member 1401. However, the invention is not to be so limited and in other embodiments the first and second annular walls 1411, 1421 may be stand-alone components that define the first and second cavities 1412, 1422. Thus, the first and second annular walls 1411, 1421 may form distinct components that can be separately fitted within a hole in the wall 1010 or separately coupled to the wall 1010 so as to extend therefrom while still allowing for mounting of the wall décor item 1100 on the wall 1010 in the manner described herein. However, using the bracket member 1401 may be preferable as it will make it easier for an end user to ensure that the first and second cavities 1412, 1422 are in alignment so that the wall décor item 1100 will be level once mounted on the wall 1010.

In the exemplified embodiment, each of the first and second annular walls 1411, 1421 is oval. Moreover, the first cavity 1412 defined by the first annular wall 1411 comprises an insertion portion 1413 and a nesting portion 1414. Similarly, the second cavity 1422 defined by the second annular wall 1421 comprises an insertion portion 1423 and a nesting portion 1424. As best seen in FIG. 16B, the nesting portions 1414, 1424 of the first and second cavities 1412, 1422 have a smaller width than the insertion portions 1413, 1423 of the first and second cavities 1412, 1422. Thus, the second portions 1202 of the first and second mounting elements 1210, 1220 of the second mounting assembly 1200 can be inserted into the first and second cavities 1412, 1422 along the insertion portions 1413, 1423, but not along the nesting portions 1414, 1424. Rather, once inserted into the insertion portions 1413, 1423, the second portions 1202 of the first and second mounting elements 1210, 1220 of the second mounting assembly 1200 can be slid along the first and second cavities 1412, 1422 from the insertion portions 1413, 1423 to the nesting portions 1414, 1424.

Thus, in the exemplified embodiment the insertion portions 1413, 1423 have a diameter or transverse cross-sectional area that is larger than the outer diameter or outer transverse cross-sectional area of the second portions 1202 of the first and second mounting elements 1210, 1220 of the second mounting assembly 1200. This ensures that the second portions 1202 of the first and second mounting elements 1210, 1220 can readily enter into and be removed from the cavities 1412, 1422 along the insertion portions 1413, 1423 thereof. The nesting portions 1414, 1424 have a diameter or cross-sectional area that is smaller than the diameter or cross-sectional area of the second portions 1202 of the first and second mounting elements 1210, 1220 so that the second portions 1202 of the first and second mounting elements 1210, 1220 cannot be inserted axially into or removed axially out of the first and second cavities 1412, 1422 along the nesting portions 1414, 1424 thereof.

The first cavity 1412 is defined by an inner surface (or sidewall) 1415 of the first annular wall 1411 and the second cavity 1422 is defined by an inner surface (or sidewall) 1425 of the second annular wall 1421. When the second portions 1202 of the first and second mounting elements 1210, 1220 are located in the insertion portions 1413, 1423, the inner surface 1415, 1425 does not contact the outer surface of the second portions 1202 of the first and second mounting elements 1210, 1220. When the second portions 1202 of the first and second mounting elements 1210, 1220 are located in the nesting portions 1414, 1424, the inner surface 1415, 1425 contacts the outer surface of the second portions 1202 of the first and second mounting elements 1210, 1220 to create a snug fit therebetween. Stated another way, the first and second cavities 1412, 1422 have a shape along the nesting portions 1414, 1424 thereof that matches or corresponds to the shape of the second portions 1202 of the first and second mounting elements 1210, 1220. Thus, in the exemplified embodiment the second portions 1202 of the first and second mounting elements 1210, 1220 have an hourglass shape, and the first and second cavities 1412, 1422 also have an hourglass shape along the nesting portions 1414, 1424 thereof. As noted previously, the second portions 1202 of the first and second mounting elements 1210, 1220 are not limited to an hourglass shape, and the shape of the nesting portions 1414, 1424 of the first and second cavities 1412, 1424 may change based on the shape of the second portions 1202 of the first and second mounting elements 1210, 1220.

The point here is that the second portions 1202 of the first and second mounting elements 1210, 1220 are capable of being inserted axially (in the direction of the longitudinal axis Z-Z) into the first and second cavities 1412, 1422 along the insertion portions 1413, 1423 thereof but are not capable of being inserted axially into the first and second cavities 1412, 1422 along the nesting portions 1414, 1424. Rather, once in the insertion portions 1413, 1423, the second portions 1202 of the first and second mounting elements 1210, 1220 can be slid in a direction transverse to the longitudinal axis Z-Z from the insertion portions 1413, 1423 into the nesting portions 1414, 1424. Then, once the second portions 1202 of the first and second mounting elements 1210, 1220 are located within the nesting portions 1414, 1424 of the first and second cavities 1412, 1424, the first and second mounting elements 1210, 1220 cannot be removed from the first and second cavities 1412, 1422 by pulling in the axial direction (i.e., the direction of the longitudinal axis Z-Z). This is due to the locking fit and interaction between the outer surface of the second portion 1202 of the first and second mounting elements 1210, 1220 with the sidewall or inner surface 1415, 1425 which defines the first and second cavities 1412, 1424 (best shown in FIG. 15, which illustrates the snug fit between the second portion 1202 of the first mounting element 1210 and the nesting portion 1424 of the first cavity 1412). Rather, the second portions 1202 of the first and second mounting elements 1210, 1220 must first be slid into the insertion portions 1414, 1424 of the first and second cavities 1412, 1414, and only then the first and second mounting elements 1210, 1220 may be removed from the first and second cavities 1412, 1414.

To state the above succinctly, the post (which is formed by the second portion 1202 of the first and second mounting elements 1210, 1220 of the second mounting assembly 1200) is configured to move axially (in the direction of the longitudinal axis Z-Z of the post) into and out of the first and second cavities 1412, 1422 of the first mounting assembly 1400 along the insertion portions 1413, 1423 of the first and second cavities 1412, 1422. The post is prevented from moving axially into and out of the first and second cavities 1412, 1422 of the first mounting assembly 1400 along the nesting portions 1414, 1424 of the first and second cavities 1412, 1422. The inability of the post to move axially into and out of the first and second cavities 1412, 1422 along the nesting portions 1414, 1424 there of is due to the post and the nesting portions 1414, 1424 of the first and second cavities 1412, 1422 having mating shapes that form an interlock between the post and the sidewall 1415, 1425 that defines the first and second cavities 1412, 1422 when the post is located within the nesting portion 1414, 1424 of the first and second cavities 1412, 1422.

Figure 16A:
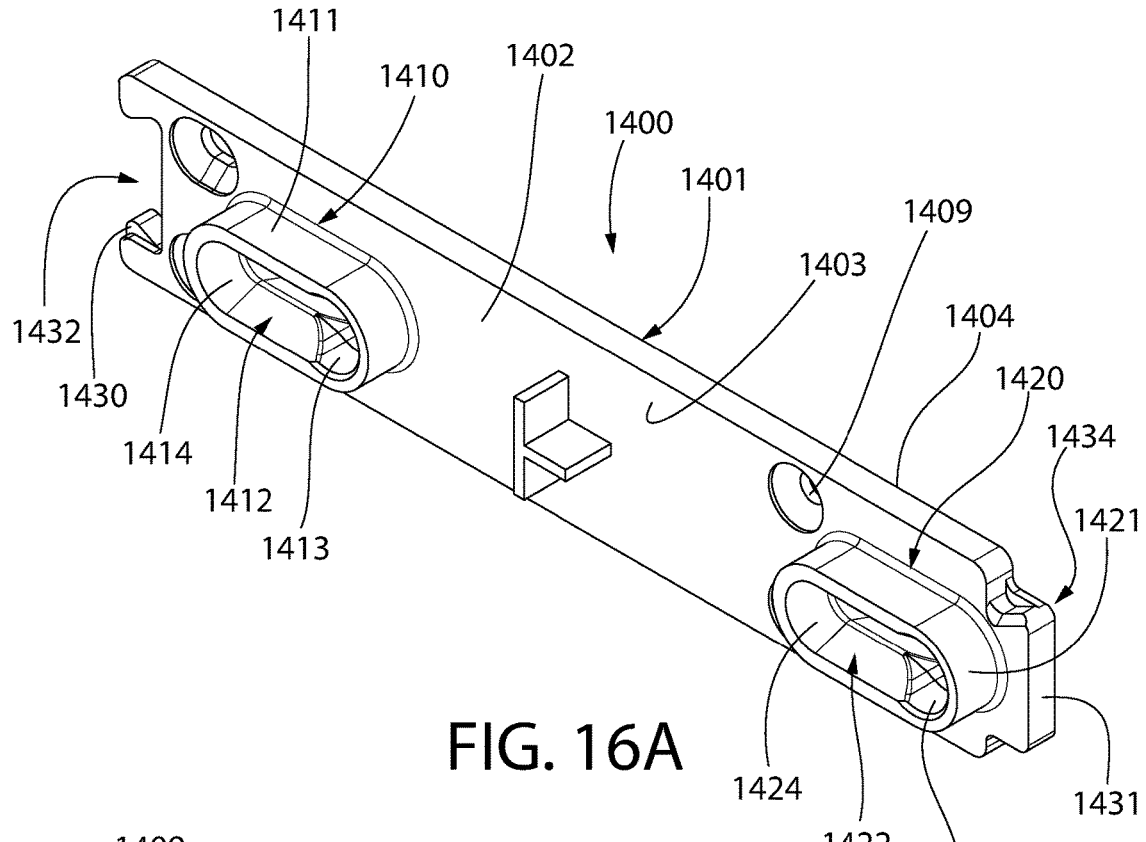
FIG. 16A is a perspective view of the first mounting assembly of the wall hanging system of FIG. 14.
Figure 16B:
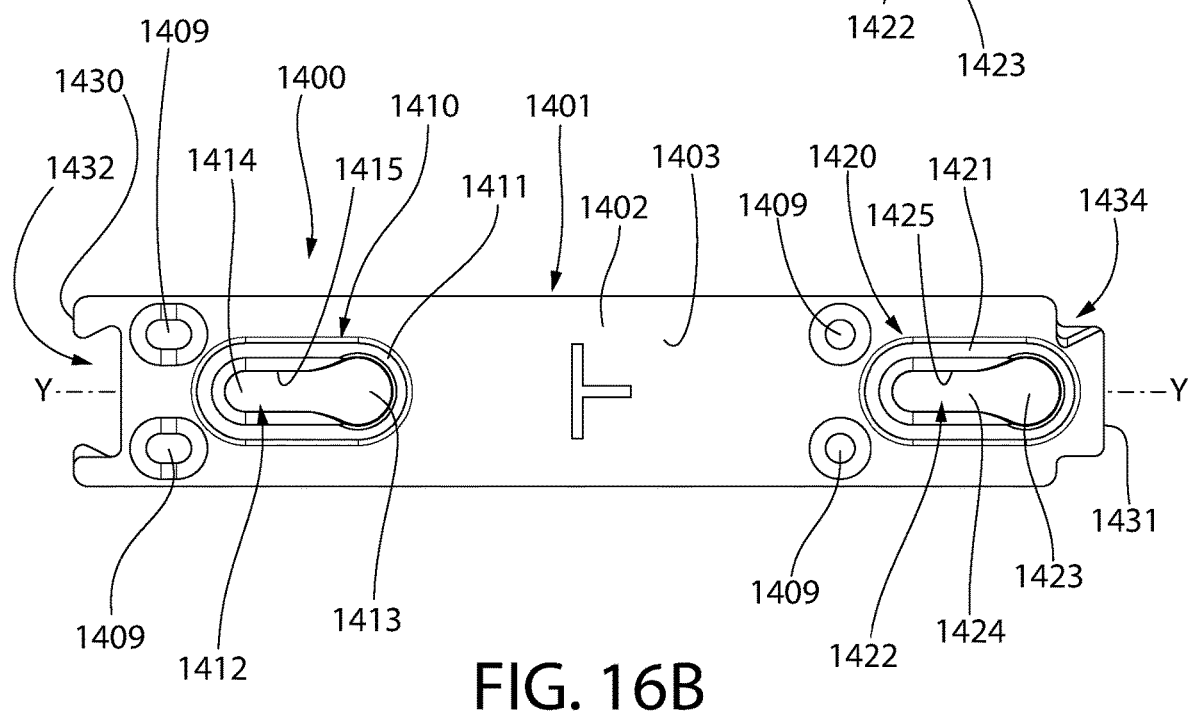
FIG. 16B is a front view of the first mounting assembly of FIG. 16A.

Referring to FIGS. 16A and 16B, the first mounting assembly 1400, or more specifically the plate portion 1401 thereof, extends from a first side edge (or a first end) 1430 to a second side edge (or a second end) 1431 along an axis Y-Y. The first side edge 1430 comprises a first coupling feature 1432 and the second side edge 1431 comprises a second coupling feature 1434. The first and second coupling features 1432, 1434 are configured to allow for an interaction between two or more of the first mounting assemblies 1400 or between the first mounting assemblies 1400 and extension brackets which will be described below with reference to FIGS. 29A-30B.

In the exemplified embodiment, the first coupling feature 1432 located along the first side edge 1430 is a recess and the second coupling feature 1434 located along the second side edge 1431 is a protrusion. More specifically, the first coupling feature 1432 is a dovetail recess and the second coupling feature 1434 is a dovetail protrusion. Thus, the dovetail protrusion of the second coupling feature 1434 of one of the first mounting assemblies 1400 may be received within the dovetail recess of the first coupling feature 1432 of another one of the first mounting assemblies 1400 (or a dovetail recess of an extension member as mentioned above and described in greater detail below) to form a track comprising multiple of the first mounting assemblies 1400 coupled to the wall 1010. Although in the exemplified embodiment the first coupling feature 1432 is a dovetail recess and the second coupling feature 1434 is a dovetail protrusion, the invention is not to be so limited in all embodiments and the first and second coupling features 1432, 1434 may take on other shapes that interact or mate with each other as described herein. For example, the recess and protrusion could have simple square or triangular or other polygonal shapes or any other shape as desired while still enabling the protrusion to nest within the recess for purposes of forming a track as described herein and best shown in FIGS. 31 and 32.

Figure 17:
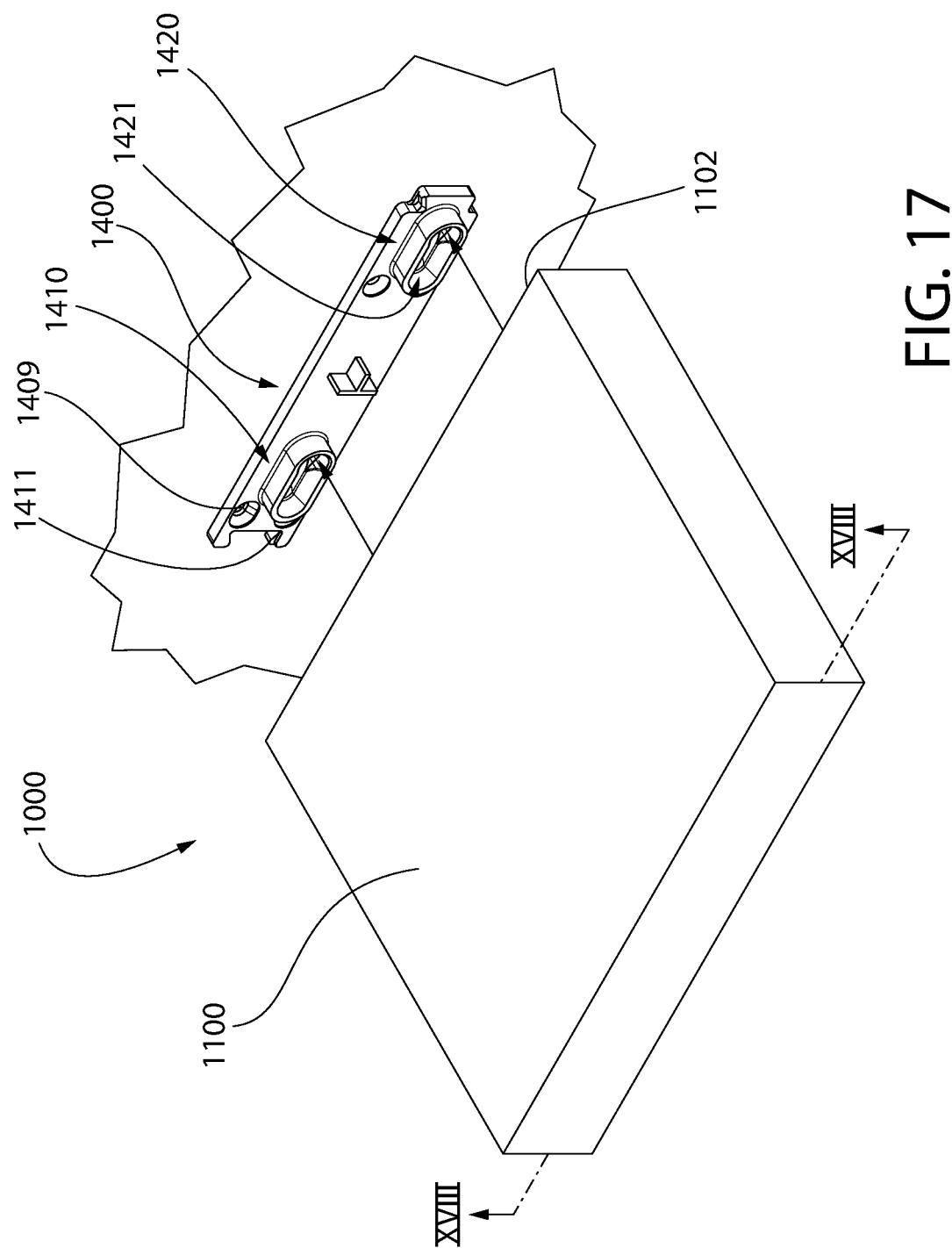
FIG. 17 is a perspective view illustrating the wall décor item positioned adjacent to the wall such that the second mounting assembly on the wall décor item is aligned with the first mounting assembly on the wall.
Figure 18:
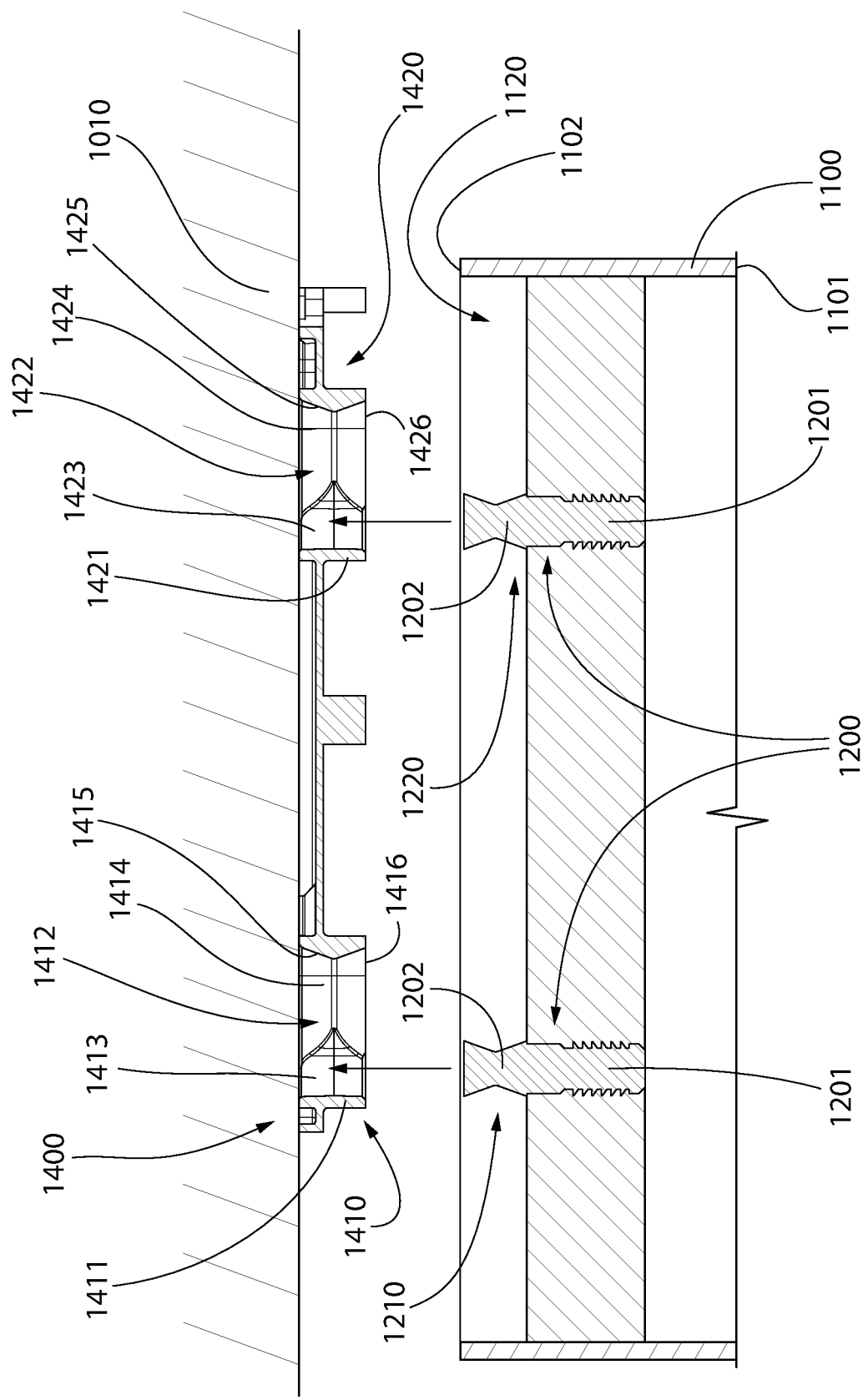
FIG. 18 is a cross-sectional view taken along line XVIII-XVIII of FIG. 17.

Referring to FIGS. 17-22 sequentially, the manner of mounting the wall décor item 1100 to the wall 1010 will be described. There are two views for each "step" in the process, including a perspective view and a cross-sectional view, to facilitate the description. Referring first to FIGS. 17 and 18, the first step is to couple the first mounting assembly 1400 to the wall 1010. In the exemplified embodiment, this may be achieved by inserting fasteners (screws, nails, bolts, or the like) through the mounting holes 1409 of the plate portion 1401 of the first mounting assembly 1400. As noted above, in other embodiments double-side adhesive tape, hook-and-loop fastener strips, or the like may be used.

In the exemplified embodiment, when the first mounting assembly 1400 is coupled to the wall 1010, the first and second mounting elements 1410, 1420 of the first mounting assembly 1400 protrude from the wall 1010 in preparation for engagement with the first and second mounting elements 1210, 1220 of the second mounting assembly 1200, which are coupled to the wall décor item 1100. Specifically, as noted above the first and second mounting elements 1410, 1420 comprise the annular walls 1411, 1421 which protrude from the front surface 1403 of the plate portion 1401, and thus the annular walls 1411, 1421 also protrude from the wall 1010. However, in other embodiments first and second mounting elements 1410, 1420 (and in particular the first and second cavities 1412, 1422) could be fully embedded within the wall 1010 rather than protruding therefrom. In such an embodiment, the first and second mounting elements 1210, 1220 of the second mounting assembly 1200 may protrude from the rear surface 1102 of the wall décor item 1100 in order to enable the second portions 1202 of the first and second mounting elements 1210, 1220 to properly engage the first and second cavities 1412, 1422 of the first and second mounting elements 1410, 1420 of the first mounting assembly 1400 as described herein. Regardless, once the first mounting assembly 1400 is coupled to the wall 1010, the wall décor item 1100 is positioned with its rear surface 1102 facing the wall 1010 as shown in FIGS. 17 and 18. More specifically, the wall décor item 1100 is positioned so that the second portions 1202 of the first and second mounting elements 1210, 1220 of the second mounting assembly 1200 coupled thereto are aligned with the insertion portions 1413, 1423 of the first and second cavities 1412, 1422 of the first and second mounting elements 1410, 1420 of the first mounting assembly 1400.

The first cavity 1412 has a first opening 1416 through which the second portions 1202 of the first and second mounting elements 1210, 1220 of the second mounting assembly 1200 pass in order for the second portions 1202 of the first and second mounting elements 1210, 1220 to enter the insertion portions 1413, 1423 of the first and second cavities 1412, 1422 of the first mounting assembly 1400. The second portions 202 of the first and second mounting elements 1210, 1220 of the second mounting assembly 1200 are sized and configured to pass through the portion of the first and second openings 1416, 1426 that is aligned with the insertion portions 1413, 1423 of the first and second cavities 1412, 1422 while being prevented from passing through the portion of the first and second openings 1416, 1426 that is aligned with the nesting portions 1414, 1424 of the first and second cavities 1412, 1422. Thus, as discussed above, the second portions 1202 of the first and second mounting elements 1210, 1220 of the second mounting assembly 1200 may only be configured to pass into the first and second cavities 1412, 1424 when they are aligned with the insertion portions 1413, 1423 of the first and second cavities 1412, 1422.

Figure 19:
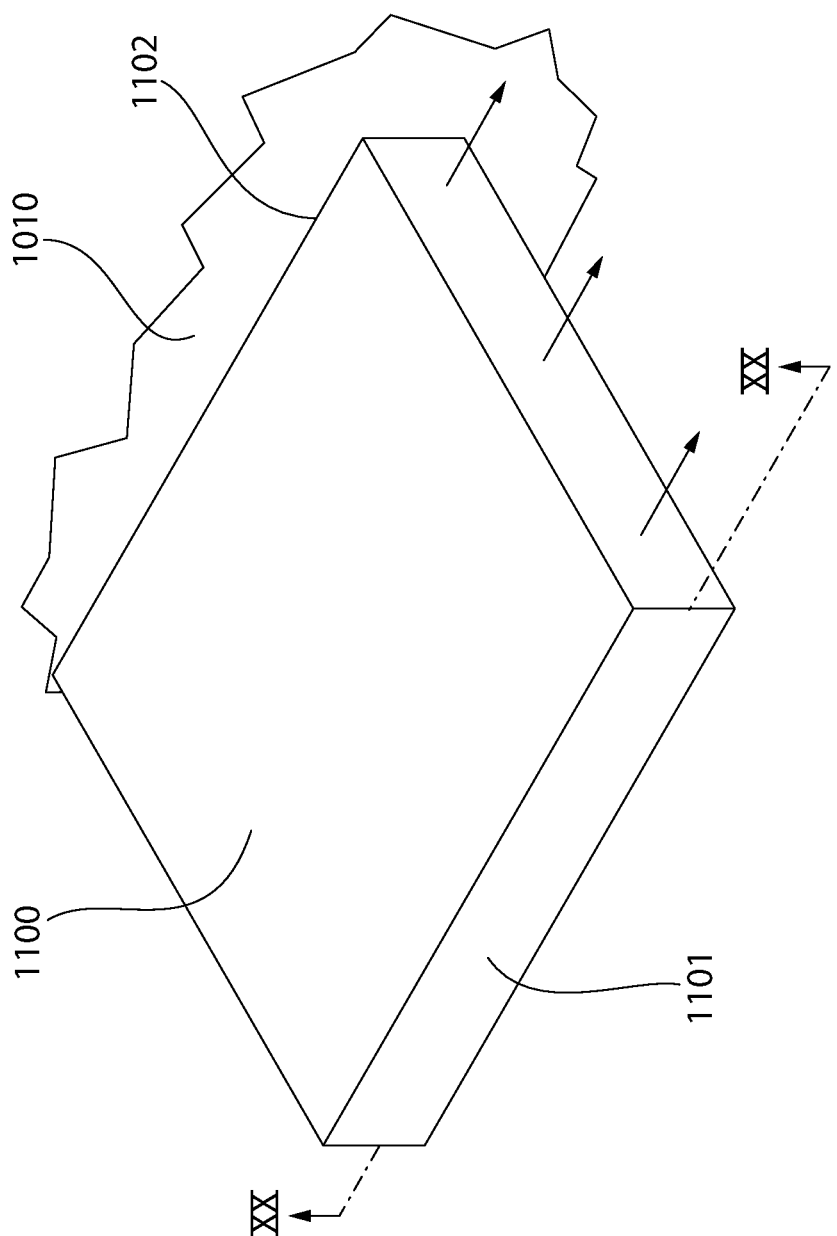
FIG. 19 is the perspective view of FIG. 17 with the wall décor item moved closer to the wall so that a post of the second mounting assembly is inserted into an insertion portion of a cavity of the first mounting assembly.
Figure 20:
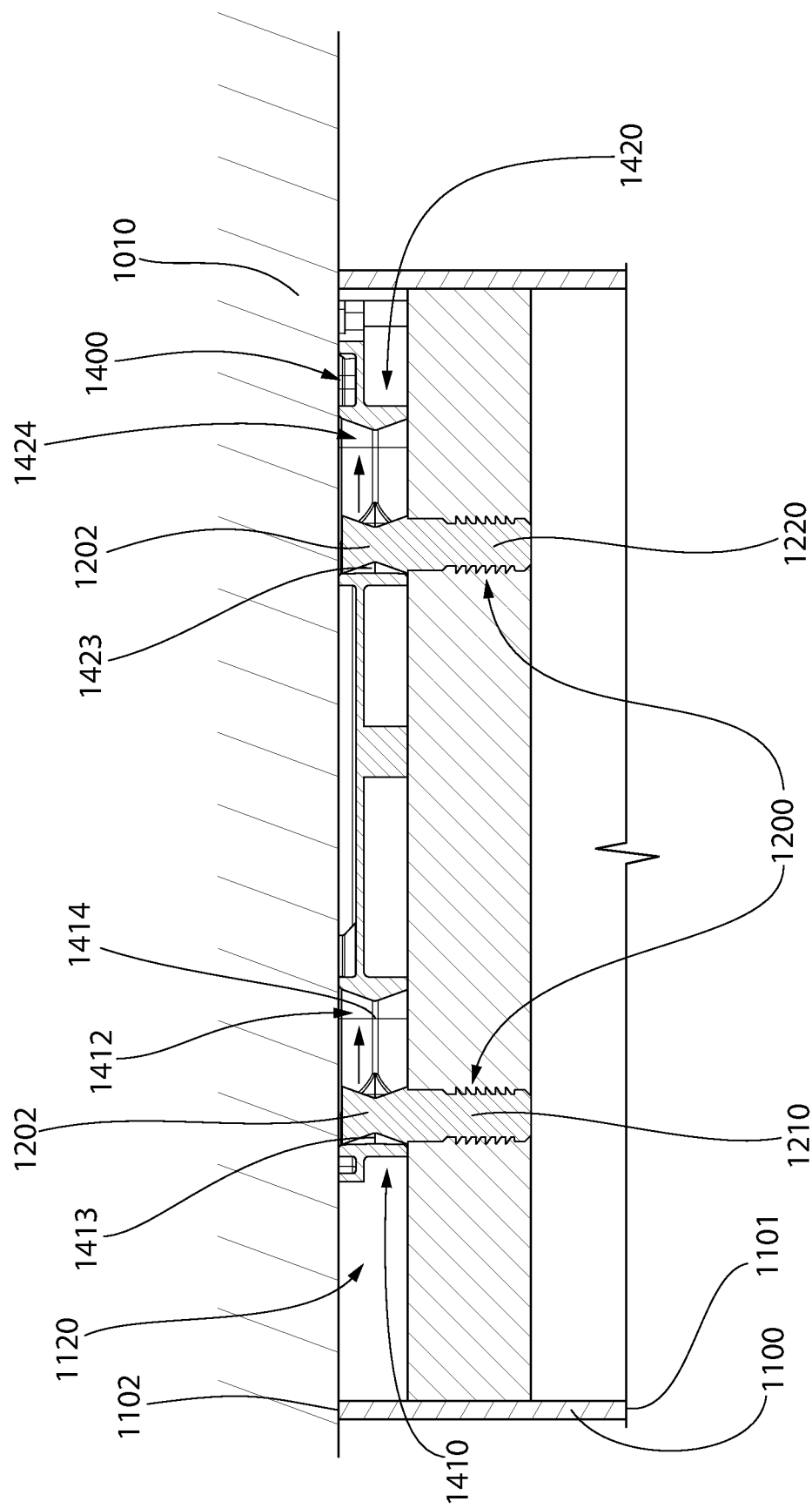
FIG. 20 is a cross-sectional view taken along line XX-XX of FIG. 19.

Referring to FIGS. 19 and 20, the next step is to move the wall décor item 1100 closer to the wall 1010 until the rear surface 1102 of the wall décor item 1100 is adjacent to or abuts the wall 1010. As the wall décor item 1100 is moved closer to the wall 1010 in this manner, the second portions 1202 of the first and second mounting elements 1210, 1220 of the second mounting assembly 1200 pass into the insertion portions 1413, 1423 of the first and second cavities 1412, 1422 of the first and second mounting elements 1410, 1420 of the first mounting assembly 1400. As best seen in FIG. 20, the second portions 1202 of the first and second mounting elements 1210, 1220 of the second mounting assembly 1200 are located in the insertion portions 1413, 1423 of the first and second cavities 1412, 1422 of the first and second mounting elements 1410, 1420 of the first mounting assembly 1400.

Figure 13:
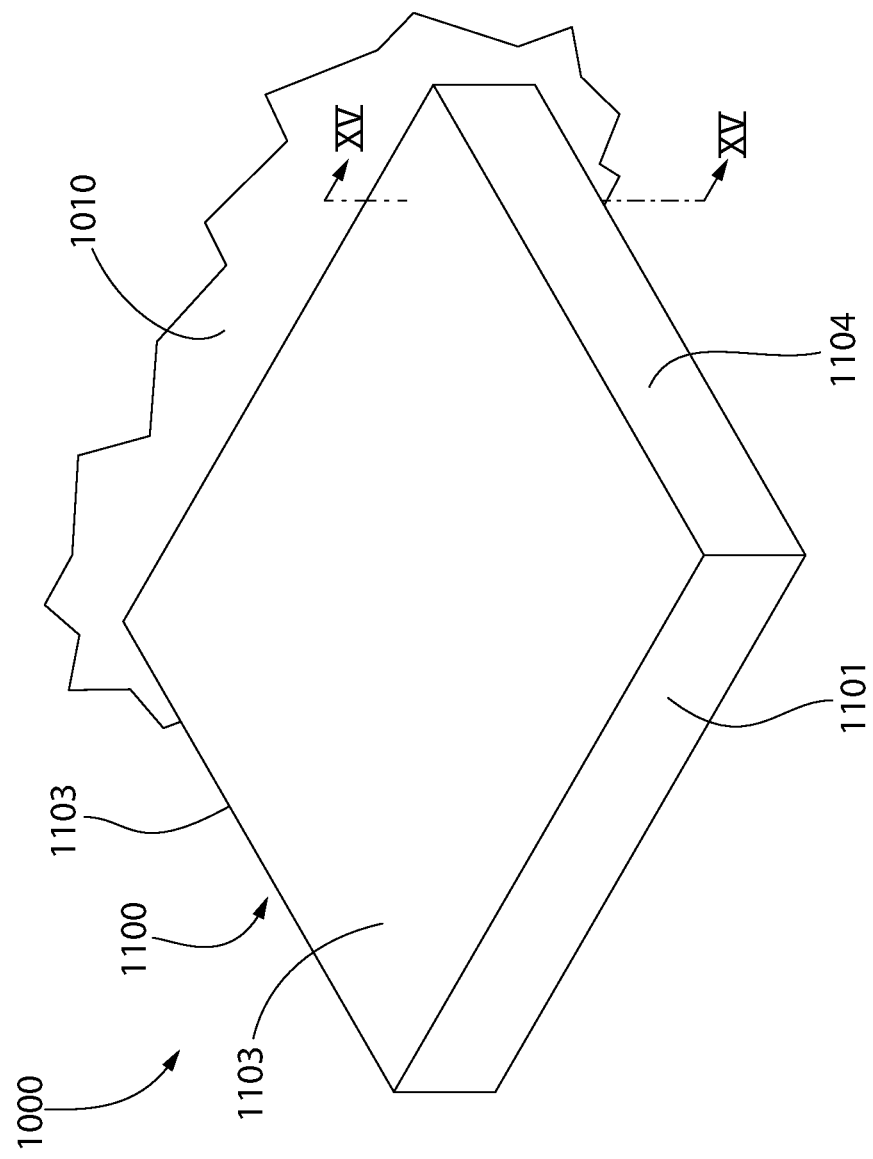
FIG. 13 is a perspective view of a wall hanging system being used to hang a wall décor item from a wall in accordance with an embodiment of the present invention.
Figure 14:
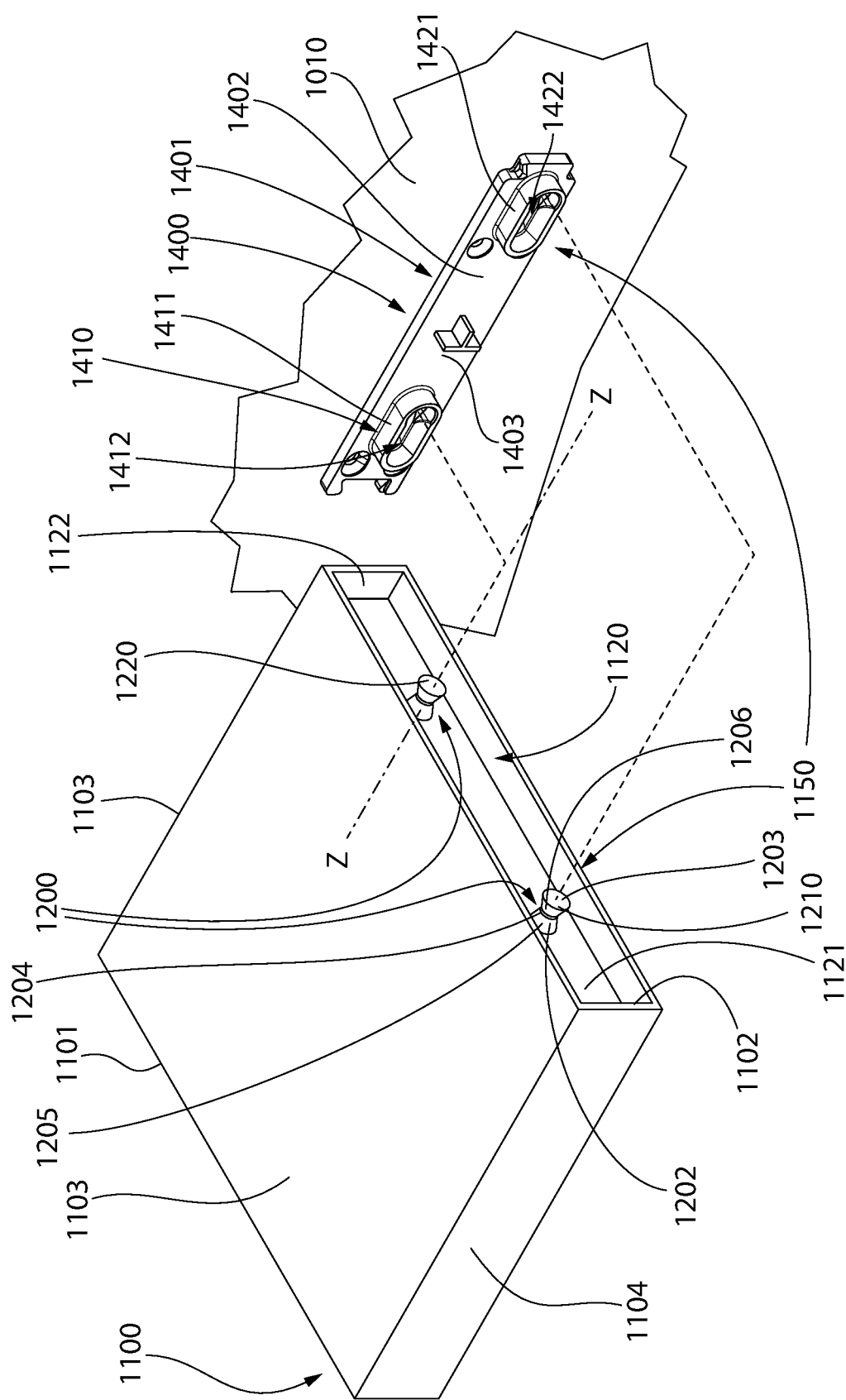
FIG. 14 is a perspective view of the wall hanging system illustrating the wall having a first mounting assembly thereon and the wall décor item having a second mounting assembly thereon.

In this embodiment, once the wall décor item 1100 is in this position, the first mounting assembly 1400 (including the entirety of the bracket member 1401 which includes the plate portion 1402 and the first and second annular walls 1411, 1421) nests within the mounting recess 1120 of the wall décor item 1100. In particular, the rear surface 1102 of the wall décor item 1100 abuts against the wall 1010 so that the first mounting assembly 1400 is hidden from view within the mounting recess 1120 of the wall décor item 1100. As a result, the coupling assembly 1150 including the first coupling assembly 1200 (the first and second coupling elements 1210, 1220 thereof) and the second coupling assembly 1400 (the bracket member 1401 and all other constituent parts thereof) are hidden from view (as shown in FIGS. 13, 19, and 20) and none of the aforementioned coupler components are visible when the wall décor item 1100 is mounted on the wall 1010).

Figure 21:
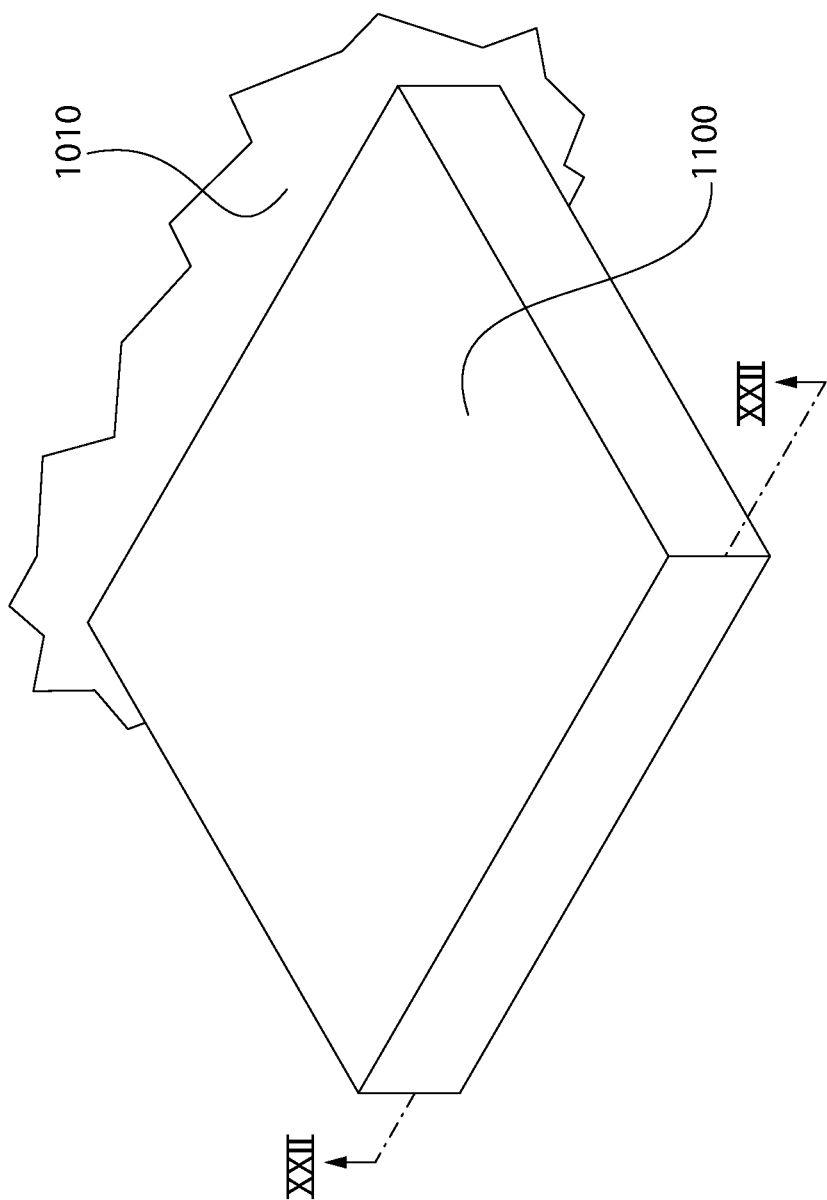
FIG. 21 is the perspective view if FIG. 19 with the wall décor item having been slid along the wall so that the post of the second mounting assembly slides into a nesting portion of the cavity of the first mounting assembly.
Figure 22:
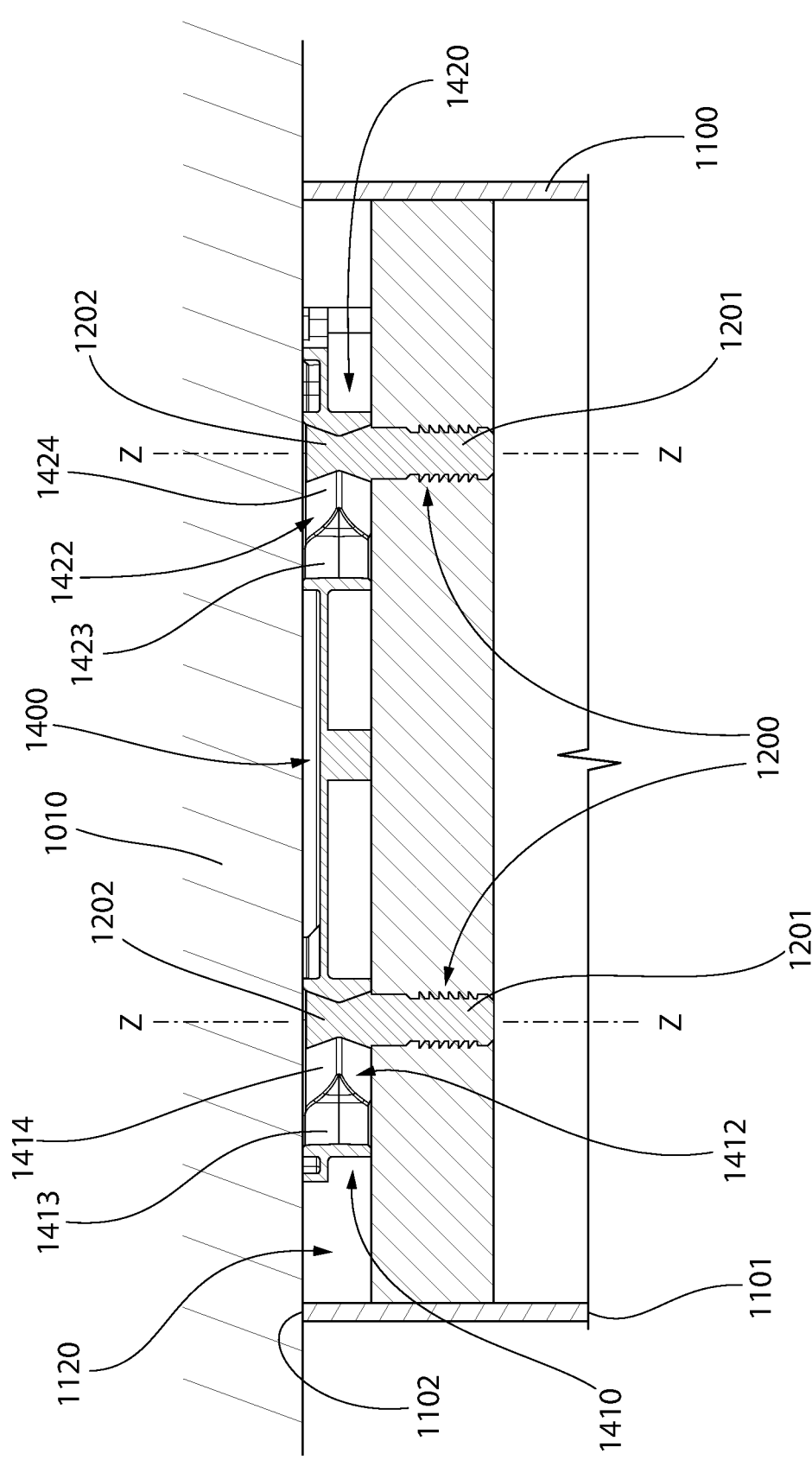
FIG. 22 is a cross-sectional view taken along line XXII-XXII of FIG. 21.
Figure 23:
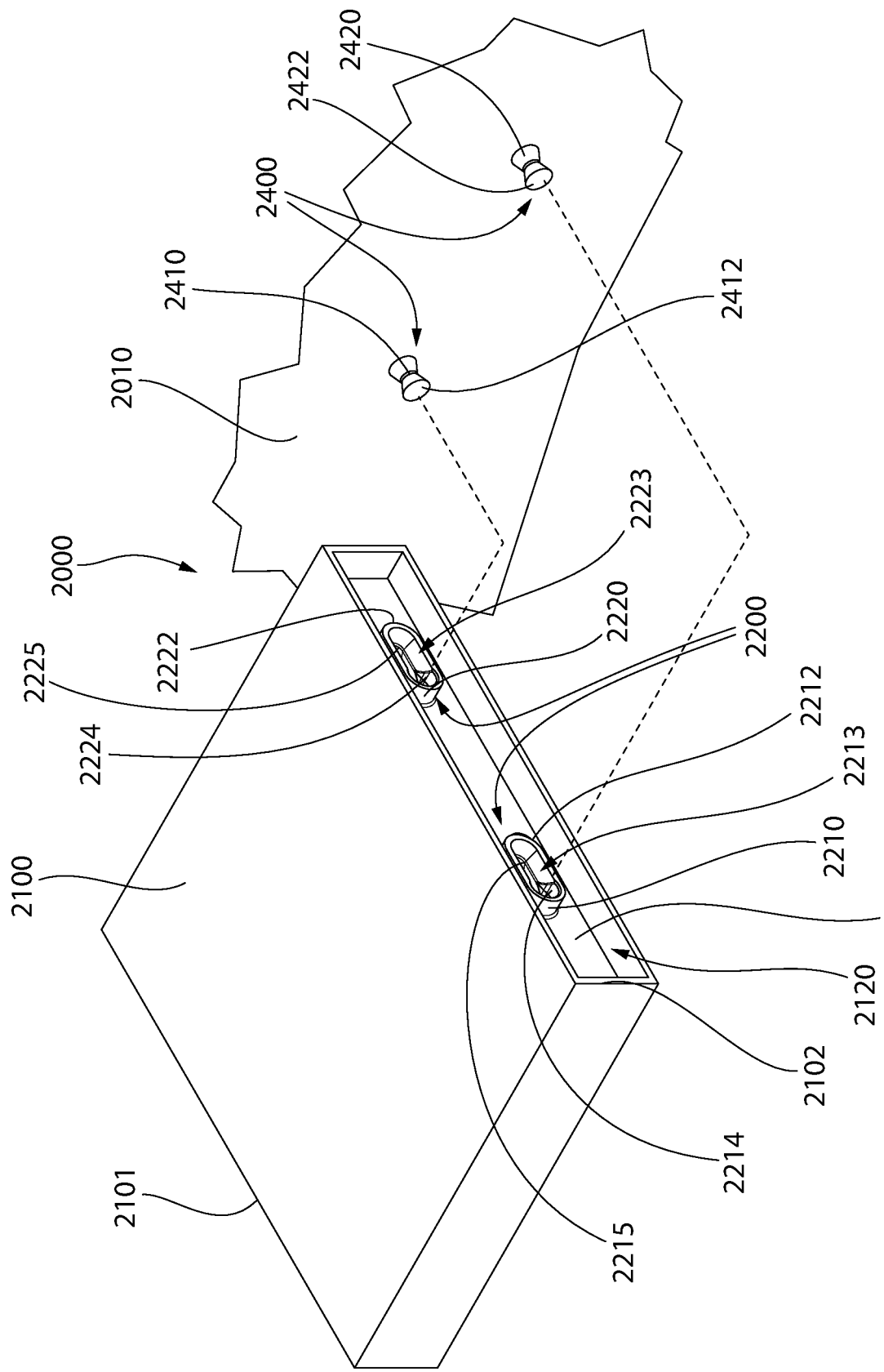
FIG. 23 is a perspective view of a wall hanging system in accordance with an alternative embodiment of the present invention, illustrating the wall having a first mounting assembly thereon and the wall décor item having a second mounting assembly thereon.
Figure 24:
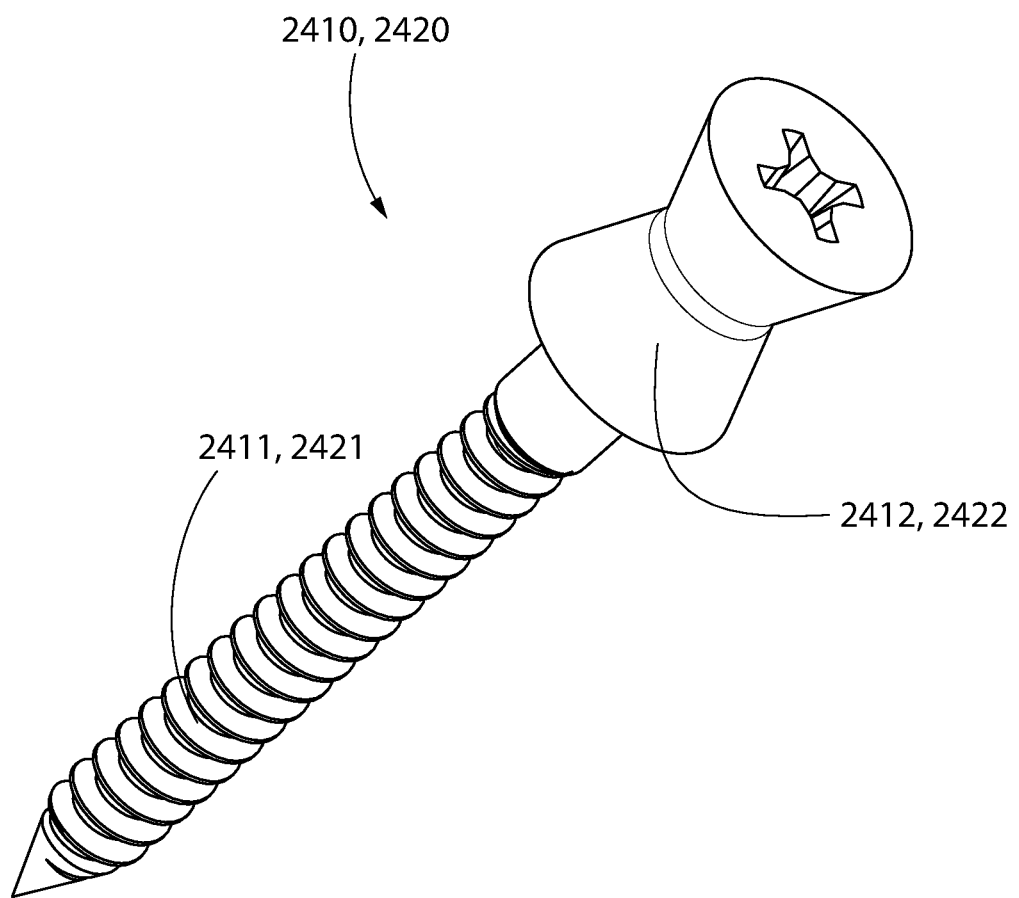
FIG. 24 is a perspective view of the first mounting assembly of the wall hanging system of FIG. 23.
Figure 25:
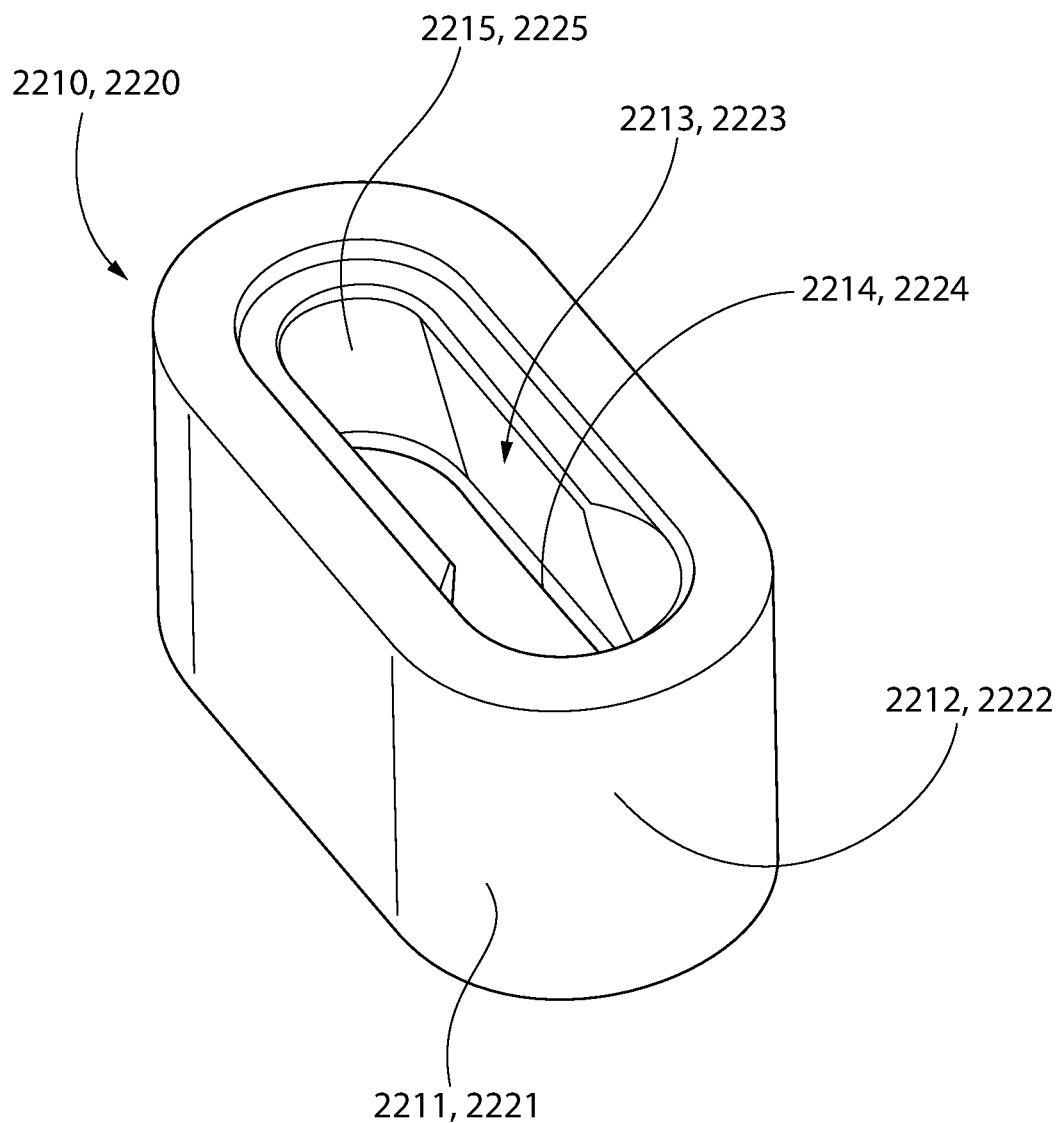
FIG. 25 is a perspective view of the second mounting assembly of the wall hanging system of FIG. 23.
Figure 26:
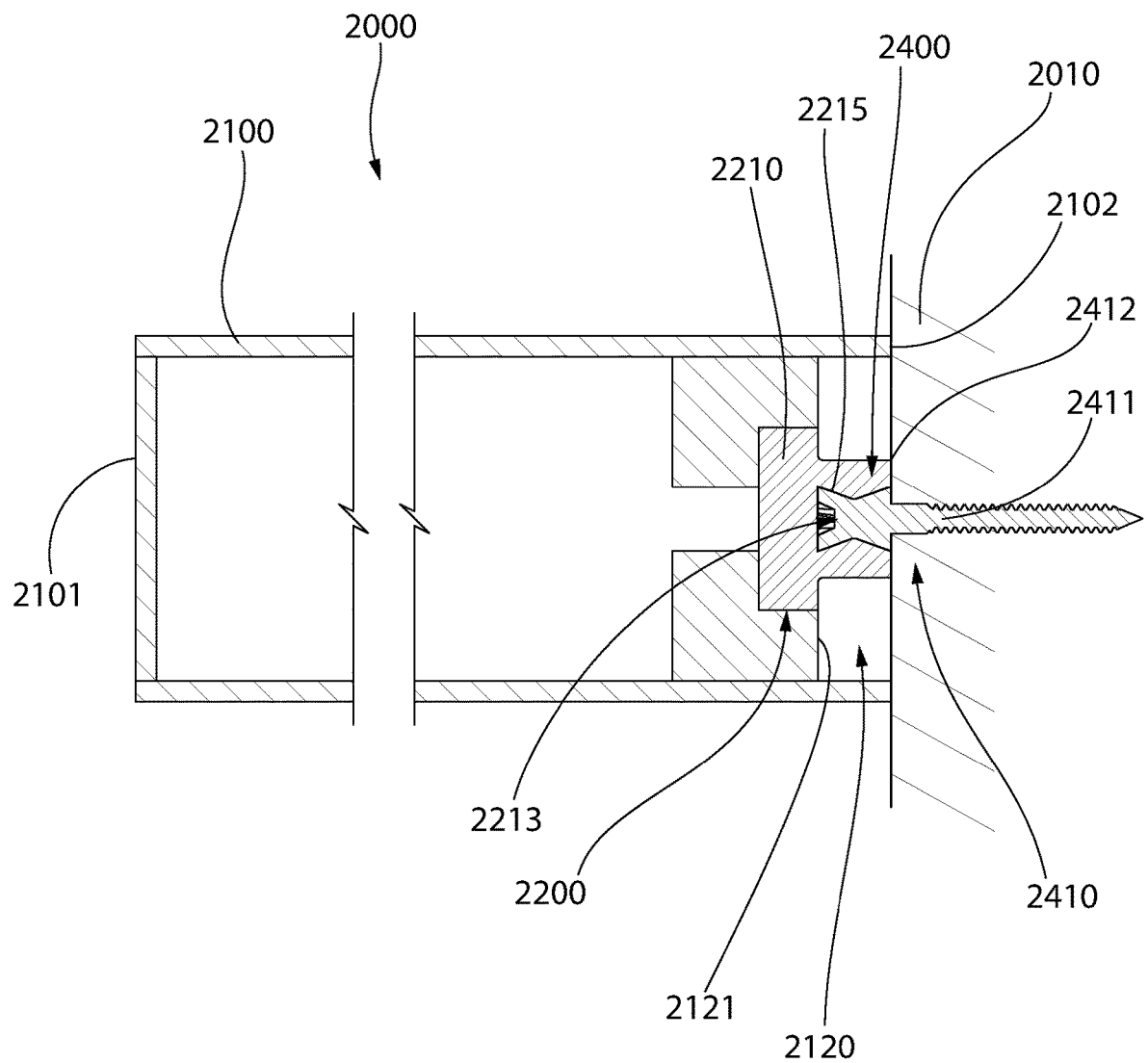
FIG. 26 is a cross-sectional view taken along line XV-XV of FIG. 13 illustrating the wall hanging system of FIG. 23.

Next, referring to FIGS. 21 and 22, the wall décor item 1100 is slid or translated along the wall 1010 relative to the first mounting assembly 1400 (as shown by the arrows as well in FIGS. 19 and 20) to move the second portions 1202 of the first and second mounting elements 1210, 1220 of the second mounting assembly 1200 from the insertion portions 1413, 1423 of the first and second cavities 1412, 1422 to the nesting portions 1414, 1424 of the first and second cavities 1412, 1422. The wall décor item 1100, and hence also the posts formed by the second portions 1202 of the first and second mounting elements 1210, 1220 of the second mounting assembly 1200, are slid in a direction transverse to the longitudinal axis Z-Z of the posts when moving from the insertion portions 1413, 1423 to the nesting portions 1414, 1424 of the first and second cavities 1412, 1422.

As discussed above, the nesting portions 1414, 1424 of the first and second cavities 1412, 1422 have a shape that matches the cross-sectional shape of the second portions 1202 of the first and second mounting elements 1210, 1220 of the second mounting assembly 1200. This is seen in FIG. 22, whereby the inner surface of the first and second mounting elements 1410, 1420 which define the first and second cavities 1412, 1422 mates/interacts/engages the outer surface of the second portions 1202 of the first and second mounting elements 1210, 1220 of the second mounting assembly 1200. Thus, when the second portions 1202 of the first and second mounting elements 1210, 1220 of the second mounting assembly 1200 are located in the nesting portions 1414, 1424 of the first and second cavities 1412, 1422 of the first mounting assembly 1400, the first and second mounting elements 1210, 1220 of the second mounting assembly 1200 cannot be removed from the first and second cavities 1412, 1422 unless the second portions 1202 of the first and second mounting elements 1210, 1220 of the second mounting assembly 1200 are first slid back to the insertion portions 1413, 1423 of the first and second cavities 1412, 1422.

Specifically, reviewing FIGS. 15 and 22 concurrently, the interaction between the first and second cavities 1412, 1422 of the first and second mounting elements 1410, 1420 of the first mounting assembly 1400 and the second portions 1202 of the first and second mounting elements 1310, 1320 of the second mounting assembly 1200 can be readily seen when the second portions 1202 of the first and second mounting elements 1210, 1220 of the second mounting assembly 1200 are located in the nesting portions 1414, 1424 of the first and second cavities 1412, 1414. The interaction of the inner surfaces of the first and second mounting elements 1410, 1420 of the first mounting assembly 1400 and the outer surfaces of the second portions 1202 of the first and second mounting elements 1210, 1220 of the second mounting assembly 1200 prevents separation of the first and second mounting elements 1210, 1220 of the second mounting assembly 1200 from the cavities 1412, 1422 of the first and second mounting elements 1410, 1420 of the first mounting assembly 1400, and hence also prevents detachment of the wall décor item 1100 from the wall 1010.

In some embodiments, the second portions 1202 of the first and second mounting elements 1210, 1220 of the second mounting assembly may be similar or identical in structure and function to one of the male couplers 200, 400, 600 described above with reference to the furniture assembly shown in FIGS. 1-12D. Furthermore, the cavities 1412, 1422 of the first and second mounting elements 1410, 1420 of the first mounting assembly 1400 may be similar or identical in structure and function to the female couplers 300, 500, 700 described above with reference to the furniture assembly shown in FIGS. 1-12D. Thus, the description for those components provided above may be applicable and applied to these components.

As noted briefly above, in the exemplified embodiment the second portions 1202 of the first and second mounting elements 1210, 1220 of the second mounting assembly 1200 are located within the mounting recess 1120. In other embodiments, the second portions 1202 of the first and second mounting elements 1210, 1220 of the second mounting assembly 1200 may protrude from the rear surface 1102 of the wall décor item 1100. Similarly, in the exemplified embodiment the first and second cavities 1412, 1422 of the first and second mounting elements 1410, 1420 of the first mounting assembly 1400 are located along an outside of the wall 1010 (i.e., they protrude from the wall 1010). In other embodiments, the first and second cavities 1412, 1422 may be located in holes that are formed into the wall 1010. In this situation, the same engagement between the first and second mounting elements 1210, 1220 of the second mounting assembly 1200 and the first and second mounting elements 1410, 1420 of the second mounting assembly 1200 is possible as described herein, although the mounting recess 1120 may be omitted and the second portions 1202 of the first and second mounting elements 1210, 1220 of the second mounting assembly 1200 will extend into the wall 1010 rather than being positioned adjacent to an outer surface of the wall 1010 as with the exemplified embodiment.

Referring to FIGS. 23-26, another embodiment of a wall hanging system 2000 is illustrated in accordance with an embodiment of the present invention. The wall hanging system 2000 is similar to the wall hanging system 1000 described above with reference to FIGS. 13-22, except for the modifications described herein below.

The wall hanging system 2000 comprises a wall décor item 2100 that is configured to be hung on or mounted from a wall 2010. The wall décor item 2100 is identical to the wall décor item 1100 described above, and thus the structural details thereof will not be repeated herein the interest of brevity. However, briefly the wall décor item 2100 comprises a front surface 2101, a rear surface 2102, and a mounting recess 2120 having a floor 2121 formed into the rear surface 2102. When the wall décor item 2100 is mounted to the wall 2010, the rear surface 2102 of the wall décor item 2100 faces or abuts against the wall 2010.

The wall hanging system 2000 comprises a first mounting assembly 2400 that is configured to be coupled directly to the wall 2010 and a second mounting assembly 2200 that is configured to be coupled directly to the wall décor item 2100. The first and second mounting assemblies 2400, 2200 are configured to interact and/or mate with one another to mount or hang the wall décor item 2100 from the wall 2010.

The first mounting assembly 2400 comprises a first mounting element 2410 and a second mounting element 2420 that are configured to be coupled to the wall 2010. The first mounting element 2410 comprises a first portion 2411 configured to be embedded within the wall 2010 when the first mounting element 2410 is coupled to the wall 2010 and a second portion 2412 that protrudes from the wall 2010. The second mounting element 2420 comprises a second portion 2421 configured to be embedded within the wall 2010 when the second mounting element 2420 is coupled to the wall 2010 and a second portion 2422 that protrudes from the wall 2010. In the exemplified embodiment, the first portions 2411, 2421 of the first and second mounting elements 2410, 2420 comprises screw threads or barbs that facilitate that coupling of the first and second mounting elements 2410, 2420 to the wall, much in the same way that a wall anchor or screw is attached to a wall. The second portions 2412, 2422 of the first and second mounting elements 2410, 2420 form posts that protrude from the wall 2010. The second portions 2414, 2422 have an identical shape to the second portions 1202 of the first and second mounting elements 1210, 1220 described above (i.e., an hourglass shape). Thus, the description of the second portions 1202 of the first and second mounting elements 1210, 1220 is applicable to the second portions 2412, 2422 of the first and second mounting elements 2410, 2420.

The second mounting assembly 2200 comprises a first mounting element 2210 and a second mounting element 2220. In this embodiment, the first and second mounting elements 2210, 2220 are separate components that are separately coupled to the wall décor item 1100 within the mounting recess 2120. In other embodiments, the first and second mounting elements 2210, 2220 could be part of a singular bracket member similar to the first mounting assembly 1400 described above. The first mounting element 2210 comprises a first portion 2211 that is embedded within the wall décor item 2100 and a second portion 2212 that protrudes from the floor 2121 of the mounting recess 2120 of the wall décor item 2100. The second mounting element 2220 comprises a second portion 2221 that is embedded within the wall décor item 2100 and a second portion 2222 that protrudes from the floor 2121 of the mounting recess 2120 of the wall décor item 2100. The first portions 2211, 2221 of the first and second mounting elements 2210, 2220 may include barbs or the like to affix the first and second mounting elements 2210, 2220 to the wall décor item 2100. In other embodiments, the first portions 2211, 2221 of the first and second mounting elements 2210, 2220 may be affixed to the wall décor item 2100 using adhesive, friction fit, or the like.

In this embodiment, the second portions 2212, 2222 of the first and second mounting elements 2210, 2220 of the second mounting assembly 2200 each define a cavity that is configured to interact with the second portions 2412, 2422 of the first and second mounting elements 2410, 2420 of the first mounting assembly 2400 which is mounted on the wall 2010. Specifically, the second portion 2212 of the first mounting element 2210 comprises a first cavity 2213 having an insertion portion 2214 and a nesting portion 2215 and the second portion 2222 of the second mounting element 2220 comprises a second cavity 2223 having an insertion portion 2224 and a nesting portion 2225. The details of the first and second cavities 2213, 2223 is the same as the first and second cavities 1412, 1422 described above and will not be repeated herein in the interest of brevity.

In this embodiment, the mounting of the wall décor item 2100 to the wall 2010 is the same as that which was described in the previous embodiment. Specifically, the rear surface 2102 of the wall décor item 2100 is made to face the wall 2010 and then the wall décor item 2100 is moved towards the wall 2010 (and towards the first mounting assembly 2400 which is on the wall 2010) until the second portions 2412, 2422 of the first and second mounting elements 2410, 2420 of the first mounting assembly 2400 extend into the insertion portions 2214, 2224 of the first and second cavities 2213, 2223 of the first and second mounting elements 2210, 2220 of the second mounting assembly 2200. Next, the wall décor item 2100 is slid along the wall 2010 so that the second portions 2412, 2422 of the first and second mounting elements 2410, 2420 of the first mounting assembly 2400 slide into the nesting portions 2215, 2225 of the first and second cavities 2213, 2223 of the first and second mounting elements 2210, 2220 of the second mounting assembly 2200. At this point, the wall décor item 2100 is mounted on the wall 2010 and cannot be removed without sliding the first and second mounting elements 2410, 2420 of the first mounting assembly 2400 back into the insertions portions 2214, 2224 as has been described above.

In the exemplified embodiment, the first and second mounting elements 2210, 2220 are coupled to the wall décor item 2100 in a horizontal orientation. That is, cavities 2213, 2223 of the first and second mounting elements 2210, 2220 are elongated in a horizontal direction (between lateral sides of the wall décor item 2100). However, the invention is not to be so limited and in other embodiments the first and second mounting elements 2210, 2220 could be coupled to the wall décor item 2100 in a vertical orientation such that cavities 2213, 2223 of the first and second mounting elements 2210, 2220 are elongated in a vertical direction (between top and bottom surfaces of the wall décor item 2100). With the first and second mounting elements 2210, 2220 in a vertical orientation, the wall décor item 2100 may be slid/translated downwardly to move the first and second mounting elements 2410, 2420 of the first mounting assembly 2400 from the insertion portions 2214, 2224 of the cavities 2213, 2223 of the first and second mounting elements 2210, 2220 to the nesting portions 2215, 2225 of the cavities 2213, 2223 of the first and second mounting elements 2210, 2220 instead of horizontally as with the other embodiments described herein.

Figure 27:
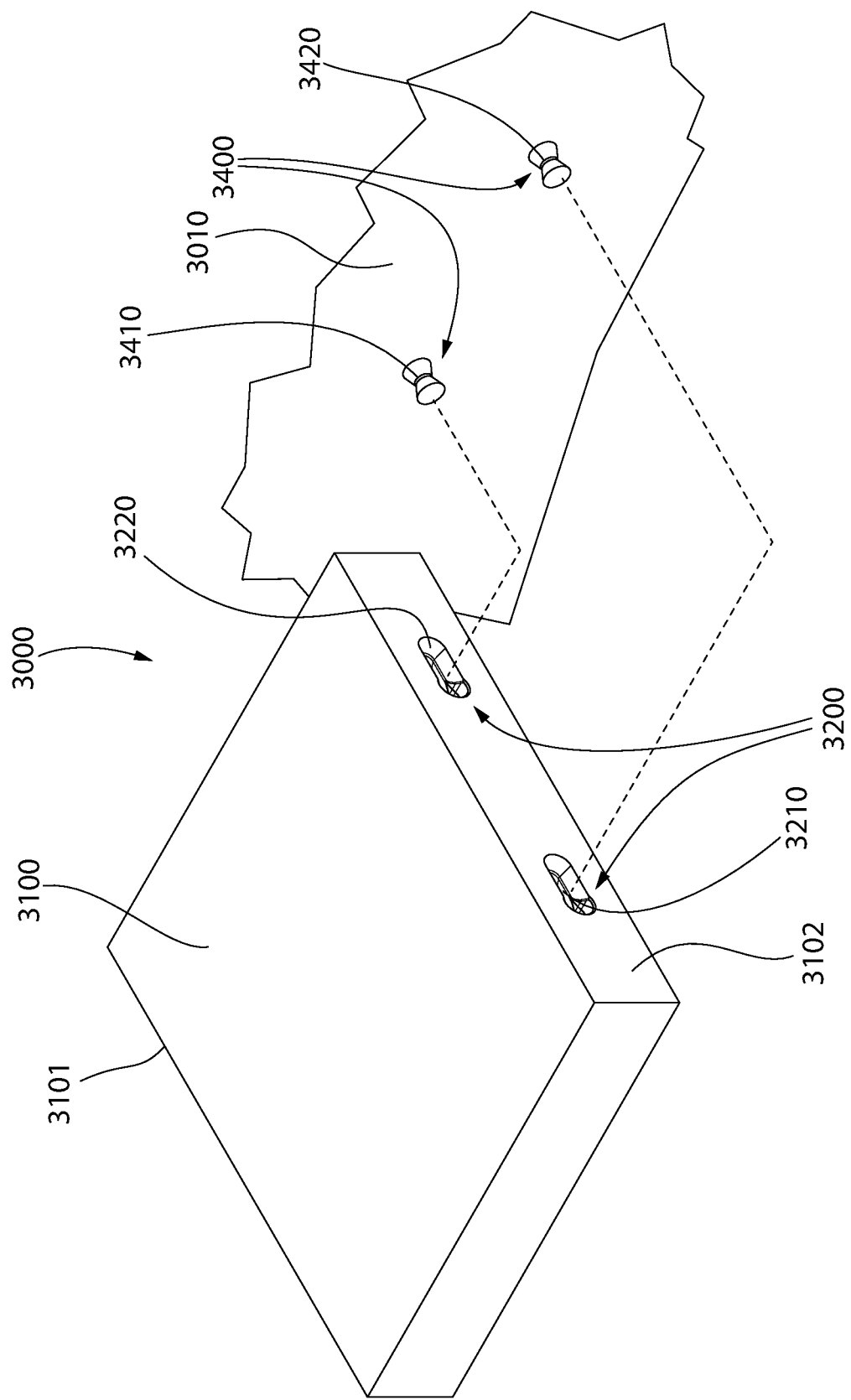
FIG. 27 is a perspective view of a wall hanging system in accordance with another alternative embodiment of the present invention, illustrating the wall having a first mounting assembly thereon and the wall décor item having a second mounting assembly thereon.
Figure 28:
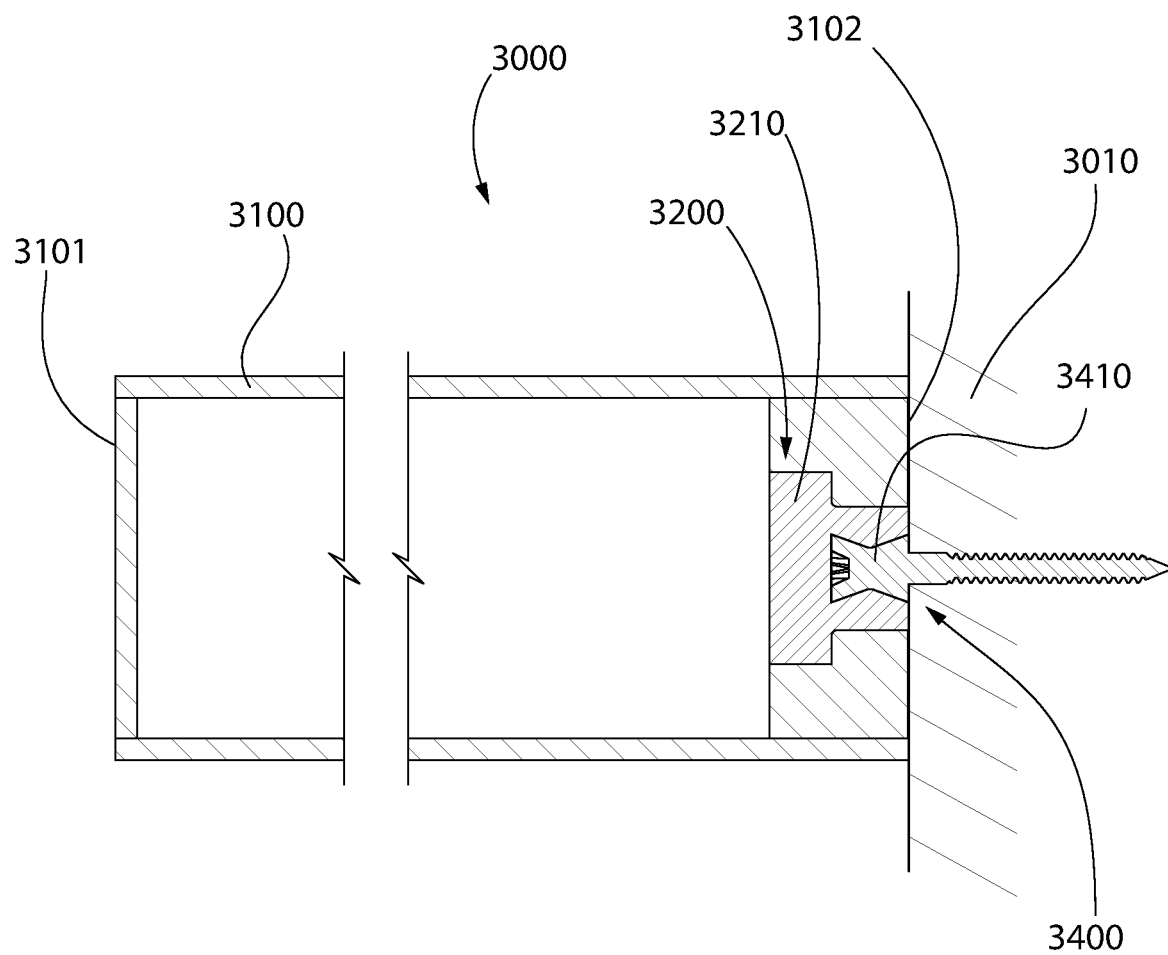
FIG. 28 is a cross-sectional view taken along line XV-XV of FIG. 13 illustrating the wall hanging system of FIG. 23.

Referring to FIGS. 27 and 28, another embodiment of a wall hanging system 3000 is illustrated and will be described. The wall hanging system 3000 generally comprises a wall décor item 3100, a first mounting assembly 3400 configured to be mounted to a wall 3010, and a second mounting assembly 3200 configured to be mounted to the wall décor item 3100. This embodiment is very similar to the wall hanging system 2000 described above with reference to FIGS. 23-26, with the only difference being that there is no mounting recess in the rear surface of the wall décor item 3100.

Specifically, the wall décor item 3100 has a front surface 3101 and a rear surface 3102. The second mounting assembly 3400 comprises a first mounting element 3410 and a second mounting element 3420 which are identical to the first and second mounting elements 2410, 2420 of the second mounting assembly 2400 described above. In this embodiment, the first and second mounting elements 3410, 3420 are positioned within openings in the rear surface 3102 of the wall décor item 3400. More particularly, in this embodiment the first and second mounting elements 3410, 3420 are positioned entirely within openings in the rear surface 3102 of the wall décor item 3400 such that there is no portion of the first and second mounting elements 3410, 3420 which protrudes from the rear surface 3102 of the wall décor item 3100. Thus, when the wall décor item 3100 is mounted to the wall 3010, the first and second mounting assemblies 3400, 3200 are hidden from view, but they are disposed within the openings in the rear surface 3102 of the wall décor item 3100 rather than being located within a mounting recess as with the previously described embodiments. The wall décor item 3100 is mounted to the wall 3010 due to engagement between the first and second mounting elements 3210, 3220 of the second mounting assembly 3200 and the first and second mounting elements 3410, 3420 of the first mounting assembly 3400 in the same manner as described above (inserting posts into insertion portion of cavity and then sliding the posts into the nesting portion of the cavity).

Figure 29A:
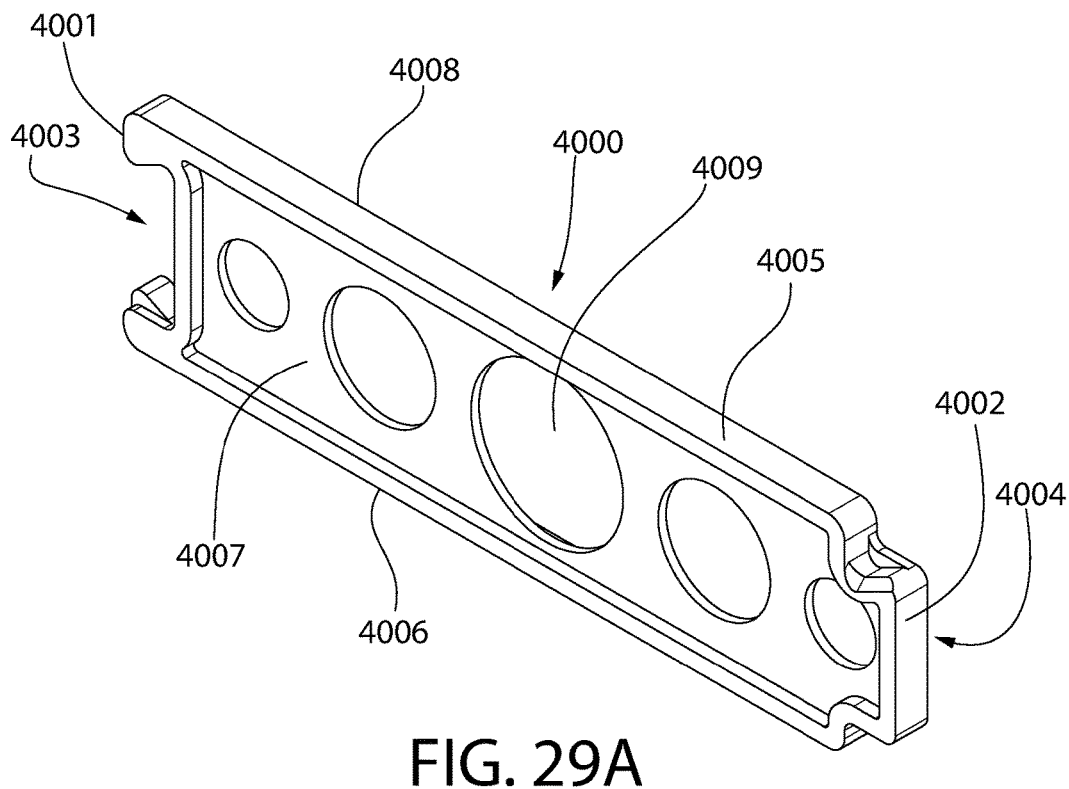
FIG. 29A is a perspective view of an extension member in accordance with a first embodiment of the present invention.
Figure 29B:
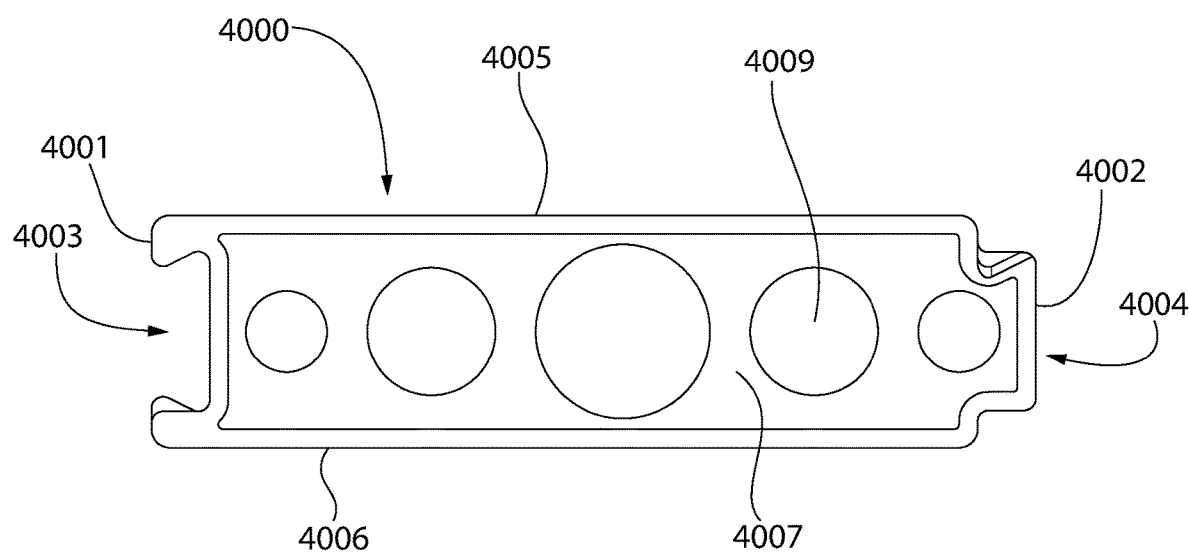
FIG. 29B is a front view of the extension member of FIG. 29A.

Referring to FIGS. 29A and 29B, an extension bracket 4000 is illustrated in accordance with an embodiment of the present invention. One or more of the extension brackets 4000 are configured to be mounted on the wall alongside of one or more of the bracket members 1401 of the first mounting assembly 1400 described above with reference to FIGS. 13-16B in order to form a track that maintains alignment on the wall, as discussed further below with reference to FIGS. 31 and 32.

The extension bracket 4000 comprises a first side edge 4001 and a second side edge 4002. The first side edge 4001 comprises a third coupling feature 4003 and the second side edge 4002 comprises a fourth coupling feature 4004. In the exemplified embodiment, the third coupling feature 4003 is a recess and the fourth coupling feature 4004 is a protrusion. More specifically, in the exemplified embodiment the third coupling feature 4003 comprises a dovetail recess and the fourth coupling feature 4004 comprises a dovetail protrusion. Of course, the dovetail shapes are merely exemplary and are not required in all embodiments, so long as the interaction between the extension brackets 4000 and the mounting brackets 1401 of the first mounting assembly 1400 can be achieved as described herein below.

The extension bracket 4000 is elongated as it extends from the first side edge 4001 to the second side edge 4002. The extension bracket 4000 also comprises a top edge 4005 and a bottom edge 4006. In the exemplified embodiment, the extension bracket 4000 has a generally rectangular shape, although other shapes are possible in other embodiments and the invention is not limited to this unless recited in the claims. The extension bracket 4000 also comprises a front surface 4007 and a rear surface 4008. Finally, in the exemplified embodiment there are several holes 4009 formed in the extension bracket 4000 that extend from the front surface 4007 to the rear surface 4008. The holes 4009 are merely provided to reduce the volume of material used to form the extension bracket 4000. Thus, the holes 4009 could be omitted or be in other shapes in other embodiments. The extension bracket 4000 also has recessed regions on its front and rear surfaces 4007, 4008 (only the front surface is visible in the drawings, but the rear surface has an identical appearance) for the same purpose of reducing the amount of material used to form the extension bracket 4000.

The extension brackets 4000 may be made from any desired material, such as plastic, metal, wood, or the like. In fact, all of the mounting assemblies and mounting elements and extension brackets described herein may be formed from metal, plastic, wood, or any other desired rigid material that can facilitate an adequate coupling of the components as has been described herein.

Figure 30A:
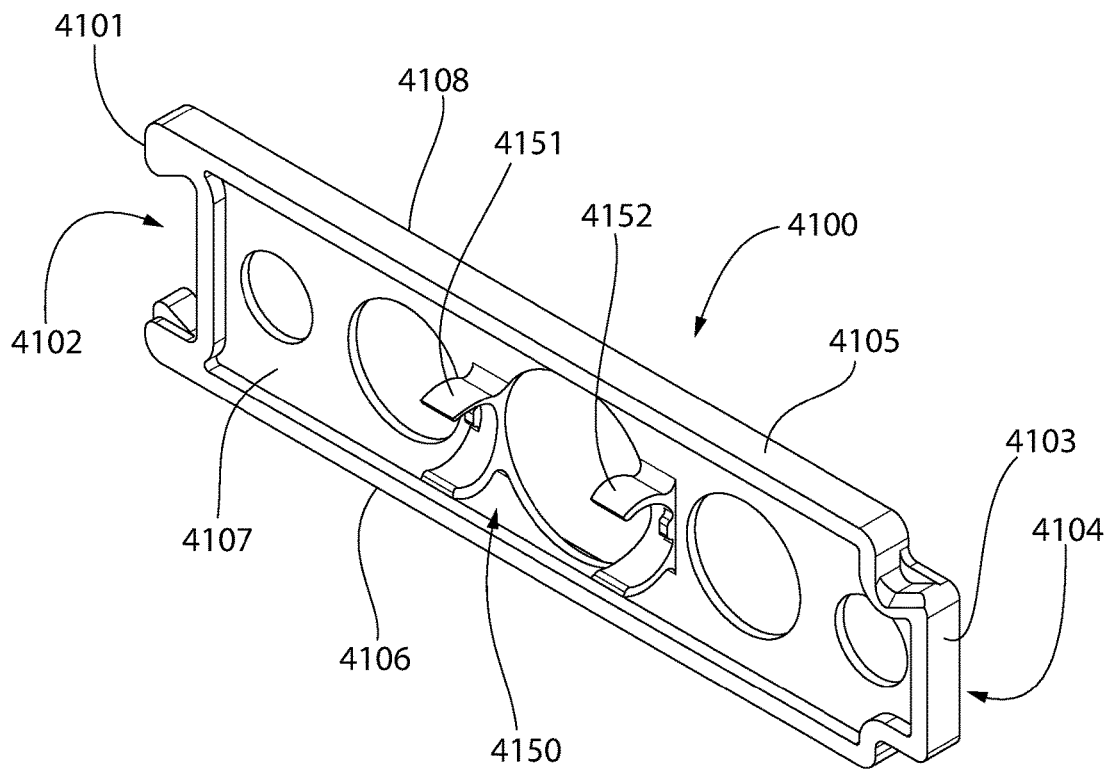
FIG. 30A is a perspective view of an extension member in accordance with a second embodiment of the present invention.
Figure 30B:
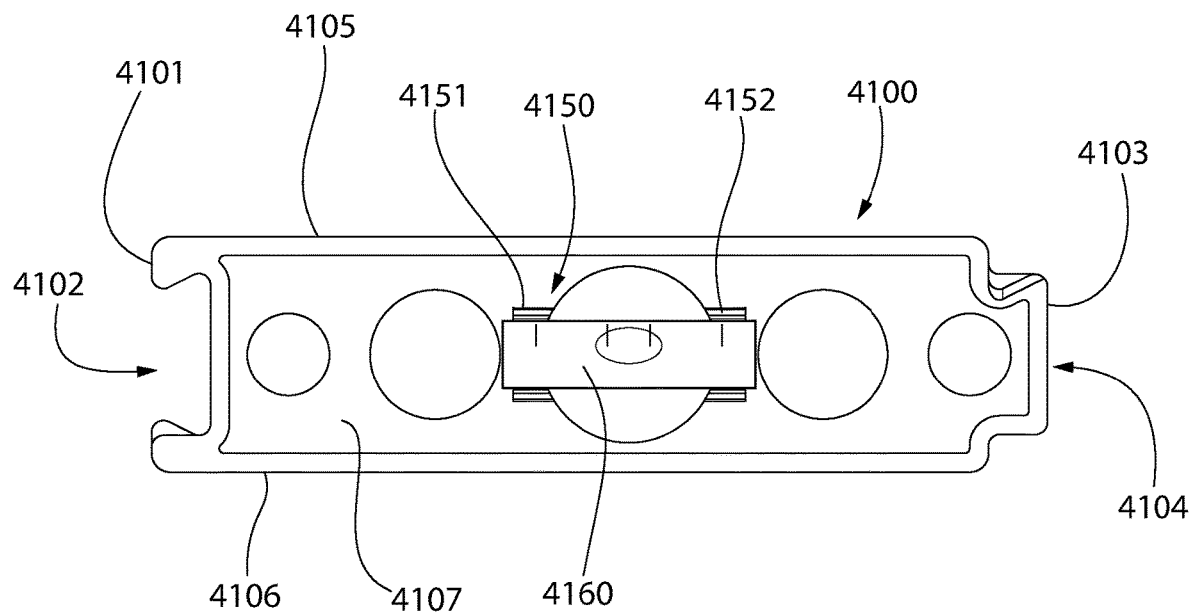
FIG. 30B is a front view of the extension member of FIG. 30A, whereby a level is held by the extension member.

Referring to FIGS. 30A and 30B, another embodiment of an extension bracket 4100 is illustrated. The extension bracket 4100 is very similar to the extension bracket 4100 described above, except for the addition of a level mount 4150. Thus, the extension bracket 4100 comprises a first side edge 4101 comprising a first coupling feature 4103 and a second side edge 4102 comprising a second coupling feature 4104. The first and second coupling features 4103, 4104 are a dovetail recess and a dovetail protrusion just as with the same features on the extension bracket 4000. The extension bracket 4100 comprises a top edge 4105, a bottom edge 4106, a front surface 4107, and a rear surface 4108.

As noted above, the only difference between the extension bracket 4100 and the extension bracket 4000 is that the extension bracket 4100 includes a level mount 4150. The level mount 4150 comprises a first C-shaped mount element 4151 and a second C-shaped mount element 4152 that protrude from the front surface 4107 of the extension bracket 4100. Of course, the exact shape of the mount elements 4151, 4152 may be modified from that shown in order to accommodate a level, so the shape of the level (spirit level, bubble level, or the like) may dictate the shape of the mount elements 4151, 4152 and their openings. The level mount 4150 is configured to support a level 4160, as shown in FIG. 30B. That is, the level 4160 can be snap-fit into the openings in the first and second C-shaped mount elements 4151, 4152. Thus, in this embodiment the level 4160 is a separate component from the extension bracket 4100 and it is detachably coupled thereto along the level mount 4150. In other embodiments, the level 4160 may be a permanent part of the extension bracket 4100 such that it cannot be detached therefrom. The level 4160 is used to ensure that the extension bracket 4100 (and track formed by the side-by-side interaction of the extension bracket 4100 and one or more of the first mounting assemblies 1400 of FIGS. 16A and 16B) are coupled to or mounted on a wall in a level manner.

Figure 31:
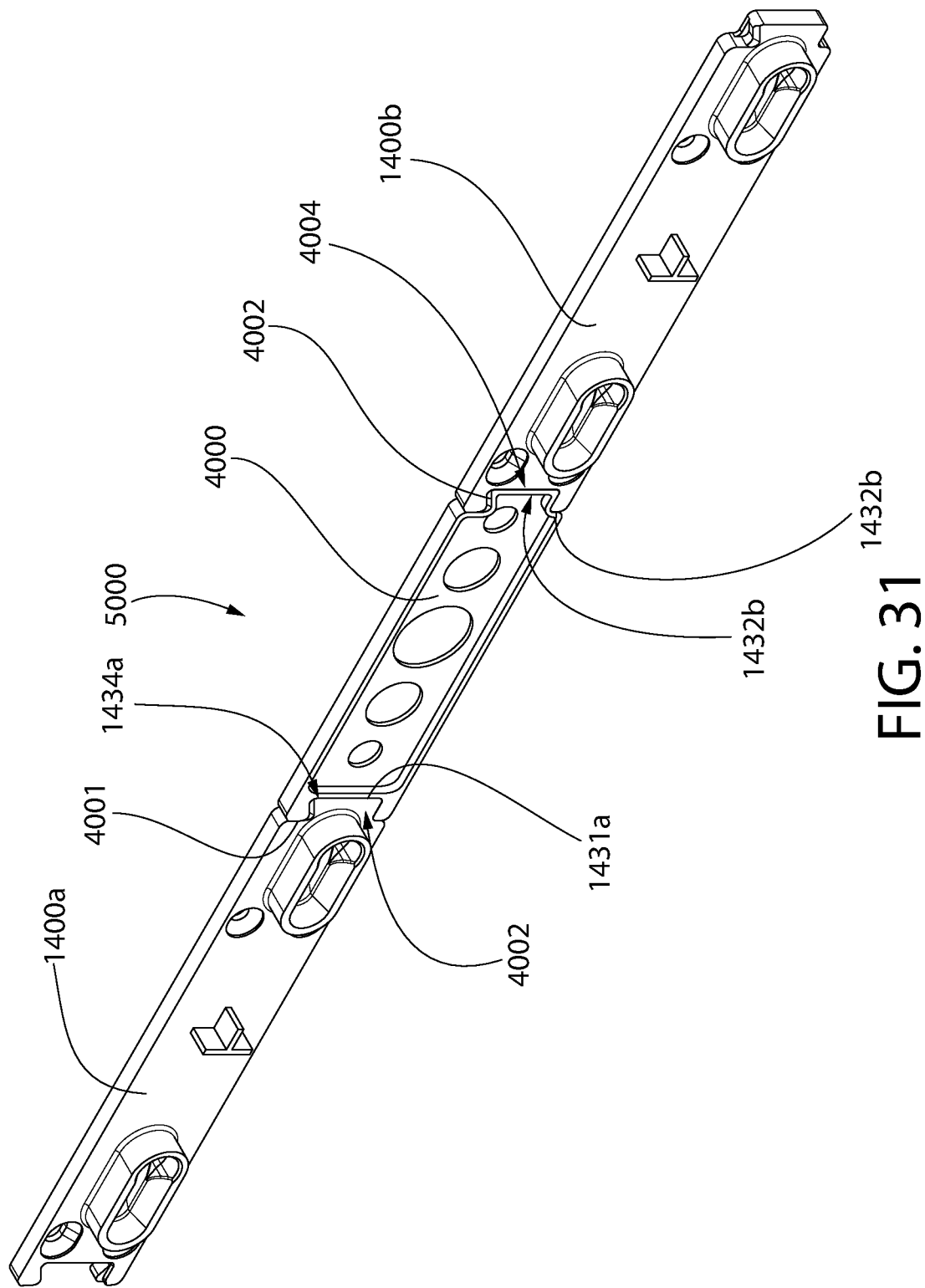
FIG. 31 is a perspective view of a wall mounting system that includes two of the first mounting assemblies of FIG. 14 and one of the extension members of FIG. 29A.
Figure 32:
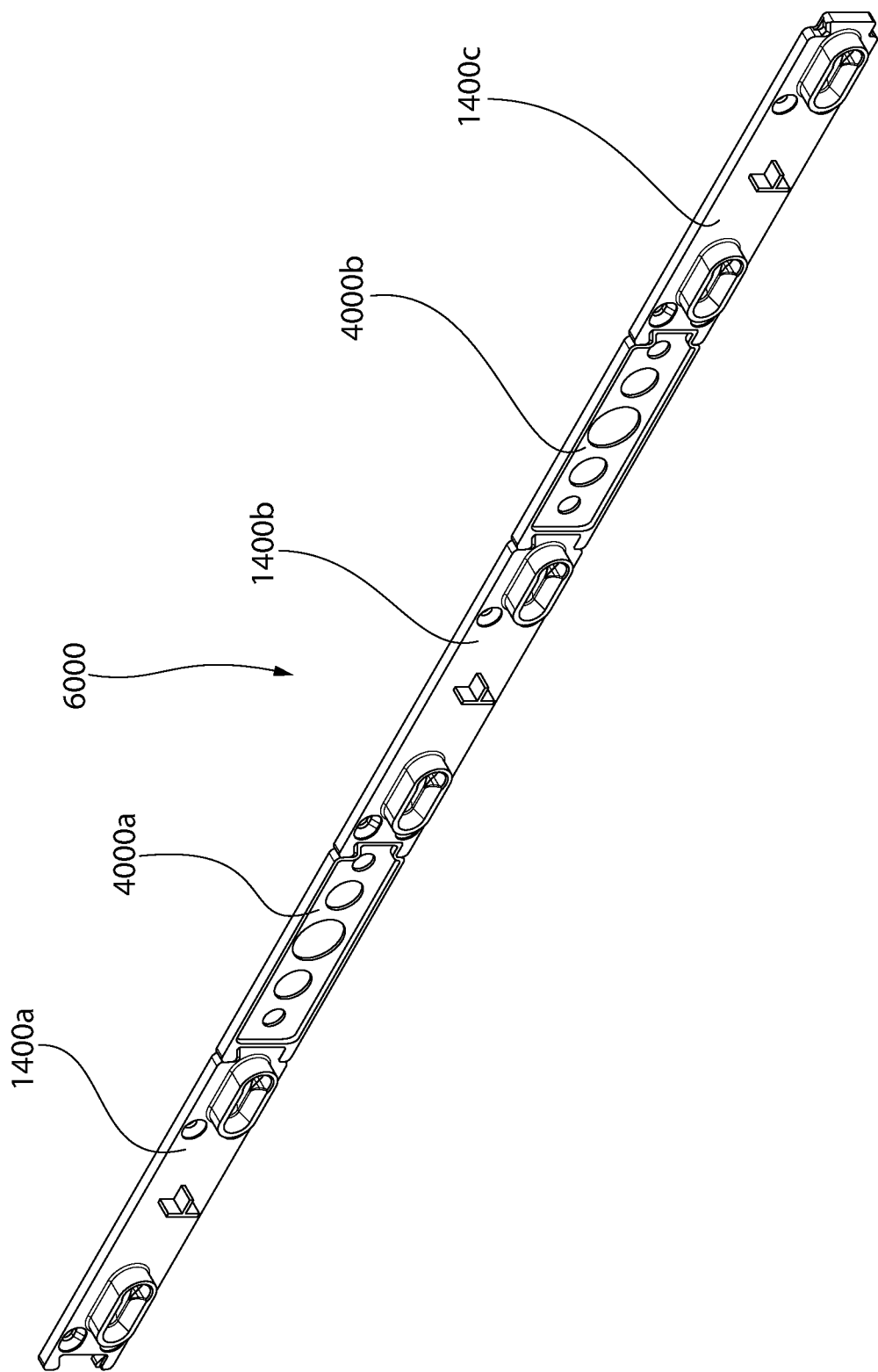
FIG. 32 is a perspective view of a wall mounting system that includes three of the first mounting assemblies of FIG. 14 and two of the extension members of FIG. 30A.

FIGS. 31 and 32 illustrate the interaction between the first mounting assemblies 1400 described with reference to FIGS. 16A and 16B and the extension brackets 4000 described above with reference to FIGS. 29A and 29B to form a track 5000. Of course, the extension brackets 4100 could easily be swapped in for the extension brackets 4000 as they have the same shape and structure with the added benefit of being able to hold a level to ensure that the track 5000 is level on the wall.

Referring first to FIG. 31, the track 5000 comprises two of the first mounting assemblies 1400a, 1400b and one of the extension brackets 4000 positioned between the two of the first mounting assemblies 1400a, 1400b. The first side edge 4001 of the extension bracket 4000 is adjacent to the second side edge 1431a of one of the first mounting assemblies 1400a and the second side edge 4002 of the extension bracket 4000 is adjacent to the first side edge 1430b of the other one of the first mounting assemblies 1400b. Thus, the first coupling feature 4002 of the extension bracket 4000 interacts or mates with the second coupling feature 1434a of the first one of the first mounting assemblies 1400a and the second coupling feature 4004 of the extension bracket 4000 interacts or mates with the first coupling feature 1432b of the second one of the first mounting assemblies 1400b. Because these coupling features are all dovetail joints (dovetail recesses and dovetail protrusions), they mate such that the dovetail protrusions fit snugly within the dovetail recesses.

In some embodiments, there may be no direct physical coupling between the extension bracket 4000 and the wall. That is, the first and second ones of the first mounting assemblies 1400a, 1400b may be directly affixed to the wall using fasteners (nails, screws, adhesive strips, etc.) as described above, but no such fasteners may be used to attach the extension bracket 4000 to the wall. Rather, the extension bracket 4000 may remain adjacent to the wall due solely to its interaction with the first and second ones of the first mounting assemblies 1400a, 1400b. Of course, in other embodiments some type of fastener may be used to affix the extension bracket 4000 to the wall in addition to its interaction with the first mounting assemblies 1400a, 1400b.

FIG. 32 illustrates another track 6000 which includes three of the first mounting assemblies 1400a, 1400b, 1400c and two of the extension brackets 4000a, 4000b. This illustrates that the length of the track can be modified as needed depending on the size of the wall décor item that is going to be mounted to the wall using the track, and more specifically using the first mounting assemblies 1400. Thus, for example, a wall décor item having a width between 6 and 15 inches may be accommodated on the wall with just one of the first mounting assemblies 1400. A wall décor item having a width between 15 and 26 inches may be accommodated on the wall with two of the first mounting assemblies 1400 and one of the extension brackets 4000 (using the track 5000 of FIG. 31). A wall décor item having a width between 26 and 36 inches may be accommodated on the wall with three of the first mounting assemblies 1400 and two of the extension brackets 4000 (using the track 6000 of FIG. 32). The number of the mounting elements of the second mounting assembly which are affixed to the wall décor item as described herein may be adjusted based on the side of the wall décor item to match with the number of the mounting elements of the first mounting assemblies 1400 that are affixed to the wall.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A wall hanging system comprising:
    a first mounting assembly configured to be coupled to a wall, the first mounting assembly comprising a plate portion having a rear surface configured to abut an outer surface of the wall when the first mounting assembly is coupled to the wall, and at least one mounting element located on the plate portion;
    a shelf comprising a rear surface configured to face the wall when the shelf is mounted to the wall and an upper surface configured to extend horizontally from the wall to form a support ledge, wherein the rear surface comprises a mounting recess;
    a second mounting assembly coupled to the shelf within the mounting recess, the second mounting assembly comprising at least one mounting element that is configured to engage the at least one mounting element of the first mounting assembly to hang the shelf from the wall;
    wherein the at least one mounting element of the second mounting assembly comprises a first post having a longitudinal axis and the at least one mounting element of the first mounting assembly comprises a first cavity having an insertion portion and a nesting portion;
    wherein the shelf is configured to be mounted to the wall by inserting the first post axially into the first cavity along the insertion portion of the cavity and then sliding the shelf relative to the first mounting assembly in a direction transverse to the longitudinal axis of the first post until the first post nests within the nesting portion of the first cavity; and
    wherein the plate portion and the at least one mounting element of the first mounting assembly nest within the mounting recess of the shelf when the first mounting assembly is coupled to the second mounting assembly.

2. The wall hanging system according to claim 1 wherein the at least one mounting element of the second mounting assembly comprises the first post and a second post that are positioned within the mounting recess of the shelf in a spaced apart manner, wherein the first mounting assembly comprises a first annular wall and a second annular wall protruding from a front surface of the plate in a spaced apart manner, the first annular wall defining the first cavity that is configured to receive the first post and the second annular wall defining a second cavity that is configured to receive the second post.

3. The wall hanging system according to claim 1 wherein the mounting recess comprises a floor that is recessed relative to the rear surface of the shelf, and wherein the at least one mounting element of the second mounting assembly comprises the first post and a second post, each of the first and second posts comprising a first portion that is embedded within the shelf and a second portion that protrudes from the floor of the mounting recess to a distal end that is flush with or recessed relative to the rear surface of the shelf, and wherein when the shelf is mounted to the wall the rear surface of the shelf abuts against the wall and the first and second posts nest within the first and second cavities of the first mounting assembly, respectively.

4. The wall hanging system according to claim 1 wherein the first post and the nesting portion of the first cavity comprise corresponding shapes that prevents disengagement of the first and second mounting assemblies when the first post is located along the nesting portion of the first cavity without first sliding the first post into the insertion portion of the first cavity.

5. The wall hanging system according to claim 1 wherein the plate portion extends from a first side edge to a second side edge, the first side edge comprising a first coupling feature and the second side edge comprising a second coupling feature.

6. The wall hanging system according to claim 5 further comprising an extension bracket extending from a first side edge to a second side edge, the first side edge comprising a third coupling feature and the second side edge comprising a fourth coupling feature, and wherein the extension bracket is configured to be mounted on the wall between two of the first mounting assemblies such that the third coupling feature of the extension bracket mates with the second coupling feature of a first one of the first mounting assemblies and the fourth coupling feature of the extension bracket mates with the first coupling feature of a second one of the first mounting assemblies.

7. The wall hanging system according to claim 6 further comprising a level component coupled to the extension bracket to facilitate level mounting of the shelf on the wall.

8. The wall hanging system according to claim 1 further comprising:
    wherein the at least one mounting element of the first mounting assembly comprises a first mounting element comprising the first cavity and a second mounting element comprising a second cavity; and
    wherein the at least one mounting element of the second mounting assembly comprises the first post and a second post, each of the first and second posts comprising a first portion that is embedded within the shelf to couple the first and second posts to the shelf and a second portion that protrudes from the shelf; and wherein the shelf is coupled to the first mounting assembly by simultaneously inserting the second portion of the first post into the insertion portion of the first cavity and the second portion of the second post into the insertion portion of the second cavity and then sliding the shelf relative to the first mounting assembly to slide the second portions of the first and second posts into the nesting portions of the first and second cavities, respectively.

9. The wall hanging system according to claim 1 wherein the first post is configured to move axially into and out of the first cavity along the insertion portion of the first cavity and is prevented from moving axially into and out of the first cavity along the nesting portion of the first cavity due to the first post and the nesting portion of the first cavity having mating shapes that form an interlock between the first post and a sidewall that defines the first cavity when the first post is located within the nesting portion of the first cavity.

10. A wall hanging system comprising:
    a mounting bracket configured to be coupled to a wall, the mounting bracket comprising a plate portion configured to abut against an exposed outer surface of the wall and at least one cavity having an insertion portion and a nesting portion;
    a wall décor item comprising a rear surface that is configured to face the wall and a mounting recess formed into the rear surface and having a floor that is recessed relative to the rear surface;
    at least one mounting element coupled to the wall décor item within the mounting recess, the at least one mounting element comprising a first portion that is embedded within the floor of the mounting recess of the wall décor item and a post portion protruding from the floor of the mounting recess of the wall décor item along a longitudinal axis;
    wherein the wall décor item is mounted to the wall by inserting the post portion of the at least one mounting element axially into the at least one cavity along the insertion portion of the at least one cavity and then sliding the wall décor item relative to the mounting bracket in a direction transverse to the longitudinal axis until the at least one post portion nests within the nesting portion of the at least one cavity; and
    wherein an entirety of the plate portion of the mounting bracket is disposed within the mounting recess of the wall décor item and hidden from view when the wall décor item is mounted to the mounting bracket.

11. The wall hanging system according to claim 10 wherein the at least one mounting element is coupled to the wall décor item within the mounting recess so that a distal end of the post portion is flush with or recessed relative to the rear surface of the wall décor item.

12. The wall hanging system according to claim 10 wherein the nesting portion of the cavity and the post portion of the at least one mounting element have corresponding shapes so that the post portion cannot be inserted into the cavity along the nesting portion of the cavity and so that the post portion cannot be removed from the cavity when positioned along the nesting portion of the cavity without first sliding the post portion to the insertion portion of the cavity.

13. The wall hanging system according to claim 10 wherein the plate portion of the mounting bracket comprises a rear surface configured to face the wall, a front surface opposite the rear surface, and at least one annular wall protruding from the front surface and defining the at least one cavity.

14. A wall hanging system comprising:
    a wall décor item having at least one first type of mounting element;
    a first mounting bracket and a second mounting bracket, each of the first and second mounting brackets comprising a first end, a second end, a rear surface, and at least one second type of mounting element, the first end comprising a first coupling feature and the second end comprising a second coupling feature, the first and second mounting brackets being elongated in a direction between the first and second ends;
    an extension bracket comprising a first end, a second end, and a rear surface, the first end comprising a third coupling feature and the second end comprising a fourth coupling feature, the extension bracket being elongated in a direction between the first and second ends;
    wherein the first and second mounting brackets and the extension bracket are configured to be coupled to the wall with the rear surfaces of the first and second mounting brackets and the extension bracket configured to abut against an outer surface of the wall, and wherein the extension bracket extends between the first and second mounting brackets such that the first end of the extension bracket is adjacent to the second end of the first mounting bracket and the third coupling feature of the extension bracket mates with the second coupling feature of the first mounting bracket and the second end of the extension bracket is adjacent to the first end of the second mounting bracket and the fourth coupling feature of the extension bracket mates with the first coupling feature of the second mounting bracket; and
    wherein the wall décor item is mounted to the wall via engagement between the at least one first type of mounting element of the wall décor item and the at least one second type of mounting element of the first and second mounting brackets.

15. The wall hanging system according to claim 14 wherein the first and second mounting brackets and the extension bracket are coupled together in a side-by-side linear arrangement.

16. The wall hanging system according to claim 14 wherein each of the first and second mounting brackets and the extension bracket are configured to be coupled directly to the wall.

17. The wall hanging system according to claim 14 wherein the at least one first type of mounting element comprises a first post and a second post, wherein the at least one second type of mounting element of the first mounting bracket comprises a first cavity, and wherein the at least one second type of mounting element of the second mounting bracket comprises a second cavity, each of the first and second cavities having an insertion portion and a nesting portion, and wherein the wall décor item is mounted to the wall by inserting the first second and posts into the insertion portions of the first and second cavities and then sliding the wall décor item so that the first and second posts slide from the insertion portions of the first and second cavities to the nesting portions of the first and second cavities.

18. The wall hanging system according to claim 14 wherein the first and second mounting brackets are coupled to the wall using fasteners, and wherein the extension bracket is maintained adjacent to the wall due solely to the mating between the third and fourth coupling features of the extension bracket and the first and second coupling features of the first and second mounting brackets.

19. The wall hanging system according to claim 14 wherein the first and third coupling features are dovetail recesses and wherein the second and fourth coupling features are dovetail protrusions that fit within the dovetail recesses of the first and third coupling features.

20. The wall hanging system according to claim 14 wherein the extension bracket comprises a level mount, and further comprising a level component snap-fit connected to the level mount to facilitate a level mounting of the first and second mounting brackets and the extension bracket on the wall.

* * * * *